(12) United States Patent
Brown et al.

(10) Patent No.: US 11,176,315 B2
(45) Date of Patent: Nov. 16, 2021

(54) COMPREHENSIVE IN-SITU STRUCTURED DOCUMENT ANNOTATIONS WITH SIMULTANEOUS REINFORCEMENT AND DISAMBIGUATION

(71) Applicant: ELSEVIER, INC., New York, NY (US)

(72) Inventors: Hans-Frederick Brown, San Rafael, CA (US); Jamie Hall, Titusville, NJ (US); Yekta Gurel, London (GB); Nicolas Goller, Salt Lake City, UT (US); Iris Amaris Mack, Philadelphia, PA (US); Engin Erdogan, New York, NY (US); Craig Lee Moon, Orem, UT (US); Susanne Marcy Cohen, Philadelphia, PA (US); Ghazal Badiozamani, New York, NY (US)

(73) Assignee: ELSEVIER INC., New York, NY (US)

( * ) Notice: Subject to any disclaimer, the term of this patent is extended or adjusted under 35 U.S.C. 154(b) by 204 days.

(21) Appl. No.: 16/412,837

(22) Filed: May 15, 2019

(65) Prior Publication Data
US 2020/0364294 A1 Nov. 19, 2020

(51) Int. Cl.
*G06F 3/048* (2013.01)
*G06F 40/169* (2020.01)
(Continued)

(52) U.S. Cl.
CPC .......... *G06F 40/169* (2020.01); *G06F 3/0482* (2013.01); *G06F 3/0483* (2013.01)

(58) Field of Classification Search
CPC .... G06F 40/169; G06F 3/0483; G06F 3/0482; G06F 40/30; G06F 40/247; G06F 40/216;
(Continued)

(56) References Cited

U.S. PATENT DOCUMENTS 7,505,989 B2 * 3/2009 Gardner ................ G06F 16/367
7,739,304 B2 6/2010 Naaman et al.
(Continued)

OTHER PUBLICATIONS

Kiprov, Yasen et al. "Online Authoring System with Semi-automatic Annotation and Visual Knowledge Representation." Faculty of Mathematics and Informatics, University of Sofia, Bulgaria, Dec. 28, 2018, https://dse.fmi.uni-sofia.bg/SmartBook/docs/SmartBook-poster.pdf. Accessed Dec. 28, 2018.
(Continued)

*Primary Examiner* — Steven B Theriault
(74) *Attorney, Agent, or Firm* — Dinsmore & Shohl LLP

(57) ABSTRACT

A system including an authoring assistance system to: i) receive a node element selected within a content creation user interface (UI) associated with a user device, ii) receive one or more suggested annotation from a content enrichment system based on the selected node element, iii) integrate a UI tagging pane within the content creation UI, the UI tagging pane including: a) one or more annotation control element to textually depict each of the one or more suggested annotation, each annotation control element defining: a first portion configured to enter the associated annotation into an annotation entry box and a second portion configured to reject the associated annotation, and b) an add control element configured to accept all annotations entered in the annotation entry box, and iv) transmit at least one of each annotation accepted or each annotation rejected via the UI tagging pane to a data store system.

18 Claims, 29 Drawing Sheets

(51) Int. Cl.
*G06F 3/0483* (2013.01)
*G06F 3/0482* (2013.01)

(58) Field of Classification Search
CPC .......... G06F 3/012; G06F 3/013; G06F 1/163; G06F 3/041; G06F 2203/0381; G06F 3/167; G06F 3/0488; G06F 3/0481; G06Q 30/0641; G02B 27/01
See application file for complete search history.

(56) References Cited

U.S. PATENT DOCUMENTS

| | | | | |
|---|---|---|---|---|
| 7,870,135 | B1* | 1/2011 | Cheung | G06Q 30/0601 707/737 |
| 8,170,916 | B1* | 5/2012 | Dicker | G06Q 30/0601 705/26.1 |
| 8,468,447 | B2* | 6/2013 | Drieschner | G06F 16/9562 715/243 |
| 8,484,292 | B2* | 7/2013 | Spataro | H04L 65/403 709/205 |
| 8,566,329 | B1* | 10/2013 | Freed | G06F 16/48 707/748 |
| 9,053,190 | B1* | 6/2015 | Boenau | G06F 16/3323 |
| 9,245,271 | B1* | 1/2016 | Ahmed | G06Q 30/0631 |
| 9,251,130 | B1* | 2/2016 | Lynnes | G06F 40/169 |
| 9,367,609 | B1* | 6/2016 | Mianji | G06F 16/2428 |
| 9,489,119 | B1* | 11/2016 | Smith, Jr. | G06F 40/117 |
| 9,600,785 | B2* | 3/2017 | Bogusky | G06Q 50/04 |
| 9,646,027 | B2* | 5/2017 | Zuckerberg | G06F 21/6218 |
| 9,836,472 | B2* | 12/2017 | Cisler | G06F 16/168 |
| 9,898,167 | B2* | 2/2018 | Sun | G06F 3/0484 |
| 9,971,745 | B2* | 5/2018 | Chen | G06F 40/14 |
| 10,002,117 | B1* | 6/2018 | Ain | G06F 40/143 |
| 10,089,404 | B2* | 10/2018 | Libin | G06F 16/9562 |
| 10,296,536 | B2* | 5/2019 | Zuckerberg | G06F 21/6245 |
| 10,373,079 | B2* | 8/2019 | Lamere | G06F 16/9538 |
| 10,402,061 | B2* | 9/2019 | Kohlmeier | G06F 3/0482 |
| 10,515,111 | B2* | 12/2019 | Eleish | G06F 3/04883 |
| 10,664,650 | B2* | 5/2020 | Li | G06F 40/169 |
| 10,755,033 | B1* | 8/2020 | Dass | G06N 5/003 |
| 2005/0216457 | A1* | 9/2005 | Walther | G06F 16/9558 |
| 2005/0257158 | A1* | 11/2005 | Lombardo | G06F 40/166 715/751 |
| 2006/0101328 | A1* | 5/2006 | Albornoz | G06Q 10/10 715/201 |
| 2007/0055926 | A1* | 3/2007 | Christiansen | G06Q 10/10 715/210 |
| 2007/0078832 | A1* | 4/2007 | Ott, IV | G06F 16/9535 |
| 2007/0174247 | A1* | 7/2007 | Xu | G06F 40/169 |
| 2008/0016052 | A1* | 1/2008 | Frieden | G06F 16/3331 |
| 2008/0016072 | A1* | 1/2008 | Frieden | G06F 16/3331 |
| 2008/0059897 | A1* | 3/2008 | Dilorenzo | G06F 16/38 715/764 |
| 2008/0072145 | A1* | 3/2008 | Blanchard | G06F 40/12 715/273 |
| 2008/0082486 | A1* | 4/2008 | Lermant | G06F 16/38 |
| 2008/0092044 | A1* | 4/2008 | Lewis | G06F 16/38 715/713 |
| 2008/0104032 | A1* | 5/2008 | Sarkar | G06F 16/958 |
| 2008/0114778 | A1* | 5/2008 | Siegel | G06F 16/90 |
| 2008/0160967 | A1* | 7/2008 | Narasimhan | H04M 1/72445 455/414.1 |
| 2008/0168073 | A1 | 7/2008 | Siegel et al. | |
| 2008/0195657 | A1* | 8/2008 | Naaman | G06K 9/00677 |
| 2008/0215583 | A1* | 9/2008 | Gunawardena | G06F 16/9535 |
| 2008/0244446 | A1 | 10/2008 | LeFevre et al. | |
| 2008/0282198 | A1* | 11/2008 | Brooks | G06F 16/9562 715/854 |
| 2009/0248516 | A1 | 10/2009 | Gross | |
| 2009/0281970 | A1* | 11/2009 | Mika | G06F 40/169 706/12 |
| 2009/0287674 | A1* | 11/2009 | Bouillet | G06F 16/9562 |
| 2009/0327336 | A1* | 12/2009 | King | G06F 16/48 |
| 2010/0070851 | A1* | 3/2010 | Chen | G06F 40/14 715/236 |
| 2010/0114907 | A1* | 5/2010 | Kirby | G06F 16/9562 707/748 |
| 2010/0251086 | A1 | 9/2010 | Haumont et al. | |
| 2010/0262659 | A1* | 10/2010 | Christiansen | G06F 16/93 709/205 |
| 2011/0029533 | A1* | 2/2011 | Jayakody | G06F 16/907 707/738 |
| 2011/0113320 | A1* | 5/2011 | Neff | G06F 40/169 715/230 |
| 2011/0153607 | A1* | 6/2011 | Nauerz | G06F 16/9535 707/737 |
| 2011/0173141 | A1* | 7/2011 | Campbell | G06F 16/48 706/12 |
| 2011/0231747 | A1* | 9/2011 | Zuckerberg | G06F 16/5866 715/206 |
| 2011/0295851 | A1* | 12/2011 | El-Saban | G06F 3/04817 707/728 |
| 2012/0023103 | A1* | 1/2012 | Soderberg | G06F 16/51 707/739 |
| 2012/0036423 | A1* | 2/2012 | Haynes, II | G06F 3/0483 715/230 |
| 2012/0078945 | A1 | 3/2012 | Hurst | |
| 2012/0158400 | A1 | 6/2012 | Schmidt et al. | |
| 2012/0304247 | A1* | 11/2012 | Badger | G06F 16/951 726/1 |
| 2012/0324002 | A1* | 12/2012 | Chen | G06F 16/54 709/204 |
| 2013/0159830 | A1* | 6/2013 | Lee | G06F 40/137 715/208 |
| 2013/0218835 | A1* | 8/2013 | Greenspan | G06F 16/355 707/610 |
| 2013/0325870 | A1* | 12/2013 | Rouse | G06F 16/353 707/741 |
| 2014/0195885 | A1* | 7/2014 | Thiruvidam | G06Q 10/10 715/205 |
| 2014/0310345 | A1* | 10/2014 | Megiddo | G06F 15/163 709/204 |
| 2014/0359505 | A1* | 12/2014 | Cisler | G06F 16/144 715/769 |
| 2015/0046783 | A1* | 2/2015 | O'Donoghue | G06F 40/169 715/205 |
| 2015/0052427 | A1* | 2/2015 | Vagell | G06F 40/166 715/256 |
| 2015/0113390 | A1* | 4/2015 | Vagell | G06F 40/106 715/255 |
| 2015/0242387 | A1 | 8/2015 | Rachevsky et al. | |
| 2016/0041961 | A1* | 2/2016 | Romney | G06F 40/131 715/230 |
| 2016/0092428 | A1 | 3/2016 | Ilic et al. | |
| 2016/0147399 | A1* | 5/2016 | Berajawala | H04L 67/10 715/753 |
| 2016/0171097 | A1* | 6/2016 | Nicholas | G06Q 10/10 707/740 |
| 2016/0246769 | A1* | 8/2016 | Screen | H04L 67/1097 |
| 2016/0246784 | A1* | 8/2016 | Chakerian | G06F 16/86 |
| 2016/0364426 | A1* | 12/2016 | Schroetel | G06F 16/907 |
| 2017/0103072 | A1* | 4/2017 | Yuen | G06F 16/58 |
| 2017/0177589 | A1* | 6/2017 | Shorman | G06Q 50/01 |
| 2018/0013818 | A1* | 1/2018 | Howard | H04W 4/023 |
| 2018/0024976 | A1 | 1/2018 | Joo et al. | |
| 2018/0052589 | A1* | 2/2018 | Forman | G06F 3/04812 |
| 2018/0373415 | A1* | 12/2018 | Dellinger | G06F 3/04842 |
| 2019/0138584 | A1 | 5/2019 | Neff et al. | |
| 2020/0110839 | A1* | 4/2020 | Wang | G06N 5/046 |
| 2020/0301950 | A1* | 9/2020 | Lorrain-Hale | G06F 16/3323 |
| 2020/0301951 | A1* | 9/2020 | Fox | G06F 16/3326 |

OTHER PUBLICATIONS

Khalili, Ali. "A Semantics-based User Interface Model for Content Annotation, Authoring and Exploration." Universitat Leipzig, Fakultat fur Mathematik and Informatik, Jun. 26, 1984, http://svn.aksw.org/papers/2014/Thesis_Ali/public.pdf. Accessed Dec. 28, 2018.

(56) References Cited

OTHER PUBLICATIONS

PCT/US20/032632 Notification of Transmittal of The International Search Report and The Written Opinion of the International Searching Authority, or the Declaration, dated Aug. 25, 2020.

* cited by examiner

FIG. 2

Elsa All Projects All Assignments Settings ⑦ 🔍 👤 Anne G. Perry AGP

Nursing Today ✦ Private ○○○○●○○○○○○○○○
Write Activity & Versions Manage All Assets Final Draft (5/16 Stages) (Saved)

Header ⌄ | B *I* U x² x₂ | ≡ ⇒ ▣ ▷ △ | ▤ ❡ 🔗 ⟨/⟩ ⊞ | A̲ ⊛ | ⤺ ⤻ ⧉ ⬚ 🎥 🕐 ⊕ ◇ ⊙ 🔍 ⋮

6,7

Nursing Today

Nursing is an art and a science. As a professional nurse you will learn to deliver care artfully with compassion, caring, and respect for each patient's dignity and personhood. As a science nursing practice is based on a body of knowledge that is continually changing with new discoveries and innovations. When you integrate the science and art of nursing into your practice, the quality of care you provide to your patients is at a level of excellence that benefits patients and their families.

Nursing career opportunities are limitless. There are a variety of career paths, including clinical practice, education, research, management, administration, and even entrepreneurship. As a student it is important for you to understand the scope of nursing practice and how nursing influences the lives of your patients.

The patient is the center of your practice. The patient includes the individual, family, and/or community. Patients have a wide variety of health care needs, experiences, vulnerabilities, and expectations; but this is what makes nursing both challenging and rewarding. Making a difference in your patients' lives is fulfilling (e.g., helping a dying patient find relief from pain, helping a young mother learn parenting skills, and finding ways for older adults to remain independent in their homes). Nursing offers personal and professional rewards every day. This chapter presents a contemporary view of the evolution of nursing and nursing practice and the historical, practical, social, and political influences on the discipline of nursing.

450 words | SMOG 3.13 |
Flesch-Kincaid 60

Tag your chapter to increase its reach.

FIG. 3

Elsa  All Projects  All Assignments  Settings  ⓘ 🔍 💬 Anne G. Perry (AGP)

Nursing Today ◆Private
Write  Activity & Versions  Manage All Assets

●●●●●○○○○○○○○○○○
Final Draft (5/16 Stages) (Saved) ✕

Header ⌄ | B  I  U  x²  x₂ | ≡ ≡ ≡ △ ▽ | 🖼 ▦ 🔗 🞜 ⌕ | 🖼 | Aₐ 🔲 | ↶ ↷

Nursing Today

Nursing is an art and a science. As a professional nurse you will learn to deliver care artfully with compassion, caring, and respect for each patient's dignity and personhood. As a science nursing practice is based on a body of knowledge that is continually changing with new discoveries and innovations. When you integrate the science and art of nursing into your practice, the quality of care you provide to your patients is at a level of excellence that benefits patients and their families.

Nursing career opportunities are limitless. There are a variety of career paths, including clinical practice, education, research, management, administration, and even entrepreneurship. As a student it is important for you to understand the scope of nursing practice and how nursing influences the lives of your patients.

The patient is the center of your practice. The patient includes the individual, family, and/or community. Patients have a wide variety of health care needs, experiences, vulnerabilities, and expectations; but this is what makes nursing both challenging and rewarding. Making a difference in your patients' lives is fulfilling (e.g., helping a dying patient find relief from pain, helping a young mother learn parenting skills, and finding ways for older adults to remain independent in their homes). Nursing offers personal and professional rewards every day. This chapter presents a contemporary view of the evolution of nursing and nursing practice and the historical, practical, social, and political influences on the discipline of nursing.

544' 💎4 📋1  550'

🏷 Tags  508  510
Chapter Keywords  Content Tags

Historical Highlights  544  💎5  542

Nursing is an art and a science.  💎4 📋1
As a professional nurse you will learn...

↺ The International Council of Nurses (ICN, 2010)
has another defini-tion: Nursing encom...

Figure 2: Providing Nursing Services  💎3
548

ⓘ Did You Know?  ⌄

FIG. 5

Elsa · All Projects · All Assignments · Settings · ⓘ 🔍 🔔 Anne G. Perry (AGP)

Nursing Today · 🔒 Private
Write · Activity & Versions · Manage All Assets

○○○○●○○○○○○○○○○○
Final Draft (5/16 Stages)    (Saved)

Header ▾ | B I U x² x₂ | ≡ ▽ | ⊟ ⊞ ⌖ ⊕ | 𝒜 🔗 ✂ | A ↶ ↷ contemporary view of the evolution of nursing and nursing practice and the historical, practical, 552
social, and political influences on the discipline of nursing.                             548 ◎4 ⊟1

[Figure 2 ⌄]

Add Alternative (Descriptive) Text  730

TITLE
Providing nursing services

CAPTION
Providing nursing services in assisted living facilities promotes
physical and psychosocial health.

✓ COPYRIGHT
With Permission From [Author Name] ⌄

When giving care, it is essential to provide a specified service according to standards of practice
and to follow a code of ethics (American Nurses Association [ANA], 2008, 2010b). Professional
practice includes knowledge from social and behavioral sciences, biological and physiological
sciences, and nursing theories. In addition, nursing practice incorporates ethical and social
values, professional autonomy, and a sense of commitment and community. The American Nursing
Association (ANA) defines nursing as the protection, promotion, and optimization of health and
abilities; prevention of illness and injury; alleviation of suffering through the diagnosis and
treatment of human response; and advocacy in the care of individuals, families, communities, and
populations (ANA, 2010b). The International Council of Nurses (ICN, 2010) has another definition.
Nursing encompasses autonomous and collaborative care of individuals of all ages, families,
groups and communities, sick or well and in all settings. Nursing includes the promotion of health;

☑ Content Tags ~756
◎ Physicians ✕  ◎ Patient ✕  ◎ Career ✕
◎ Family ✕  ☰ Definition ✕
Add ~734

⊛ Suggestions   ✕ Reject All Shown
◎ Quality of Care ✕  ◎ Behavior ✕
◎ Professions ✕  ◎ Research Validity ✕
◎ Medical Ethics ✕
+ See More ~728
Component Tags ⓘ
☰ Learning Objective
☰ Competency Measurement ~754

ⓘ Did You Know?                              ⌄

- 2500
- 2502 Nursing Today · Private
- Write | Activity & Versions | Manage All Assets
- Header ▾ | B I U x² x₂ | ≡ ≡ ≡ | ... | Final Draft (5/16 Stages) | Saved Elsa — All Projects  All Assignments  Settings — Anne G. Perry (AGP)

a student it is important for you to understand the scope of nursing practice and how nursing influences the lives of your patients.

The patient is the center of your practice. The patient includes the individual, family, and/or community. Patients have a wide variety of health care needs, experiences, vulnerabilities, and expectations; but this is what makes nursing both challenging and rewarding. Making a difference in your patients lives is fulfilling (e.g., helping a dying patient find relief from pain, helping a young mother learn parenting skills, and finding ways for older adults to remain independent in their homes). Nursing offers personal and professional rewards every day. Diabetes mellitus type 2 presents a contemporary view of the evolution of nursing and nursing practice and the historical, practical, social, and political influences When giving care, it is essential to provide a specified service according to standards of practice and to follow a code of ethics (American Nurses Association [ANA], 2008, 2010b). Professional practice includes knowledge from social and behavioral sciences, biological and physiological sciences, and nursing theories. In addition, nursing practice incorporates ethical and social values, professional autonomy, and a sense of commitment and community. The American Nurses Association (ANA) defines nursing as the protection, promotion, and optimization of health and abilities; prevention of illness and injury; alleviation of suffering through the diagnosis and treatment of human response; and advocacy in the care of individuals, families, communities, and populations (ANA, 2010b). The International Council of Nurses (ICN, 2010) has another definition: Nursing encompasses autonomous and collaborative care of individuals of all ages, families, groups and communities, sick or well and in all settings. Nursing includes the promotion of health;

2504 —
Diabetes Mellitus type 2    ✕ — 2524
Related Images        Expand All | Collapse All — 2522

More Images ↗ — 2508
Key Points ↗ — 2506
Type 2 diabetes mellitus is a metabolic disease in which hyperglycemia results from insulin resistance and reduced insulin; accounts for 90% to 95% of cases of diabetes in adults 1

Learn More, Clinical Overview ↗ — 2520
Synonyms (17) ↗
· maturity onset diabetes ↗
 · T2DM ↗
 · T2D ↗
 · DM2 ↗
 · AODM ↗
· maturity onset diabetes ↗
 · T2DM ↗ — 2514
Complication Severity (8) ⌄
Medications (15) ⌄ — 2518
Related Diseases (14) ⌄
          2510  2512   2516

COMPREHENSIVE IN-SITU STRUCTURED DOCUMENT ANNOTATIONS WITH SIMULTANEOUS REINFORCEMENT AND DISAMBIGUATION

BACKGROUND

Existing document annotation programs are generally employed after the final content and documents are produced and out of an original author's hands. However, such post-production annotations are inefficient and prone to error at least since the original author, who is most knowledgeable about the created content, is not being utilized. This may lead to content being annotated and/or supplemented in ways contrary to the intent of the original author. Further, at least since the original author is not involved in such post-production annotations, existing document annotations programs generally do not encourage an author, during content creation, to provide context-relevant annotations.

Accordingly, there exists a continuing need for a system, a platform, and/or method where original authors are engaged directly with annotation services and motivated in supplying such annotations at the time of content creation.

SUMMARY

In one embodiment a system including an authoring assistance system to create an interactive authoring environment for a plurality of users is disclosed. The authoring assistance system may include a processor and a memory device, the memory device storing instructions that when executed by the processor cause the processor to: i) receive one or more node element selected within a content creation user interface (UI) associated with a user access device communicatively coupled to the authoring assistance system, ii) receive one or more suggested annotation from a content enrichment system (CES) communicatively coupled to the authoring assistance system, where the one or more suggested annotation is based on the one or more selected node element, iii) integrate a user interface (UI) tagging pane within the content creation UI of the user access device, where the UI tagging pane may include: a) one or more annotation control element to textually depict each of the one or more suggested annotation, where each annotation control element defines: a first portion configured to, after selection, enter an annotation associated with that annotation control element into an annotation entry box, and a second portion configured to, after selection, reject the suggested annotation associated with that annotation control element, and b) an add control element configured to, after selection, accept all annotations entered in the annotation entry box, and iv) transmit at least one of each annotation accepted via the UI tagging pane or each annotation rejected via the UI tagging pane to a data store system communicatively coupled to the authoring assistance system.

In another embodiment a system to create an interactive authoring environment for a plurality of users is disclosed. The system may include a content enrichment server, a database server, and an authoring assistance server communicatively coupled via a network. The authoring assistance server may include a processor and a memory device, the memory device storing instructions that when executed by the processor cause the processor to: i) receive one or more node element selected within a content creation user interface (UI) associated with a user access device communicatively coupled to the system, ii) receive one or more suggested annotation from the content enrichment server, where the one or more suggested annotation is based on the one or more selected node element, iii) integrate a user interface (UI) tagging pane within the content creation UI of the user access device, where the UI tagging pane includes: a) one or more annotation control element to textually depict each of the one or more suggested annotation, where each annotation control element defines: a first portion configured to, after selection, enter an annotation associated with that annotation control element into an annotation entry box, and a second portion configured to, after selection, reject the suggested annotation associated with that annotation control element, and b) an add control element configured to, after selection, accept all annotations entered in the annotation entry box, and iv) transmit at least one of each annotation accepted via the UI tagging pane or each annotation rejected via the UI tagging pane to the database server.

In yet another embodiment, a non-transitory computer readable medium storing instructions is disclosed. The instructions may when executed by a processor cause the processor to: i) receive one or more node element selected within a content creation user interface (UI) associated with a user access device, ii) receive one or more suggested annotation from a content enrichment system (CES), where the one or more suggested annotation is based on the one or more selected node element, iii) integrate a user interface (UI) tagging pane within the content creation UI of the user access device, where the UI tagging pane includes: a) one or more annotation control element to textually depict each of the one or more suggested annotation, where each annotation control element defines: a first portion configured to, after selection, enter an annotation associated with that annotation control element into an annotation entry box, and a second portion configured to, after selection, reject the suggested annotation associated with that annotation control element, and b) an add control element configured to, after selection, accept all annotations entered in the annotation entry box, and iv) transmit at least one of each annotation accepted via the UI tagging pane or each annotation rejected via the UI tagging pane to a data store system.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2 depicts an illustrative user interface (UI) tagging pane and an illustrative text editor toolbar, including a selectable tagging control element, integrated within a content creation user interface generated on a display screen of a plurality of access devices according to one or more embodiments of the present disclosure;

FIG. 3 depicts an illustrative content creation user interface that integrates one or more access control elements to access/enter a UI tagging pane according to one or more embodiments of the present disclosure;

FIG. 5 depicts an illustrative UI tagging pane integrated within a content creation user interface after user selection of a "Content Tags" or a second selectable tagging control element according to one or more embodiments of the present disclosure;

FIG. 7 depicts an illustrative UI tagging pane integrated within a content creation user interface after user selection of an asset node element according to one or more embodiments of the present disclosure;

FIG. 8 depicts an illustrative UI tagging pane for accepting one or more chapter keyword according to one or more embodiments of the present disclosure;

FIG. 9 depicts an illustrative UI tagging pane for rejecting one or more chapter keywords according to one or more embodiments of the present disclosure;

FIG. 10 depicts an illustrative UI tagging pane for modifying a ranking for one or more chapter keyword according to one or more embodiments of the present disclosure;

FIG. 11 depicts an illustrative UI tagging pane for proposing annotations according to one or more embodiments of the present disclosure;

FIG. 12 depicts an illustrative UI tagging pane for disambiguating annotations according to one or more embodiments of the present disclosure;

FIG. 18 depicts an illustrative project dashboard interface according to one or more embodiments of the present disclosure;

FIG. 22 depicts an illustrative digital product interface presented after selection of a curated ancillary digital link associated with a content tag according to one or more embodiments of the present disclosure;

FIG. 23 depicts an illustrative content creation user interface to provide additional information according to one or more embodiments of the present disclosure;

FIG. 24 depicts an illustrative content creation user interface to provide additional information via a supplemental content link according to one or more embodiments of the present disclosure;

FIG. 25 depicts an illustrative content creation user interface including a UI supplemental content pane according to one or more embodiments of the present disclosure.

DETAILED DESCRIPTION

Figure 1A:
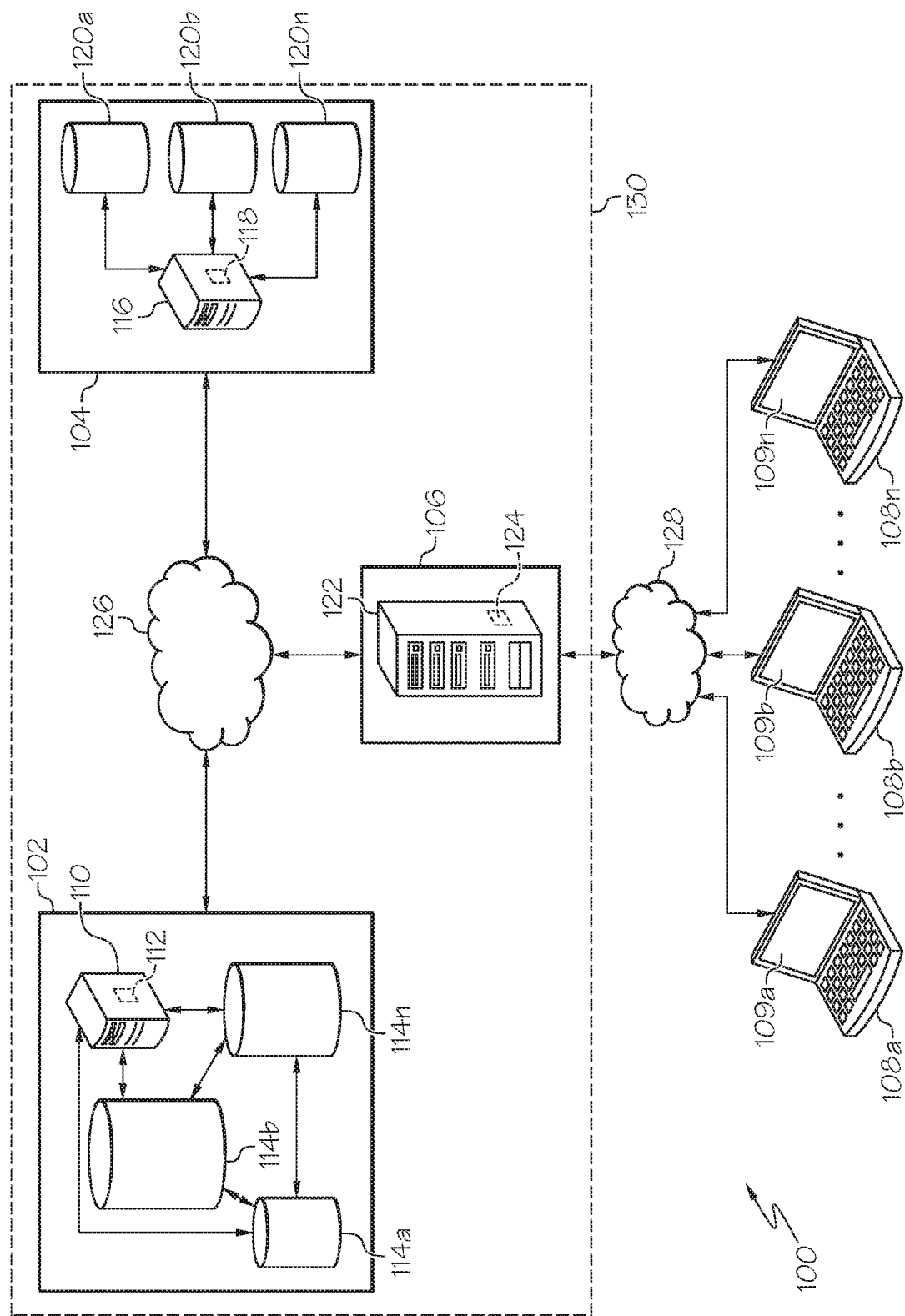
FIG. 1A depicts an illustrative system including a data store system, a content enrichment system, an authoring assistance system, and a plurality of access devices, according to one or more embodiments shown and described herein.

Embodiments described herein extend the computational power of content enrichment systems. Generally, a content enrichment system receives content and applies a plurality of natural-language processing algorithms and/or machine-learning algorithms in real time, near real time, or at a predetermined refresh rate to provide enrichments (e.g., annotations) for association with the received content. Various content enrichment systems (e.g., an Elsevier® Content Enrichment Framework or System, as a non-limiting example) may benefit from the improvements described herein.

Embodiments described herein introduce content enrichment earlier in the authoring workflow (e.g., in situ) so that both an author and an associated computer(s) (e.g., content enrichment system/framework) can collaborate and learn from their interactions, via particular user interfaces, as described herein. Various embodiments utilize such user interfaces, as described herein, to make suggestions and/or recommendations for annotations and/or content enrichment, as part of a fluid, online environment, to proactively assist the author(s) in defining appropriate annotations and/or content enrichment. For example, suggested/recommended annotations may include chapter keywords, content tags, and/or component tags provided via the various interfaces (e.g., UI tagging panes) as described herein while suggested/recommended content enrichment may include additional and/or supplemental information provided via the various interfaces (e.g., curating tooltip interfaces, supplemental content links, specification tooltip interfaces, supplemental content interface, UI supplemental content panes, and/or the like) as described herein.

System interaction, via the various user interfaces as described herein, may enable authors to receive machine guidance while they focus on the insights from and patterns in their created content. The computer(s) (e.g., content enrichment system/framework) may continually learn from inputs received through the various user interfaces described herein. For example, the inputs may be utilized as part of a feedback loop from the authors (e.g., domain experts) to improve content enrichment system/framework algorithms to realize relatively higher quality suggestions and/or recommendations for annotations and/or content enrichment in that domain.

Further embodiments described herein provide, via various user interfaces, a continually updated discoverability score as a motivational tool for authors. In one example, an author new to the concepts of tagging, annotations, and/or meta-data may utilize the discoverability score tool to gain an appreciation for the critical role of tagging, annotations, and/or meta-data. In another example, a veteran author, knowledgeable of the role of tagging, annotations, and/or meta-data, may utilize the discoverability score tool to proactively fine tune their tagging, annotations, and/or meta-data such that an intended audience is targeted. In either case, authors are able to understand the value of interacting with the various user interfaces described herein (e.g., a guided, wizard-like experience) to best augment their created content with different and specific annotation types as described herein.

Before getting into details of the various user interfaces and their particular functions as described herein, systems of the present disclosure may be supported by four sub-systems to realize comprehensive in-situ structured document annotations with simultaneous reinforcement and disambiguation, as described herein. A first subsystem may support a bi-directional flow of communication between a content enrichment system computer and an author computer. A second subsystem may support a comprehensive annotation system and a structured authoring environment. A third subsystem may support a guided tool to define a discoverability score. A fourth subsystem may support author motivation and augmentations to an authoring environment. Such subsystems may work in concert with each other to deliver comprehensive in-situ structured document annotations with simultaneous reinforcement & disambiguation during an authoring experience.

FIG. 1A depicts an illustrative system 100 including a data store system 102, a content enrichment system 104, an authoring assistance system 106, and a plurality of access devices, 108a, 108b, 108n, according to one or more embodiments shown and described herein. Referring to FIG. 1A, the data store system 102, the content enrichment system 104, and the authoring assistance system 106 may work concordantly to create a tailored content authoring environment, including a plurality of user interfaces as described herein, on each of the plurality of access devices 108a, 108b, 108n. Each access device 108a, 108b, 108n may include a computing device (e.g., a personal computer, a handheld device, a cellular device, and/or the like). The plurality of user interfaces of each tailored content authoring environment may be utilized to augment content being created by a user (e.g., author, content creator, editor and/or the like) on each access device 108a, 108b, 108n. The plurality of user interfaces, as described herein, may be directly integrated within a display screen 109a, 109b, 109n of each access device 108a, 108b, 108n such that the user is not required to switch between different programs and/or user interfaces (e.g., between a content creation program/user interface and a separate content enrichment program/user interface, and/or the like). According to various aspects, the plurality of user interfaces, as described herein, may be directly integrated within a user interface of a content creation program (e.g., text editor program, word processing program, and/or the like) generated on each display screen 109a, 109b, 109n. Limiting user switches between programs and/or user interfaces enables a fluid authoring experience during a content-creation phase. According to various aspects, the plurality of user interfaces, as described herein, may be directly integrated within a user interface of an existing content creation program via software (e.g., via an add-on, via a plug-in, via an API, and/or the like) of each access device 108a, 108b, 108n. According to other aspects, the plurality of user interfaces, as described herein, may be part of a stand-alone program/user interface downloaded by each access device 108a, 108b, 108n (e.g., from the data store system 102, the content enrichment system 104, the authoring assistance system 106, an independent application provider, and/or the like).

In view of FIG. 1A, the data store system 102 may include a database server 110 including a memory 112 storing executable software (e.g., database management software, or the like) that stores annotation-related information including documents, different versions of each documents, content enrichment system annotation results per document and/or per document version, user interactions with content enrichment annotation results per document and/or per document version, and/or the like in a plurality of data store databases 114a 114b, 114n. According to aspects described herein, the data store system 102 tracks and/or stores all created content, all annotations, and all interactions that users (e.g., content creators) have with content enrichment system 104 results.

The content enrichment system 104 may include a content enrichment server 116 including a memory 118 storing executable software that implements a plurality of algorithms (e.g., machine-learning algorithms, natural-language processing algorithms, and/or the like) trained using data stored in a plurality of content enrichment databases 120a, 120b, 120n to return different types of annotations, as described herein, for content (e.g., selected text and/or the like). The different types of annotations (e.g., chapter keywords, content tags, component tags, and/or the like as discussed herein) returned by the content enrichment system 104 may be generally referred to herein as "annotations" for purposes of simplification.

The authoring assistance system 106 may include a web server 122 including a memory 124 storing executable software (e.g., a web application) that creates the tailored content authoring environment, including the plurality of user interfaces, as described herein. According to various aspects, the web application may create the tailored content authoring environment to provide structured authoring activities and content-enrichment tasks. Various content creation platforms (e.g., Elsa®—an Elsevier® Digital Publishing Platform, as a non-limiting example) may include such software (e.g., web application) and its associated user interfaces as described herein.

The data store system 102, the content enrichment system 104 and the authoring assistance system 106 may be communicatively coupled via a network 126 (e.g., internet, intranet, LAN, and/or the like). Similarly, the plurality of access devices 108a, 108b, 108n may be communicatively coupled to the data store system 102, the content enrichment system 104 and the authoring assistance system 106 via a network 128 (e.g., internet, intranet, LAN, and/or the like). The network 126 may be the same as or different from the network 128. According to an alternative aspect (e.g., shown as optional in FIG. 1A in phantom), the data store system 102, the content enrichment system 104 and the authoring assistance system 106 may be combined to form a comprehensive system 130 communicatively coupled to the plurality of access devices 108a, 108b, 108n via the network 128.

It should be understood the references to system 100 herein may alternatively refer to comprehensive system 130.

As outlined herein, the system 100 of the present disclosure may include a data store system 102, a content enrichment system 104, an authoring assistance system 106, and a plurality of access devices, 108a, 108b, 108n that provide a comprehensive environment for interactions between users (e.g., authors, content creators, editors, and/or the like) and the system 100. According to embodiments described herein, the data store system 102, the content enrichment system 104, and/or the authoring assistance system 106 may include one or more component (e.g., the database server 110, the content enrichment server 116, the web server 122, respectively) including a non-transitory computer-readable medium for completing the various processes described herein, embodied as hardware, software, and/or firmware, according to embodiments shown and described herein. According to some aspects, each component may be configured as a general purpose computer with the requisite hardware, software, and/or firmware. According to other aspects, each component may be configured as a special purpose computer (e.g., a particular machine) designed specifically for performing the functionality as described herein. Here, it should be generally understood that each component may be one computing device/system or a plurality of computing devices/systems. Referring to FIG. 1A, each component (e.g., the database server 110, the content enrichment server 116, the web server 122) may include a processing device, I/O hardware, network interface hardware, a data storage device, a non-transitory memory (e.g., memory device), and/or the like. Each processing device may be configured to receive and execute instructions (e.g., from the data storage device, the non-transitory memory, and/or the like) to perform the functionality (e.g., via the plurality of tailored user interfaces) as described herein. More specifically, each non-transitory memory (e.g., memory 112, memory 118, memory 124, and/or the like) may include/store one or more programming instructions thereon that, when executed by the processing device, causes the processing device to complete the various processes described herein. According to some embodiments, the programming instructions stored on the non-transitory memory may be embodied as a plurality of software logic modules, where each logic module provides programming instructions for completing one or more tasks, as described herein.

Data Store System

Figure 1B:
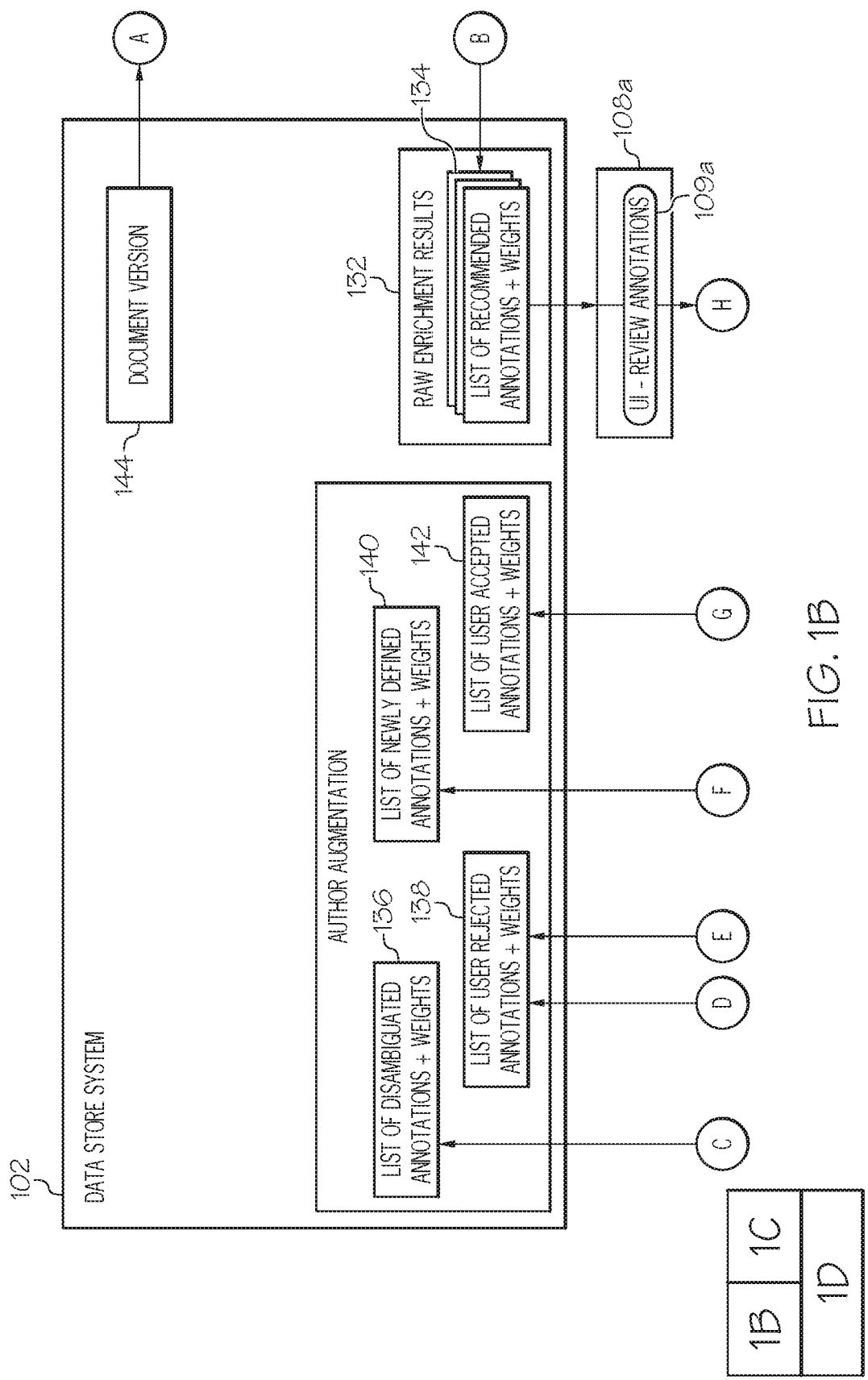
FIG. 1B depicts a block diagram of an illustrative data store system according to one or more embodiments of the present disclosure.

FIG. 1B depicts a block diagram of an illustrative data store system 102 according to one or more embodiments of the present disclosure. The data store system 102 is where authored content and relevant supporting assets (e.g., figures, tables, videos, formulas, datasets, and/or the like) are stored and versioned (e.g., a content/document versioned data store). As an author (e.g., content creator) works on a given document, the data store system 102 may track a relationship between the different content elements (e.g., headers, paragraphs, bullets, callouts and other assets) in a structured manner. According to various aspects, each of these different content elements may be tracked as node elements in a structured tree graph. According to further aspects, each node element within a given document may also be versioned. As the author writes to the data store (e.g., via the authoring assistance system 106, as described herein) appropriate content, including each document version 144 may be collected and sent to the content enrichment system 104 in accordance with predefined intervals and/or in response to a user action (e.g., content selected via the various UI as described herein). In return, an ordered list of relevant raw enrichment results 132, including a list of recommended annotations and associated weights 134 may be returned (e.g., via the authoring assistance system 106) to the user and presented to the user (e.g., via a display 109a, 109b, 109n of access device 108a, 108b, 108n, respectively). This list of raw enrichment results 132 may be tracked or collected in the data store system 102 in conjunction with the original content. Further in view of FIG. 1B, any or all interactions that the user may have with these raw enrichment results 132 may also be tracked or collected in the data store system 102 side-by-side with the original raw enrichment results 132 from the content enrichment system 104 and the related content. Namely, if the user disambiguates a recommended annotation that interaction may be tracked or collected in a list of disambiguated annotations and weights 136, if the user rejects a recommended annotation that interaction may be tracked or collected in a list of user rejected annotations and weights 138, if the user adds or creates a new annotation that interaction may be tracked or collected in a list of newly defined annotations and weights 140, and if the user accepts a recommended annotation that interaction may be tracked or collected in a list of user accepted annotations and weights 142.

According to various aspects of the present disclosure, for each document version, the data store system 102 may collect, information including, but not limited to, authored content and supporting assets, a structured graph of how each content element or node element (e.g., heading, paragraphs, bullets, and/or the like) is related to each other, an ordered list by relevancy of raw enrichment results 132 received from the content enrichment system 104 for all node elements, and the author's curation of the raw enrichment results 132 including an ordered list by weight and/or relevancy of user accepted annotations 142 for all the node elements, an ordered list by weight and/or relevancy of rejected annotations 138 for all the node elements, and ordered list by weight and/or relevancy of newly defined annotations 140 (e.g., user-generated annotations not present in the original list of raw enrichment results 132), and an ordered list by weight and/or relevancy of disambiguated annotations 136 for all the node elements. According to various embodiments of the present disclosure all of this information may be recovered and fed to subsequent iterations of the content enrichment system 104 (e.g., CES program(s)) while also being used to extend the canonical training materials (e.g., as training sets, as validation sets, as test sets, and/or the like) that resulting annotations are being derived from.

Content Enrichment System

Figure 1C:
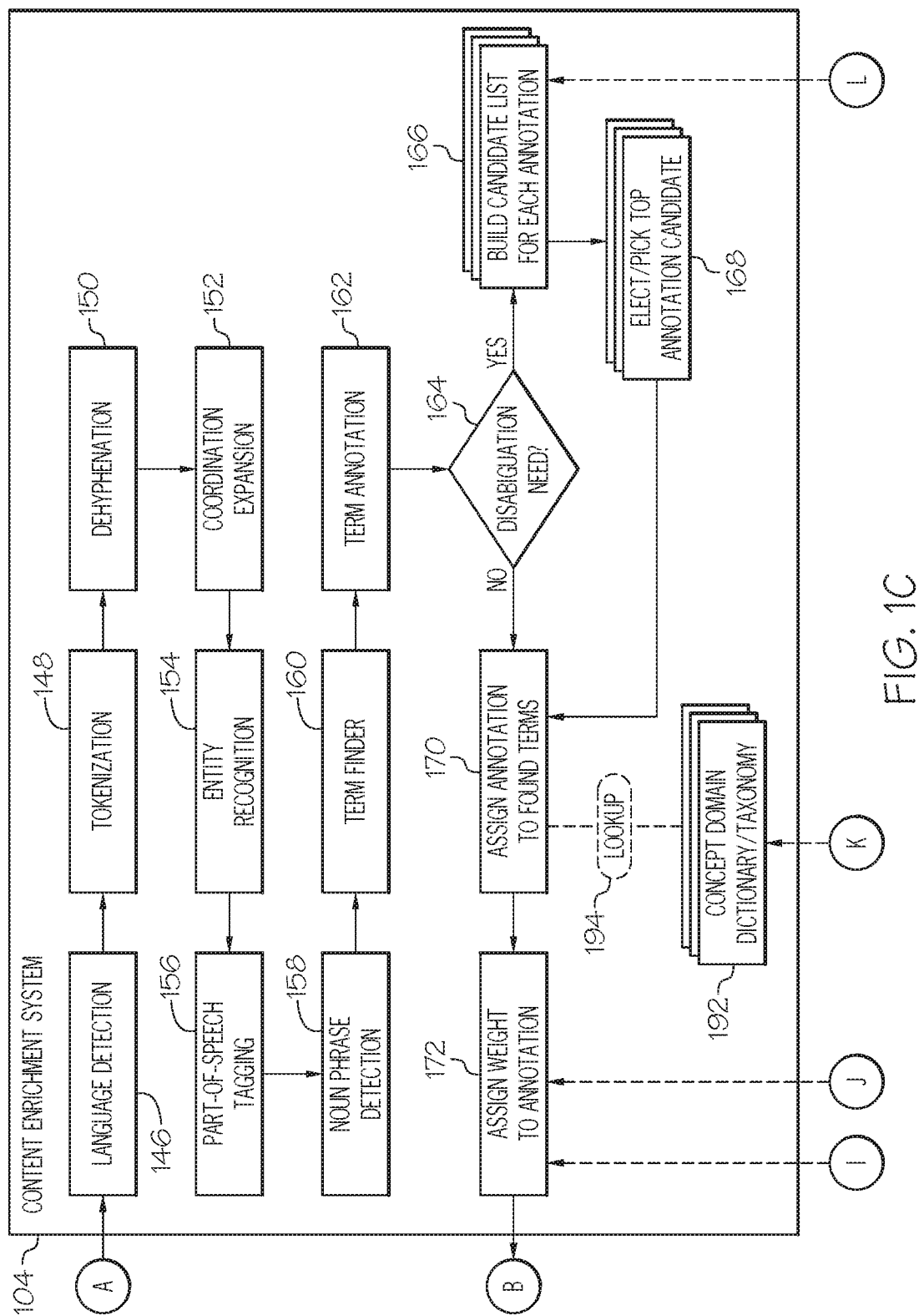
FIG. 1C depicts a block diagram of an illustrative content enrichment system according to one or more embodiments of the present disclosure.

FIG. 1C depicts a block diagram of an illustrative content enrichment system 104 according to one or more embodiments of the present disclosure. According to various embodiments, the content enrichment system 104 may include a set of algorithms and/or methodologies that, when applied to a whole document or a portion of the document (e.g., a subset of text, node elements(s), and/or the like), may return different types of annotations. According to various aspects, the content enrichment system 104 may take a grouping of words and conduct distinctive types of operations/recognitions/detections/classifications (e.g., via machine learning, natural language processing, and/or the like) to extract different types of annotations that match a given dictionary/taxonomy. Details of the content enrichment system 104 algorithms and/or methodologies are beyond the scope of the present disclosure. Example algorithms may be found in U.S. patent application Ser. No. 13/320,308, entitled "Methods and Systems for Knowledge Discovery", now U.S. Patent Application Publication No. 2012/0158400, the entire disclosure of which is hereby incorporated by reference herein. Other example algorithms (e.g., of an Elsevier Fingerprint Engine®, as a non-limiting example) may be used without departing from the spirit and scope of the present disclosure.

Referring to FIG. 1C, each document version 144 is generally received (see pointer A from FIG. 1B to FIG. 1C) by the content enrichment system 104 and generally processed through one or more of a set of algorithms including, but not limited to, a language detection algorithm 146, a tokenization algorithm 148, a dehyphenation algorithm 150, a coordination expansion algorithm 152, an entity recognition algorithm 154, a part-of-speech tagging algorithm 156, a noun phrase detection algorithm 158, a term finder algorithm 160, and a term annotation algorithm 162 to derive a list of recommended annotations associated with terms found in that document version or a portion of that document version (e.g., node element(s)). At block 164, the content enrichment system 104 may determine whether an annotation in the list of recommended annotations needs disambiguation. For example, one problem when annotating a document or a portion of a document is dealing with similar terms (e.g., the term "cell" as in reference to a "room" versus "cell" as in reference to a "small organism") that may have a different semantic meaning due to context, placement, or juxtaposition. If disambiguation is needed, according to aspects of the present disclosure, the content enrichment system 104 may build, at block 166, a candidate list of terms for the annotation needing disambiguation. Such a candidate list may be built based on one or more previous user disambiguation (see pointer L to FIG. 1C from FIG. 1D). According to various aspects, the content enrichment system 104 may elect or pick, at block 168, a top candidate term from the candidate list for the annotation needing disambiguation. The top candidate term may also be elected or picked based on one or more previous user disambiguation. At block 170, when assigning annotations to found terms, the content enrichment system 104 may associate the built candidate list, including the elected or picked top candidate term, with the annotation needing disambiguation.

At block 172, the content enrichment system 104 may assign a weight to the annotation needing disambiguation and then send (see pointer B from FIG. 1C to FIG. 1B) a list of recommended annotations (e.g., including the annotation needing disambiguation) and associated weights 134 to the data store system 102 for presentation (e.g., via the authoring assistance system 106) to the user. More specifically, upon selection of the annotation needing disambiguation, the candidate list (e.g., including the elected or picked top candidate term) associated with the annotation needing disambiguation may be presented to the user (e.g., author) via a user interface (see FIG. 12 discussed herein) on an access device 108a (FIG. 1B) and the user may validate the top candidate term by selecting the top candidate term or reject the top candidate term by selecting a different term from the candidate list. Referring again to FIG. 1C, if no disambiguation is needed, the content enrichment system 104 may assign, at block 170, annotations not needing disambiguation to found terms. According to various aspects, the content enrichment system 104 may assign annotations to found terms by looking up, at block 194, each term in a concept domain dictionary/taxonomy 192. At block 172, the content enrichment system 104 may assign a weight to each annotation not needing disambiguation and then send (see pointer B from FIG. 1C to FIG. 1B) the list of recommended annotations and associated weights 134 to the data store system 102 for presentation to the user. More specifically, the list of recommended annotations may be presented to the user (e.g., author) via a user interface (e.g., FIG. 4, UI tagging pan 402, FIG. 6, UI tagging pane 602, and/or the like) via a display 109a, on an access device 108a (FIG. 1B) for acceptance by the user. According to aspects of the present disclosure, the content enrichment system 104 may order the list of recommended annotations based on the weight (e.g., a relevancy score or the like) associated with each annotation at block 172. According to various aspects, the weight assigned at block 172 indicates a level of confidence for each annotation based on the canonical training materials (e.g., the training set, the validation set, the test set, and/or the like) from which the annotations were derived.

Authoring Assistance System

Figure 1D:
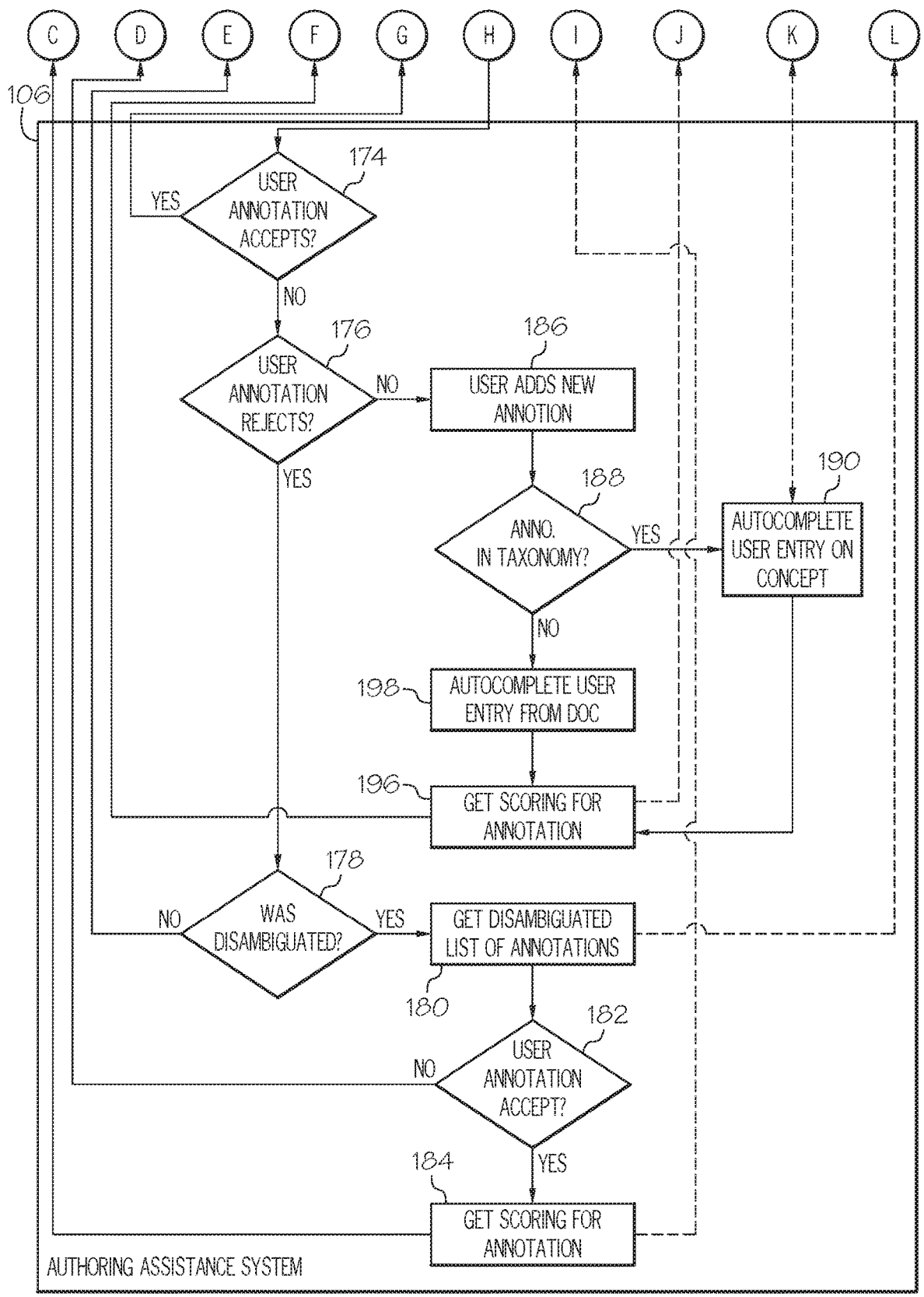
FIG. 1D depicts a block diagram of an illustrative authoring assistance system according to one or more embodiments of the present disclosure.

FIG. 1D depicts a block diagram of an illustrative authoring assistance system 106 according to one or more embodiments of the present disclosure. According to various aspects of the present disclosure, the authoring assistance system 106 may create an interactive authoring environment. According to some aspects, the authoring assistance system 106 may be part of a content creation platform (e.g., Elsa®—an Elsevier® Digital Publishing Platform, as a non-limiting example) where users (e.g., authors, editors, content managers, and/or the like) collaborate on original content projects that can then be "productized" into physical books or any other type of digital product that utilizes the seminal content. According to aspects described herein, the interactive authoring environment, created by the authoring assistance system 106, may focus on writing activities and related types of content creation.

While the interactive authoring environment may include features similar to a text editor (e.g., Microsoft Word, Google Docs, Notepad) the interactive authoring environment of the present disclosure is enhanced with tools and tailored user interfaces, described herein, that permit structured authoring activities and content enrichment tasks. For example, FIG. 1D depicts an illustrative user interface flow to accept, reject and/or disambiguate annotations according to various aspects described herein. In this vein, referring to FIG. 2 according to embodiments of the present disclosure, authoring enrichment activities and connections and/or interactions with the content enrichment system 104 may occur via a tailored user interface (UI) tagging pane 202 integrated within the interactive authoring environment. According to various aspects, users (e.g., authors) may interact with interface elements of the UI tagging pane 202 to accept or reject annotations suggested by the content enrichment system 104 (FIG. 8 as described herein), rate, qualify, and/or order these annotations by relevancy (FIG. 10 as described herein), disambiguate annotations that have different semantic meanings (FIG. 12 as described herein), propose new annotations that were not originally found or present in the original content enrichment system 104 results (FIG. 11 as described herein), and/or the like.

Referring to FIG. 1D, after a user (e.g., author) is presented, via a user interface of an access device 108a (see FIG. 1B), with a list of recommended annotations 134 (see pointer H to FIG. 1D from FIG. 1B), the authoring assistance system 106 of the present disclosure may determine, at block 174, whether the user has accepted any annotation from the list of recommended annotations 134. If the user has accepted one or more annotation, the data store system 102 may update the list of user accepted annotations and weights 142 (see pointer G from FIG. 1D to FIG. 1B). If the user has not accepted one or more annotation, the authoring assistance system 106 may determine, at block 176, whether the user has rejected any annotation from the list of recommended annotations 134.

If the user has rejected one or more annotation, the authoring assistance system 106 may determine, at block 178, whether the user has disambiguated the one or more rejected annotation. If the user has not disambiguated the one or more rejected annotation, the data store system 102 may update the list of user rejected annotations and weights 138 (see pointer E from FIG. 1D to FIG. 1B). If the user has disambiguated the one or more rejected annotation, the authoring assistance system 106 may, at block 180, get a list of disambiguated annotations and determine, at block 182, whether the user has accepted any disambiguated annotation from the list of disambiguated annotations. If the user has not accepted one or more disambiguated annotation, the data store system 102 may update the list of user rejected annotations and weights 138 (see pointer D from FIG. 1D to FIG. 1B). If the user has accepted one or more disambiguated annotation, the authoring assistance system 106 may get/solicit a score, at block 184, for the one or more disambiguated annotation and the data store system 102 may update the list of disambiguated annotations and weights 136 (see pointer C from FIG. 1D to FIG. 1B).

Referring back to block 176 of FIG. 1D, if the user has not rejected any annotation from the list of recommended annotations 134, the user may enter, at block 186, one or more new annotation. At block 188, the authoring assistance system 106 may determine whether the one or more annotation being entered is in one or more associated taxonomy. If the one or more annotation being entered is in the one or more associated taxonomy, the authoring assistance system 106 may, at block 190, autocomplete or attempt to autocomplete the one or more annotation being entered by accessing a concept domain dictionary/taxonomy 192, associated with the content enrichment system 104 (see pointer K from FIG. 1D to FIG. 1C) and may get/solicit a score, at block 196, for the one or more annotation being entered and the data store system 102 may update the list of newly defined annotations and weights 140 (see pointer F from FIG. 1D to FIG. 1B). If the one or more annotation being entered is not in the one or more associated taxonomy, the authoring assistance system 106 may, at block 198, autocomplete or attempt to autocomplete the one or more annotation being entered based on the document (e.g., text) and may get/solicit a score, at block 196, for the one or more annotation being entered and the data store system 102 may update the list of newly defined annotations and weights 140 (see pointer F from FIG. 1D to FIG. 1B). According some aspects, if the one or more annotation being entered is not in the one or more associated taxonomy, the authoring assistance system 106 may, at block 198 autocomplete or attempt to autocomplete the one or more annotation being entered based on the canonical training materials (e.g., the training set, the validation set, the test set, and/or the like) from which the annotations in the one or more associated taxonomy were derived. In such aspects, certain terms may not yet be formally part of the one or more associated taxonomy and/or are in the process of being integrated into the one or more associated taxonomy (e.g., relatively new terms, more recently introduced terms, and/or the like).

Figure 2:
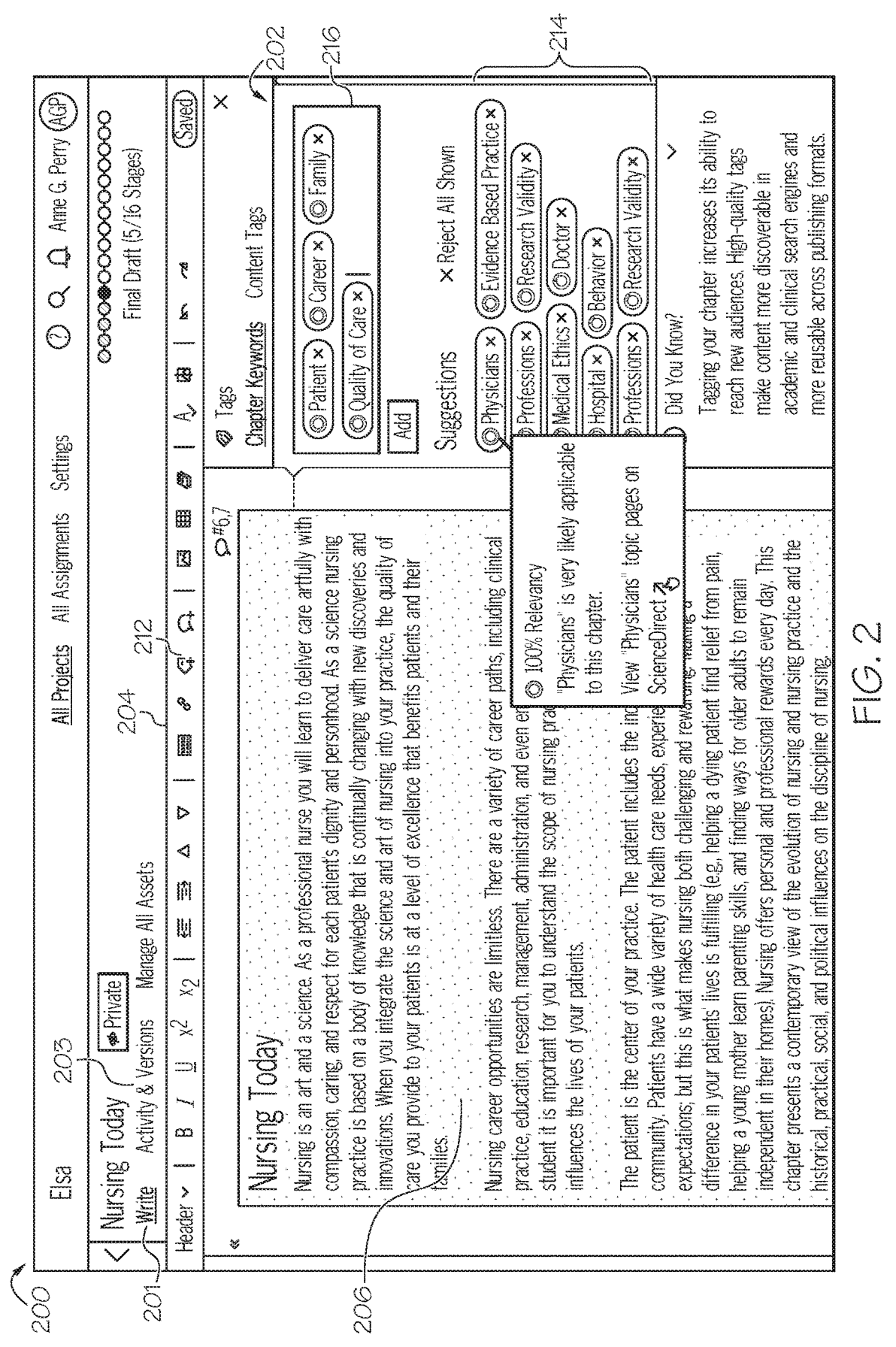

FIG. 2 depicts an illustrative UI tagging pane 202 and an illustrative text editor toolbar 204, including a selectable tagging control element 212, integrated within a content creation UI 200 generated on a display screen (e.g., FIG. 1A, 109a, 109b, 109n) of a plurality of access devices (e.g., FIG. 1A, 108a, 108b, 108n) according to one or more embodiments of the present disclosure. In view of FIG. 2, the content creation user interface 200 may include text editor toolbars having features similar to a text editor (e.g., bold, italic, underline, superscript, subscript, decrease indent, increase indent, undo typing, redo typing, and/or the like) and a text editing workspace 206. The content creation UI 200 is associated with a "Write" tab 201.

FIG. 3 depicts an illustrative content creation UI 300 that integrates one or more tagging control elements to access/enter a UI tagging pane (see FIG. 4, UI tagging pane 402) according to one or more embodiments of the present disclosure. In view of FIG. 3, a first selectable tagging control element 308 may be displayed in a first toolbar 310 (e.g., on a right side of the content creation UI 300). The first selectable tagging control element 308 may provide an alternative way (e.g., to tagging control element 212 as described in FIG. 2) to access/enter a UI tagging pane. According to various embodiments, placement of a cursor over the first selectable tagging control element 308 may provide not only functional insight regarding the first selectable tagging control element 308 but also motivational insight to a user (e.g., "Tag your chapter to increase its reach."). In view of FIG. 3, the first selectable tagging control element 308 may further include a visual cue (e.g., circle in upper right corner, and/or the like) configured to indicate to a user that the content enrichment system 104 has determined annotation(s) (e.g., new annotations) for the content being created. In some aspects the visual cue may include a count indicator (e.g., within the circle) that indicates a current number of annotations (e.g., new annotations) available. According to various aspects, such a count indicator may update (e.g., in real-time, near real time, at a predetermined refresh rate, and/or the like) as the content enrichment system 104 is updated (e.g., via training sets) and/or as the content (e.g., document, node elements, and/or the like) are being edited. Such a visual cue may effectively prompt or encourage the user to select the first selectable tagging control element 308 to add annotations, revisit annotations, and/or review annotations (e.g., to avoid stale annotations as content is changing). The first toolbar 310 may include further selectable control elements (e.g., document tools including print preview, sharing, sending to next workflow stage (e.g., FIG. 14 herein), commenting, and/or the like). According to various aspects, the first selectable tagging control element 308 may be configured to, after selection by a user, cause a UI tagging pane (e.g., UI tagging pane 402) to generate within a portion of (e.g., on the right side) of a content creation user interface (e.g., content creation UI 400).

Chapter Keywords

Figure 4:
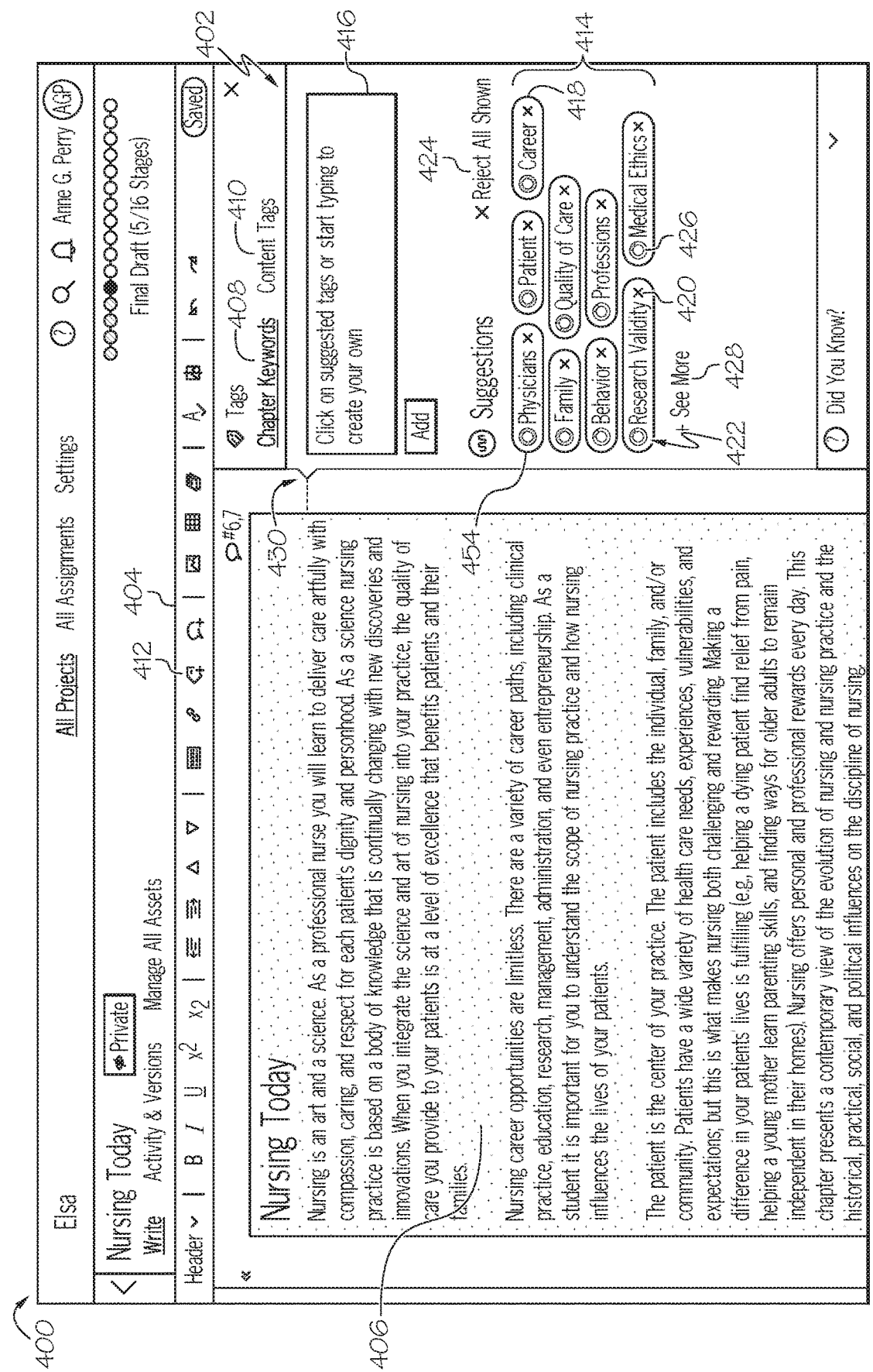
FIG. 4 depicts an illustrative UI tagging pane integrated within a content creation user interface after user selection of a first selectable tagging control element according to one or more embodiments of the present disclosure.

In view of FIG. 4, according to various aspects, the "Chapter Keyword" tab 408 may be selected by default. "Chapter keywords" are classification annotations or terms that apply to a whole document and help to summarize its content (e.g., chapter keywords may be alternatively referred to as "document keywords" or more generally "classifiers"). Chapter keywords do not need to be textually present in the document (e.g., text body) for the content enrichment system 104 to select them for presentation to a user (e.g., author) via a UI tagging pane (e.g., UI tagging pane 402).

FIG. 4 depicts an illustrative UI tagging pane 402 integrated within a content creation UI 400 after user selection of a first selectable tagging control element 308 according to one or more embodiments of the present disclosure. In view of FIG. 4, after selection of the first selectable tagging control element 308 (e.g., FIG. 3) the whole document 406 (e.g., all text, all node elements, and/or the like) may be selected (e.g., highlighted, see FIG. 4, represented via a dot pattern) to visually indicate to the user that each suggested chapter keyword 414 has been suggested based on the whole document 406 (e.g., all text, all node elements, and/or the like). According to various embodiments, a connector feature 430 of the UI tagging pane 402 may connect the UI tagging pane 402 to the selected whole document to visually indicate to the user that each suggested chapter keyword 414 has been suggested based on the whole document 406 (e.g., all text, all node elements, and/or the like).

According to various aspects, a user may enter a chapter keyword in entry box 416 by typing directly into the entry box 416, at any time. In such an aspect, as described above in FIG. 1D, the system 100 of the present disclosure may, via the content enrichment system 104, auto-complete or attempt to auto-complete the chapter keyword as it is being typed based on terms that are part of the current dictionary/taxonomy (e.g., of the content enrichment system 104, of the document itself, and/or the like).

According to other aspects, the user may enter a chapter keyword in entry box 416 by selecting (e.g., via a cursor, a touchscreen, and/or the like) one or more of a plurality of pill-shaped control elements 418, each pill-shaped control element 418 being associated with a suggested chapter keyword 414 (e.g., suggested by the content enrichment system 104) presented in the UI tagging pane 402 (e.g., see FIG. 4, "Physicians", "Patient", "Career", "Family", and/or the like, each associated with a respective pill-shaped control element 418 selectable by the user). It should be appreciated that the plurality of pill-shaped control elements 418 may be a shape other than pill-shaped (e.g., rectangular, polygonal, and/or the like). After one or more pill-shaped control element 418 is selected, the suggested chapter keyword 414 associated with each selected pill-shaped control element 418 may be entered in the entry box 416 (e.g., FIG. 8, chapter keyword "Physicians" in entry box 816).

Referring to FIG. 4, according to various aspects, each pill-shaped control element 418 may expand (e.g., horizontally in the UI tagging pane 402) to fit the textual representation of each suggested chapter keyword 414. According to various aspects the suggested chapter keyword may include a phrase or a series of words (e.g., see FIG. 4, "Quality of Care", "Research Validity", "Medical Ethics", and/or the like). Further, each pill-shaped control element 418 may expand (e.g., horizontally in the UI tagging pane 402) to include a reject chapter keyword control element 420 and rescore chapter keyword control element 422.

According to various aspects, the user may reject one or more particular suggested chapter keyword 414 by selecting (e.g., via a cursor, a touchscreen, and/or the like) the reject chapter keyword control element 420. According to various aspects, the reject chapter keyword control element 420 may be represented in each pill-shaped control element 418 as an "X". Similarly, the UI tagging pane 402 may further include a reject all chapter keywords control element 424. If the suggested chapter keywords 414 displayed in the UI tagging pane 402 are not acceptable, the user may select (e.g., via a cursor, a touchscreen, and/or the like) the reject all chapter keywords control element 424. In such an aspect, the UI tagging pane 402 may be refreshed (e.g., via the content enrichment system 104) with a new and/or different group of suggested chapter keywords 414.

As described above, each pill-shaped control element 418 may include a rescore chapter keyword control element 422. Each rescore chapter keyword control element 422 may include a dual functionality.

As a first functionality, an interface of each rescore chapter keyword control element 422 may present a visual cue that represents a current relevancy score (e.g., a confidence) associated with the chapter keyword (e.g., "Career") textually represented in that pill-shaped control element 418. According to various aspects, each visual cue may include a donut chart 426. Such a donut chart 426 enables a user to immediately assess the relevancy (e.g., as calculated or determined by the content enrichment system 104) of each suggested chapter keyword 414, in context with the other suggested chapter keywords 414, and without having to independently consult with the content enrichment system 104 (e.g., without having to switch to a different user interface). Details regarding the algorithms and/or methodologies utilized by the content enrichment system 104 to calculate and/or determine the relevancy (e.g., relevancy score) are beyond the scope of the present disclosure. Various scoring and/or indexing algorithms (e.g., of an Elsevier Fingerprint Engine®, as a non-limiting example) may be used without departing from the spirit and scope of the present disclosure. According to various aspects, the suggested chapter keywords 414 may be presented in the UI tagging pane 402 and ordered based on each current relevancy score as depicted by each respective donut chart 426 (e.g., see FIG. 4, "Physicians", then "Patient", then "Career", then "Family", then "Quality of Care" and so on). According to various aspects, the suggested chapter keywords 414 may be presented in the UI tagging pane 402 such that the suggested chapter keywords 414 are ordered in a manner similar to the lines of a book (e.g., from a left side of the UI tagging pane 402 to a right side of the UI tagging pane 402 and then down such that left-most and top-most suggested chapter keywords 414 are associated with a higher current relevancy score relative to right-most and bottom-most suggested chapter keywords 414). According to various aspects, only a specified quantity of suggested chapter keywords 414 (e.g., as suggested by the content enrichment system 104) may be presented and ordered (e.g., based on their respective relevancy scores) in the UI tagging pane 402. According to one aspect, only the top ten suggested chapter keywords 414 may be presented and ordered (e.g., based on their respective relevancy scores) in the UI tagging pane 402.

As a second functionality, the interface of each rescore chapter keyword control element 422 may be selectable to modify the current relevancy score (e.g., as determined by the content enrichment system 104) associated with that chapter keyword (e.g., Career) textually represented in that pill-shaped control element 418 to a user-defined relevancy score. Further details regarding the modification of a content enrichment system-determined relevancy score to a user-defined relevancy score is discussed in reference to FIG. 10 herein.

Referring again to FIG. 4, the UI tagging pane 402 may further include a see more control element 428 to see more suggested chapter keywords 414 in the UI tagging pane 402. According to various aspects, the see more control element 428 may be represented in the UI tagging pane 402 with the text "See More" and a plus sign "+". According to various aspects, a user may request more suggested chapter keywords 414 by selecting (e.g., via a cursor, a touchscreen, and/or the like) the see more control element 428. According to various aspects, after selection of the see more control element 428, a next specified quantity of suggested chapter keywords (e.g., as suggested by the content enrichment system 104) may be presented and ordered (e.g., based on their respective relevancy scores) in the UI tagging pane 402. According to one aspect, a next ten suggested chapter keywords 414 may be presented and ordered (e.g., based on their respective relevancy scores) in the UI tagging pane 402.

Content Tags

"Content tags" are terms that apply to a specific node element or a specific group of node elements within a whole document rather than the whole document itself. A node element may include a header, a paragraph, a bullet list, a figure, a table, an image, a video, and/or the like of a document. According to various aspects, a node element(s) including a header, paragraph, a bullet list, and/or the like may be referred to as text node element. According to further aspects, a node element(s) including a figure, a table, an image, a video, a formula, and/or the like may be referred to as an asset node element. Content tags help to detect key entities and/or concepts that are related to content present in each specific node element or each specific group of node elements (e.g., content tags may alternatively be referred to as "entity tags" or "concept tags"). Unlike chapter keywords, either the content tag itself or a synonym of that content tag is textually present in the original text. In one aspect, the content tag itself or the synonym of that content tag is textually present somewhere in the document. According to another aspect, the content tag itself or the synonym of that content tag is textually present somewhere in the specified node element or the specified group of node elements. The content enrichment system 104 of the present disclosure may detect such content tags and/or derive synonyms of detected content tags to provide suggested content tags, as described herein.

Content Tags via a Content Tags Tab

According to various embodiments, a user may associate one or more content tag to a node element or a group of node elements after selecting the "Content Tags" tab 410 within the UI tagging pane 402 of FIG. 4. FIG. 5 depicts an illustrative UI tagging pane 502 integrated within a content creation UI 500 after user selection of a "Content Tags" tab (see FIG. 4, "Content Tags" tab 410). It should be appreciated that the user may select the "Chapter Keywords" tab 508 of FIG. 5 to navigate back to the UI tagging pane 402 of FIG. 4 when desired.

Referring to FIG. 5, because a document may have a plurality of node elements (e.g., headers, paragraphs, bullet lists, figures, tables, images, particular sentences, and/or the like), the UI tagging pane 502 of FIG. 5 may be configured to identify all node elements within a document and to enable a user to navigate between the identified node elements within a document. According to various aspects, the UI tagging pane 502 may: display a list of all of the identified node elements, may display a list of only node elements identified as not having any content tag associated therewith, may display a list of only node elements identified as having a content tag(s) associated therewith, and/or the like. According to various aspects, the list may include a short excerpt for each identified node element (e.g., node element 532 associated with a header "Historical Highlights", node element 534 associated with a paragraph starting with "Nursing is an art and a science. As a professional nurse you will learn . . . ", node element 536 associated with a particular sentence "The International Council of Nurses (ICN 2010) has another definition: Nursing encom . . . ", node element 538 associated with a figure "FIG. 2: Providing Nursing Services, and/or the like). In addition, referring to FIG. 5, the UI tagging pane 502 may track a count of content tags accepted for each node element via content tag count indicators (e.g., content tag count indicator 542 indicates that node element 532 includes five (5) content tags, content tag count indicator 544 indicates that node element 534 includes four (4) content tags, content tag count indicator 548 indicates that node element 538 includes three (3) content tags, and/or the like). Similarly, each node element (e.g., node element 534) may be associated with a content tag count indicator within the content creation UI 500 (e.g., content tag count indicator 544' at top right corner of the node element). If a node element is not yet associated with a content tag, a content tag count indicator may not be visible within the content creation UI 500. According to various aspects, after a user selects (e.g., single click) a node element (e.g., node element 532, 534, 536 and/or 538) from the UI tagging pane 502 list, the content tag count indicators (e.g., 542, 544, 544', 548) may be updated to reflect a current count of content tags. According to an alternative aspect, the content tag count indicators (e.g., 542, 544, 544', 548) may be updated as new content tags are added (e.g., in real time, near real time, at a predetermined refresh rate, and/or the like).

According to various aspects, after user selection (e.g., double click) of a node element (e.g., node element 532, 534, 536 and/or 538) or a group of node elements from the provided list, a UI tagging pane (e.g., UI tagging pane 602 of FIG. 6, UI tagging pane 702 of FIG. 7) may generate within the content creation user interface (e.g., content creation UI 600, content creation UI 700, respectively). According to various aspects, if the selected node element or group of node elements is a text node element (e.g., node element 534) selecting the node element or the group of node elements may send text associated with the selected node element or group of node elements to the content enrichment system 104 which returns suggested content tags 614 for presentation in the UI tagging pane 602 of FIG. 6. According to other aspects, if the selected node element or group of node elements is an asset node element (e.g., node element 538) selecting the node element or the group of node elements may send sibling text nodes located before and after each asset node element and any text contained within each asset node element itself (e.g., titles, captions, and/or the like) to the content enrichment system 104 which returns suggested content tags 714 for presentation in the UI tagging pane 702 of FIG. 7.

According to various aspects, if a node element has already been associated with one or more content tags by the user (e.g., see FIG. 5, content tag count indicator 548 indicates that node element 538 has been associated with three (3) content tags) those content tags may be automatically populated in an entry box (e.g., entry boxy 616 of UI tagging pane 602, entry box 716 of the UI tagging pane 702). For example, FIG. 7 depicts an illustrative UI tagging pane 702 integrated within a content creation UI 700 after user selection of an asset node element (e.g., node element 538 in the UI tagging pane 502 of FIG. 5). In view of content tag count indicator 548' associated with node element 538 within the content creation UI 700 (e.g., versus content tag count indicator 548 in FIG. 5), one (1) content tag has been entered via the UI tagging pane 702, while the three (3) other content tags were automatically populated in entry box 716 of the UI tagging pane 702.

Figure 6:
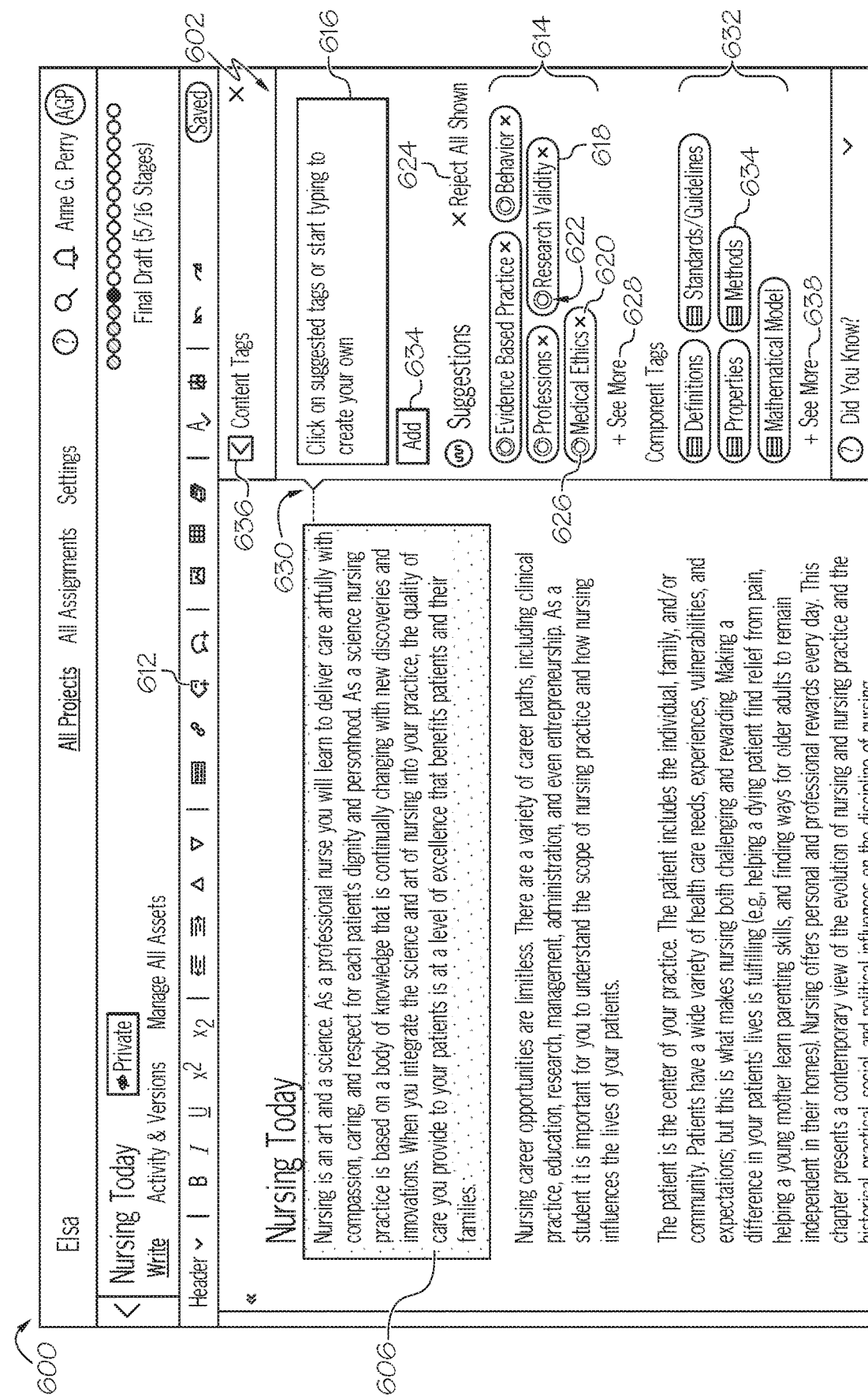
FIG. 6 depicts an illustrative UI tagging pane integrated within a content creation user interface after user selection of a text node element according to one or more embodiments of the present disclosure.

Referring to FIGS. 6 and 7, the user may enter suggested content tags 614, 714 into entry box 616, 716 respectively, as described above. According to various aspects, the user may click an "add" control element 634, 734 to confirm acceptance of entered content tags to the data store system 102. The user may then navigate back to the list of identified node elements in UI tagging pane 502 of FIG. 5 by selecting a "back" control element 636, 736.

Content Tags via a Second Selectable Tagging Control Element

Referring back to FIG. 4, according to further embodiments, a user may associate one or more content tag to a node element or a group of node elements after selecting a second selectable tagging control element 412 displayed in a text editor toolbar 404 of FIG. 4. According to various aspects, if the user has not yet selected (e.g., via a cursor, a touchscreen and/or the like) a node element or a group of node elements, the UI tagging pane 502 of FIG. 5 may be integrated within the content creation user interface after user selection of the second selectable tagging control element 412 (e.g., FIG. 4). The UI tagging pane 502 may be configured to identify node elements within a document and to enable a user to navigate between the identified node elements within a document, as described above. According to alternative aspects, the second selectable tagging control element 412 of the content creation UI 400 may not be selectable (e.g., may be grayed out) by a user until the user has selected (e.g., via a cursor, a touchscreen, and/or the like) a specific node element (e.g., a header, a paragraph, a bullet list, a figure, a table, an image, a video, a particular sentence, and/or the like) or a specific group of node elements in the document (e.g., within the content creation UI 400). In such an aspect, once a specific node element or a specific group of node elements has been selected (e.g., highlighted), the second selectable tagging control element 412 may become selectable. According to the various aspects, the second selectable tagging control element 412 may be configured to, after selection by a user, cause a UI tagging pane (e.g., UI tagging pane 602 of FIG. 6, UI tagging pane 702 of FIG. 7) to generate within the content creation user interface (e.g., content creation UI 600, content creation UI 700). According to various aspects, if the selected node element or group of node elements is a text node element (e.g., a header, a paragraph, a bullet list, and/or the like) selecting the node element or the group of node elements may send text associated with the selected node element or group of node elements to the content enrichment system 104 which returns suggested content tags 614 for presentation in the UI tagging pane 602 of FIG. 6. According to other aspects, if the selected node element or group of node elements is an asset node element (e.g., a figure, a table, an image, a video, an formula, and/or the like) selecting the node element or the group of node elements may send sibling text nodes located before and after each asset node element and any text contained within each asset node element itself (e.g., titles, captions, and/or the like) to the content enrichment system 104 which returns suggested content tags 714 for presentation in the UI tagging pane 702 of FIG. 7.

Again, according to various aspects, if a node element has already been associated with one or more content tags by the user (e.g., see FIG. 5, content tag count indicator 548 indicates that node element 538 has been associated with three (3) content tags) those content tags may be automatically populated in an entry box (e.g., entry boxy 616 of UI tagging pane 602, entry box 716 of the UI tagging pane 702). For example, FIG. 7 depicts an illustrative UI tagging pane 702 integrated within a content creation UI 700 after user selection of an asset node element (e.g., node element 538 in the UI tagging pane 502 of FIG. 5). In view of content tag count indicator 548' associated with node element 538 within the content creation UI 700 (e.g., versus content tag count indicator 548 in FIG. 5), one (1) content tag has been entered via the UI tagging pane 702, while the three (3) other content tags were automatically populated in entry box 716 of the UI tagging pane 702.

Again, referring to FIGS. 6 and 7, the user may enter suggested content tags 614, 714 into entry box 616, 716 as described. According to various aspects, the user may click an "add" control element 634, 734 to confirm acceptance of entered content tags to the data store system 102. The user may then navigate back to the list of identified node elements in UI tagging pane 502 of FIG. 5 by selecting a "back" control element 636, 736.

FIG. 6 depicts an illustrative UI tagging pane 602 ultimately integrated within a content creation UI 600 after user selection of a "Content Tags" tab (see FIG. 4, "Content Tags" tab 410) or a second selectable tagging control element (see FIG. 4, second selectable tagging control element 412) and user selection of a particular node element or a particular group of node elements (e.g., via a cursor, a touchscreen and/or the like in the content creation UI 400 of FIG. 4, the UI tagging pane 502 of FIG. 5, and/or the like) according to one or more embodiments of the present disclosure. Referring to FIG. 6, a particular node element (e.g., text node element 606) has been selected (e.g., highlighted, see FIG. 6, represented via a dot pattern) to visually indicate to the user that each suggested content tag 614 has been suggested based on that particular node element (e.g., text node element 606). According to various embodiments, a connector feature 630 of the UI tagging pane 602 may connect the UI tagging pane 602 to the selected node element (e.g., text node element 606) or group of node elements to visually indicate to the user that one or more suggested content tags 614 have been suggested based on that node element or that group of node elements. Similarly, in FIG. 7, a particular node element (e.g., asset node element 706) has been selected (e.g., highlighted, see FIG. 7, represented via a dot pattern) to visually indicate to the user that each suggested content tag 714 has been suggested based on that particular node element (e.g., asset node element 706). According to various embodiments, a connector feature 730 of the UI tagging pane 702 may connect the UI tagging pane 702 to the selected node element (e.g., asset node element 706) or group of node elements to visually indicate to the user that one or more suggested content tags 714 have been suggested based on that node element or that group of node elements.

Referring again to FIGS. 6 and 7, according to various aspects, a user may enter a content tag in entry box 616, 716 by typing directly into the entry box 616, 716, at any time. In view of FIG. 7, upon user interaction with entry box 716, a cursor may appear. Here, according to various aspects, an annotation entered via the entry box 616, 716 may be designated as a content tag by default. According to alternative aspects, an annotation entered via the entry box 616, 716 may be analyzed by the content enrichment system 104 and be automatically designated as a content tag. In such an aspect, the system 100 of the present disclosure may, via the content enrichment system 104, auto-complete or attempt to auto-complete the content tag as it is being typed based on terms that are part of the current dictionary/taxonomy. According some aspects, if the content tag being typed is not in the current dictionary/taxonomy, the system 100 of the present disclosure may, via the content enrichment system 104, auto-complete or attempt to auto-complete the content tag as it is being typed based on the canonical training materials (e.g., the training set, the validation set, the test set, and/or the like) from which the content tags in the current dictionary/taxonomy were derived. In such aspects, certain terms may not yet be formally part of the current dictionary/taxonomy and/or are in the process of being integrated into the current dictionary/taxonomy (e.g., relatively new terms, more recently introduced terms, and/or the like). With respect to content tags, the system 100 of the present disclosure may autocomplete or attempt to autocomplete based on text within the node element/the group of node elements/the document or a synonym of text within the node element/the group of node elements/the document.

According to other aspects, the user may enter a content tag in entry box 616, 716 by selecting (e.g., via a cursor, a touchscreen, and/or the like) one or more of a plurality of pill-shaped control elements 618, 718, each pill-shaped control element 618, 718 being associated with a suggested content tag 614, 714 (e.g., suggested by the content enrichment system 104) presented in the UI tagging pane 602, 702 (e.g., see FIG. 6, "Evidence Based Practice", "Behavior", "Professions", and/or the like, each associated with a respective pill-shaped control element 618 selectable by the user, see also FIG. 7, "Quality of Care", "Behavior", "Professions", "Research Validity", "Medical Ethics" and/or the like, each associated with a respective pill-shaped control element 718 selectable by the user). It should be appreciated that the plurality of pill-shaped control elements 618, 718 may be a shape other than pill-shaped (e.g., rectangular, polygonal, and/or the like). After one or more pill-shaped control element 618, 718 is selected, the suggested content tag 614, 714 associated with each selected pill-shaped control element 618, 718 may be entered in the entry box 616, 716 (e.g., see FIG. 7, "Physicians", "Patient", "Career" and "Family" in entry box 716).

Referring to FIGS. 6 and 7, according to various aspects, each pill-shaped control element 618, 718 may expand (e.g., horizontally in the UI tagging pane 602, 702) to fit the textual representation of each suggested content tag 614, 714. According to various aspects the suggested content tag may include a phrase or a series of words (e.g., see FIG. 6, "Evidence Based Practice", "Research Validity", "Medical Ethics", and/or the like, see also FIG. 7, "Quality of Care", "Research Validity", "Medical Ethics", and/or the like). Further, each pill-shaped control element 618, 718 may expand (e.g., horizontally in the UI tagging pane 602, 702) to include a reject content tag control element 620, 720 and rescore content tag control element 622, 722.

According to various aspects, the user may reject one or more particular suggested content tag 614, 714 by selecting (e.g., via a cursor, a touchscreen, and/or the like) the reject content tag control element 620, 720. According to various aspects, the reject content tag control element 620, 720 may be represented in each pill-shaped control element 618, 718 as an "X". Similarly, the UI tagging pane 602, 702 may further include a reject all content tags control element 624, 724. If the suggested content tags 614, 714 displayed in the UI tagging pane 602, 702 are not acceptable, the user may select (e.g., via a cursor, a touchscreen, and/or the like) the reject all content tags control element 624, 724. In such an aspect, the UI tagging pane 602, 702 may be refreshed (e.g., via the content enrichment system 104) with a new and/or different group of suggested content tags 614, 714.

As described above, each pill-shaped control element 618, 718 may include a rescore content tag control element 622, 722. Each rescore content tag control element 622, 722 may include a dual functionality as described herein.

As a first functionality, an interface of each rescore content tag control element 622, 722 may present a visual cue that represents a current relevancy score (e.g., a confidence) associated with the content tag (e.g., "Research Validity") textually represented in that pill-shaped control element 618, 718. According to various aspects, each visual cue may include a donut chart 626, 726. Such a donut chart 626, 726 enables a user to immediately assess the relevancy (e.g., as calculated or determined by the content enrichment system 104) of each suggested content tag 614, 714 in context with the other suggested content tags 614, 714 and without having to independently consult with the content enrichment system 104 (e.g., without having to switch to a different user interface). Details regarding the algorithms and/or methodologies utilized by the content enrichment system 104 to calculate and/or determine the relevancy (e.g., relevancy score) are beyond the scope of the present disclosure. Various scoring and/or indexing algorithms (e.g., of an Elsevier Fingerprint Engine®, as a non-limiting example) may be used without departing from the spirit and scope of the present disclosure. According to various aspects, the suggested content tags 614, 714 may be presented in the UI tagging pane 602, 702 and ordered based on each current relevancy score as depicted by each respective donut chart 626, 726 (e.g., see FIG. 6, "Evidence Based Practice", then "Behavior", then "Professions", then "Research Validity", then "Medical Ethics" and so on, see also FIG. 7, "Quality of Care", then "Behavior", then "Professions", then "Research Validity", then "Medical Ethics" and so on).

According to various aspects, the suggested content tags 614, 714 may be presented in the UI tagging pane 602, 702 such that the suggested content tags 614, 714 are ordered in a manner similar to the lines of a book (e.g., from a left side of the UI tagging pane 602, 702 to a right side of the UI tagging pane 602, 702 and then down such that left-most and top-most suggested content tags 614, 714 are associated with a higher current relevancy score relative to right-most and bottom-most suggested content tags 614, 714). According to various aspects, only a specified quantity of suggested content tags 614, 714 (e.g., as suggested by the content enrichment system 104) may be presented and ordered (e.g., based on their respective relevancy scores) in the UI tagging pane 602, 702. According to one aspect, only the top ten suggested content tags 614, 714 may be presented and ordered (e.g., based on their respective relevancy scores) in the UI tagging pane 602, 702.

As a second functionality, the interface of each rescore content tag control element 622, 722 may be selectable to modify the current relevancy score (e.g., as determined by the content enrichment system 104) associated with that content tag (e.g., "Research Validity") textually represented in that pill-shaped control element 618, 718 to a user-defined relevancy score. Further details regarding the modification of a content enrichment system-determined relevancy score to a user-defined relevancy score is discussed in reference to FIG. 12 herein.

Referring again to FIGS. 6 and 7, the UI tagging pane 602, 702 may further include a see more control element 628, 728 to see more suggested content tags 614, 714 in the UI tagging pane 602, 702. According to various aspects, the see more control element 628, 728 may be represented in the UI tagging pane 602, 702 with the text "See More" and a plus sign "+". According to various aspects, a user may request more suggested content tags 614, 714 by selecting (e.g., via a cursor, a touchscreen, and/or the like) the see more control element 628, 728. According to various aspects, after selection of the see more control element 628, 728, a next specified quantity of suggested content tags (e.g., as suggested by the content enrichment system 104) may be presented and ordered (e.g., based on their respective relevancy scores) in the UI tagging pane 602, 702. According to one aspect, a next ten suggested content tags 614, 714 may be presented and ordered (e.g., based on their respective relevancy scores) in the UI tagging pane 602, 702.

Component Tags

According to various embodiments, a user may also associate one or more component tags to a node element or a group of node elements. A "component tag" is a term or annotation that applies to a node element or a group of node elements that assists in defining a semantic structure of that node element or that group of node elements (e.g., a component tag may be alternatively referred to as a "semantic component tag"). According to various aspects, a component tag may describe a role of the content present in the node element or the group of node elements. A component tag may or may not be textually present in the original text. In one aspect, the component tag may not be textually present anywhere in the document. According to another aspect, the component tag may not be textually present in the particular node element or the particular group of node elements. The content enrichment system 104 of the present disclosure may detect such component tags to provide suggested component tags, as described herein.

Example component tags may include, but are not limited to: "Learning Objective", "Definition", "Concept Definition", "Dataset", "Principle", "Conceptual Model", "Theoretical Model", "Computer Model", "Computational Model", "Mathematical Model", "Material", "Property", "Protocol", "Technique", "Method", "Recipe", "Warning", "Risk", "Standard", "Guideline", "Regulatory Information", "Recommendation", "Competency Measurement", and/or the like. According to further aspects, the content enrichment system 104 may not only detect such component tags but also provide more granular, suggested component tags. For example, beyond suggesting "Protocol", "Technique", and/or "Method", the content enrichment system 104 may pinpoint an actual "Protocol Name", "Technique Name", and/or "Method Name".

Component Tags via a Content Tags Tab

According to various embodiments, a user may associate one or more component tag to a node element or a group of node elements after selecting the "Content Tags" tab 410 within the UI tagging pane 402 of FIG. 4. As discussed herein, FIG. 5 depicts an illustrative UI tagging pane 502 integrated within a content creation UI 500 after user selection of a "Content Tags" tab (see FIG. 4, "Content Tags" tab 410). It should be appreciated that the user may select the "Chapter Keywords" tab 508 of FIG. 5 to navigate back to the UI tagging pane 402 of FIG. 4 when desired.

As described herein, because a document may have a plurality of node elements (e.g., headers, paragraphs, bullet lists, figures, tables, images, particular sentences, and/or the like) the UI tagging pane 502 of FIG. 5 may be configured to identify node elements within a document and to enable a user to navigate between the identified node elements within a document. Referring to FIG. 5, the UI tagging pane 502 may track a count of component tags accepted for each node element via a component tag count indicator 550 (e.g., component tag count indicator 550 indicates that node element 534 includes one (1) component tag). Such a component tag count indicator 550 may be visually distinguishable from a content tag count indicator (e.g., content tag count indicator 544) in both the UI tagging pane 502 and the content creation UI 500. Similarly, each node element (e.g., node element 534) may be associated with a component tag count indicator 550' within the content creation UI 500 (e.g., component tag count indicator 550' at top right corner of the node element). If a node element is not yet associated with a component tag, a component tag count indicator may not be visible within the content creation UI 500. According to various aspects, after a user selects (e.g., single click) a node element (e.g., node element 532, 534, 536 and/or 538) from the UI tagging pane 502 list, the component tag count indicators (e.g., 550, 550', and/or the like) may be updated to reflect a current count of component tags. According to an alternative aspect, the component tag count indicators (e.g., 550, 550', and/or the like) may be updated as new component tags are added (e.g., in real time, near real time, at a predetermined refresh rate, and/or the like).

According to various aspects, after user selection (e.g., double click) of a node element (e.g., node element 532, 534, 536 and/or 538) or a group of node elements (e.g., holding "Ctrl" on a keyboard of a user access device 108a and clicking multiple node elements via a mouse of the user access device 108a) from the provided list, a UI tagging pane (e.g., UI tagging pane 602 of FIG. 6, UI tagging pane 702 of FIG. 7) may generate within the content creation user interface (e.g., content creation UI 600, content creation UI 700 respectively). According to various aspects, if the selected node element or group of node elements is a text node element (e.g., node element 534) selecting the node element or the group of node elements may send text associated with the selected node element or group of node elements to the content enrichment system 104 which returns suggested component tags 632 for presentation in the UI tagging pane 602 of FIG. 6. According to other aspects, if the selected node element or group of node elements is an asset node element (e.g., node element 538) selecting the node element or the group of node elements may send sibling text nodes located before and after each asset node element and any text contained within each asset node element itself (e.g., titles, captions, and/or the like) to the content enrichment system 104 which returns suggested component tags 732 for presentation in the UI tagging pane 702 of FIG. 7.

According to various aspects, if a node element has already been associated with one or more component tags by the user (e.g., see FIG. 5, component tag count indicator 550 indicates that node element 534 has been associated with one (1) component tag) those component tags may be automatically populated in an entry box (e.g., entry boxy 616 of UI tagging pane 602, entry box 716 of the UI tagging pane 702) in a manner similar to that as described with content tags herein.

Referring to FIGS. 6 and 7, the user may enter suggested component tags 632, 732 into entry box 616, 716 respectively. For example, FIG. 7 depicts an illustrative UI tagging pane 702 integrated within a content creation UI 700 after user selection of an asset node element (e.g., node element 538 in the UI tagging pane 502 of FIG. 5). In view of component tag count indicator 552' associated with node element 538 within the content creation UI 700 (e.g., versus no component tag count indicator being associated with node element 538 in FIG. 5), one (1) component tag (e.g., "Definition") has been entered via the UI tagging pane 702 into entry box 716. According to various aspects, the user may click an "add" control element 634, 734 to confirm acceptance of entered component tags to the data store system 102. The user may then navigate back to the list of identified node elements in UI tagging pane 502 of FIG. 5 by selecting a "back" control element 636, 736.

Component Tags via a Second Selectable Tagging Control Element

Referring back to FIG. 4, according to further embodiments, a user may associate one or more component tag to a node element or a group of node elements after selecting a second selectable tagging control element 412 displayed in a text editor toolbar 404 of FIG. 4. As discussed herein, if the user has not yet selected (e.g., via a cursor, a touchscreen and/or the like) a node element or a group of node elements, the UI tagging pane 502 of FIG. 5 may be integrated within the content creation user interface after user selection of the second selectable tagging control element 412 (e.g., FIG. 4). As described, the UI tagging pane 502 may be configured to identify node elements within a document and to enable a user to navigate between the identified node elements within a document. As further discussed herein, according to alternative aspects, the second selectable tagging control element 412 of the content creation UI 400 may not be selectable (e.g., may be grayed out) by a user until the user has selected (e.g., via a cursor, a touchscreen, and/or the like) a specific node element (e.g., a header, a paragraph, a bullet list, a figure, a table, an image, a video, a particular sentence, and/or the like) or a specific group of node elements in the document (e.g., within the content creation UI 400). In such an aspect, once a specific node element or a specific group of node elements has been selected (e.g., highlighted), the second selectable tagging control element 412 may become selectable. As described, according to the various aspects, the second selectable tagging control element 412 may be configured to, after selection by a user, cause a UI tagging pane (e.g., UI tagging pane 602 of FIG. 6, UI tagging pane 702 of FIG. 7) to generate within the content creation user interface (e.g., content creation UI 600, content creation UI 700). According to various aspects, if the selected node element or group of node elements is a text node element (e.g., a header, a paragraph, a bullet list, and/or the like) selecting the node element or the group of node elements may send text associated with the selected node element or group of node elements to the content enrichment system 104 which returns suggested component tags 632 for presentation in the UI tagging pane 602 of FIG. 6. According to other aspects, if the selected node element or group of node elements is an asset node element (e.g., a figure, a table, an image, a video, an formula, and/or the like) selecting the node element or the group of node elements may send sibling text nodes located before and after each asset node element and any text contained within each asset node element itself (e.g., titles, captions, and/or the like) to the content enrichment system 104 which returns suggested component tags 732 for presentation in the UI tagging pane 702 of FIG. 7.

Again, according to various aspects, if a node element has already been associated with one or more component tags by the user (e.g., see FIG. 5, component tag count indicator 550 indicates that node element 534 has been associated with one (1) component tag) those component tags may be automatically populated in an entry box (e.g., entry boxy 616 of UI tagging pane 602, entry box 716 of the UI tagging pane 702) in a manner similar to that as described with content tags herein.

Referring again to FIGS. 6 and 7, the user may then enter suggested component tags 632, 732 into entry box 616, 716 as described more fully below. According to various aspects, the user may click an "add" control element 634, 734 to confirm acceptance of entered component tags to the data store system 102. The user may then navigate back to the list of identified node elements in UI tagging pane 502 of FIG. 5 by selecting a "back" control element 636, 736.

FIG. 6 depicts an illustrative UI tagging pane 602 ultimately integrated within a content creation UI 600 after user selection of a "Content Tags" tab (see FIG. 4, "Content Tags" tab 410) or a second selectable tagging control element (see FIG. 4, second selectable tagging control element 412) and user selection of a particular node element or a particular group of node elements (e.g., via a cursor, a touchscreen and/or the like in the content creation UI 400 of FIG. 4, the UI tagging pane 502 of FIG. 5, and/or the like) according to one or more embodiments of the present disclosure. Referring to FIG. 6, a particular node element (e.g., text node element 606) has been selected (e.g., highlighted, see FIG. 6, represented via a dot pattern) to visually indicate to the user that each suggested component tag 632 (e.g., "Definitions", "Standards/Guidelines", "Properties", "Methods", "Mathematical Model", and/or the like) has been suggested based on that particular node element (e.g., text node element 606). As previously discussed herein, a connector feature 630 of the UI tagging pane 602 may connect the UI tagging pane 602 to the selected node element (e.g., text node element 606) or group of node elements to visually indicate to the user that one or more suggested component tags 632 have been suggested based on that node element or that group of node elements. Similarly, referring to FIG. 7, a particular node element (e.g., asset node element 706) has been selected (e.g., highlighted, see FIG. 7, represented via a dot pattern) to visually indicate to the user that each suggested component tag 732 (e.g., "Learning Objective", "Competency Measurement", and/or the like) has been suggested based on that particular node element (e.g., asset node element 706). As discussed herein, a connector feature 730 of the UI tagging pane 702 may connect the UI tagging pane 702 to the selected node element (e.g., asset node element 706) or group of node elements to visually indicate to the user that one or more suggested component tags 734 have been suggested based on that node element or that group of node elements.

Referring again to FIGS. 6 and 7, according to various aspects, a user may enter a component tag in entry box 616, 716 by typing directly into the entry box 616, 716, at any time. In view of FIG. 7, upon user interaction with entry box 716, a cursor may appear. Here, according to various aspects, an annotation entered via the entry box 616, 716 may be designated as a content tag by default. In such aspects, the user may select (e.g., right-click) an entered annotation to designate the entered annotation as a component tag. According to alternative aspects, an annotation entered via the entry box 616, 717 may be analyzed by the content enrichment system 104 and be automatically designated as a component tag. In such an aspect, the system 100 of the present disclosure may, via the content enrichment system 104, auto-complete or attempt to auto-complete the component tag as it is being typed based on terms that are part of a custom list of component tags. According to various aspects, such a custom list may be provided by one or more content managers or the content enrichment system 104.

According to other aspects, the user may enter a component tag in entry box 616, 716 by selecting (e.g., via a cursor, a touchscreen, and/or the like) one or more of a plurality of pill-shaped control elements 634, 734, each pill-shaped control element 634, 734 being associated with a suggested component tag 632, 732 (e.g., suggested by the content enrichment system 104) presented in the UI tagging pane 602, 702 (e.g., see FIG. 6, "Methods" associated with a respective pill-shaped control element 634 selectable by the user, see also FIG. 7, "Competency Measurement" associated with a respective pill-shaped control element 734 selectable by the user). It should be appreciated that the plurality of pill-shaped control elements 634, 734 may be a shape other than pill-shaped (e.g., rectangular, polygonal, and/or the like). After one or more pill-shaped control element 634, 734 is selected, the suggested component tag 632, 732 associated with each selected pill-shaped control element 618, 718 may be entered in the entry box 616, 716 (e.g., see FIG. 7, "Definition" in entry box 716).

Referring to FIGS. 6 and 7, according to various aspects, each pill-shaped control element 634, 734 may expand (e.g., horizontally in the UI tagging pane 602, 702) to fit the textual representation of each suggested component tag 632, 732. According to various aspects the suggested component tag may include a phrase or a series of words (e.g., see FIG. 6, "Standards/Guidelines", "Mathematical Model", and/or the like, see also FIG. 7, "Learning Objective", "Competency Measurement", and/or the like). In some aspects, when the suggested component tag is a more granular component tag, a described herein, the pill-shaped control element 634, 734 may expand to fit the more granular component tag (e.g., "Protocol: Protocol Name", "Technique: Technique Name", "Method: Method Name" or "Protocol Name: Protocol" or "Technique Name: Technique", "Method Name: Method", and/or the like). In other aspects, the component tag indicator (e.g., three-bar stack associated with each textual representation of each suggested component tag) may be distinguished. For example, a first bar of the three-bar stack may be shaded for a Protocol and be associated with the "Protocol Name", a second bar of the three-bar stack may be shaded for Technique and be associated with the "Technique Name", a third bar of the three-bar stack may be shaded for a Method and be associated with the "Method Name", and/or the like. However, unlike as described with respect to content tags, each pill-shaped control element 634, 734 associated with a component tag may not expand (e.g., horizontally in the UI tagging pane 602, 702) to include a reject component tag control element and/or a rescore component tag control element. According to alternative aspects, each pill-shaped control element 634, 734 associated with each component tag may expand (e.g., horizontally in the UI tagging pane 602, 702) to include a reject component tag control element and/or a rescore component tag control element which function in a manner as described with respect to chapter keywords and content tags herein.

Referring again to FIG. 6, the UI tagging pane 602 may further include a see more control element 638 to see more suggested component tags 632 in the UI tagging pane 602. According to various aspects, the see more control element 638 may be represented in the UI tagging pane 602 with the text "See More" and a plus sign "+". According to various aspects, a user may request more suggested component tags 632 by selecting (e.g., via a cursor, a touchscreen, and/or the like) the see more control element 638. According to various aspects, after selection of the see more control element 638, a next specified quantity of suggested component tags (e.g., as suggested by the content enrichment system 104) may be presented in the UI tagging pane 602. According to one aspect, a next ten suggested component tags 632, if available may be presented in the UI tagging pane 602. Referring to FIG. 7, the UI tagging pane 702 may not include a see more control element if further suggested component tags are not available. According to various aspects, component tags may be presented and/or available based on a custom list of component tags as proposed by a content manager or the content enrichment system 104.

Accepting and Rejecting Annotations

According to various embodiments of the present disclosure, chapter keywords, content tags, and/or component tags, as described herein, may be formally accepted or formally rejected via a UI tagging pane, as described herein.

Figure 8:
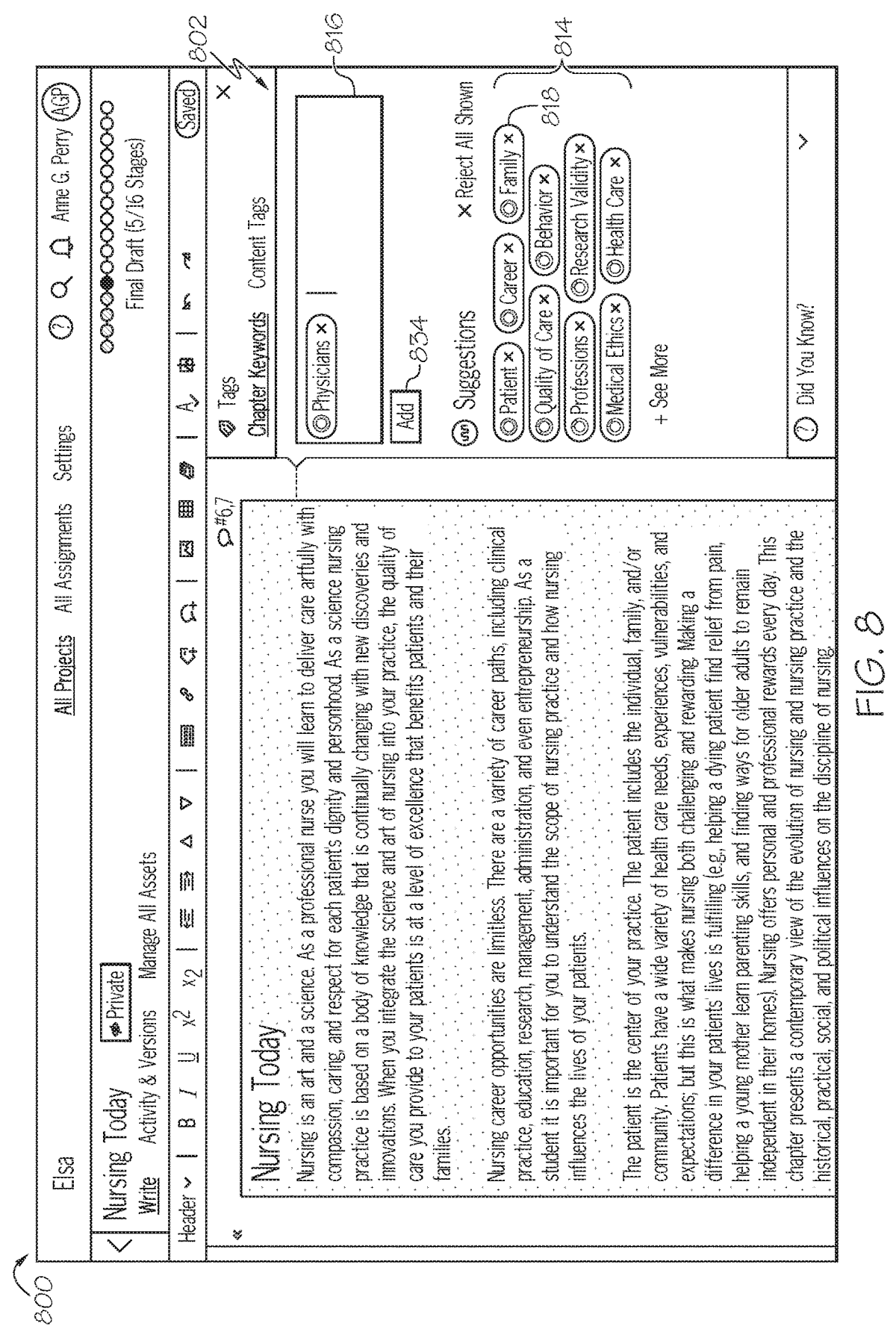
Figure 13:
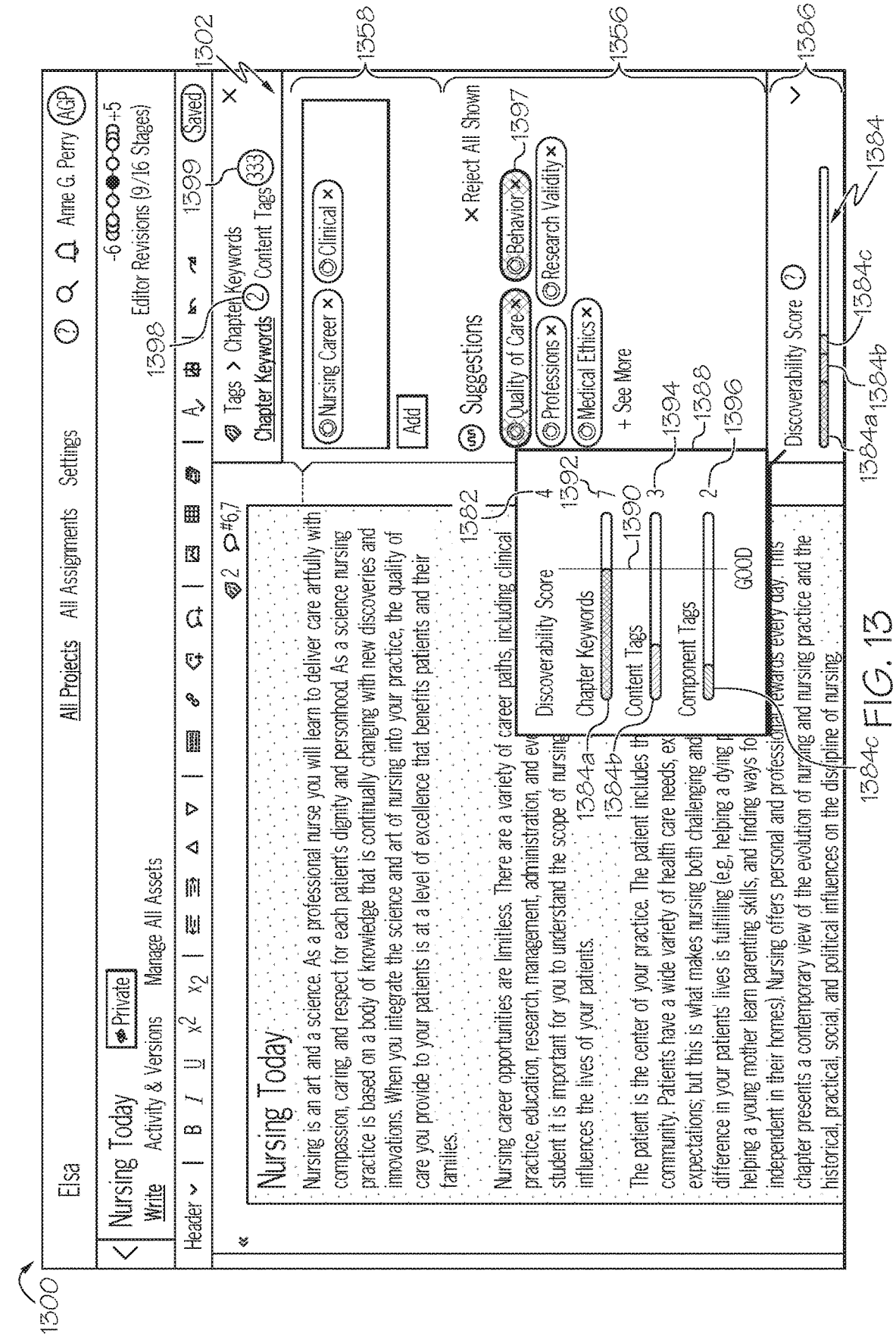
FIG. 13 depicts an illustrative UI tagging pane for providing a discoverability score according to one or more embodiments of the present disclosure.

FIG. 8 depicts an illustrative UI tagging pane 802 for accepting one or more chapter keywords according to various aspects of the present disclosure. Referring to FIG. 8, a user may enter a chapter keyword in entry box 816 by selecting (e.g., via a cursor, a touchscreen, and/or the like) one or more of a plurality of pill-shaped control elements 818, each pill-shaped control element 818 being associated with a suggested chapter keyword 814 (e.g., suggested by the content enrichment system 104) and presented in the UI tagging pane 802 (e.g., see FIG. 8, "Patient", "Career", "Family", and/or the like, each associated with a respective pill-shaped control element 818 selectable by the user). After one or more pill-shaped control element 818 is selected, each suggested chapter keyword 814 associated with each selected pill-shaped control element 818 may be entered in the entry box 816. For example, in light of FIG. 4, FIG. 8 reflects that chapter keyword "Physicians" has been entered in entry box 816 (e.g., after the pill-shaped control element 454 associated with the chapter keyword "Physicians" was selected in FIG. 4). According to various aspects, the user may click an "add" control element 834 to confirm acceptance of entered chapter keywords to the data store system 102. The data store system 102 may capture chapter keywords formally accepted via the "add" control element 834 in a separate list for each version of a document. It should be appreciated that content tags and/or component tags, as described herein, may be similarly selected and formally accepted. According to various embodiments, such formally accepted annotations (e.g., chapter keywords, content tags, component tags, and/or the like) may be utilized as positive feedback to retrain, calibrate, and/or enhance annotation algorithms of the content enrichment system 104 as described herein. Furthermore, with respect to different versions of a document, the system 100 of the present disclosure may detect (e.g., via the content enrichment system 104) a new suggested annotation(s) (e.g., chapter keywords, content tags, and/or component tags not suggested for one or more previous versions) based on an analysis of a current version versus a previous version of a document and/or node element(s). Referring briefly to FIG. 13, a newly suggested annotation 1397 (e.g., "Quality of Care" and "Behavior") may be visually distinguished (e.g., depicted via cross-hatching or color) from previously suggested annotations. Furthermore, in view of FIG. 13, according to various aspects, the UI tagging pane 1302 may indicate a total count, 1398, 1399 associated with each type of newly suggested annotations (e.g., "2" newly suggested chapter keywords, "333" newly suggested content tags, and/or the like).

Figure 9:
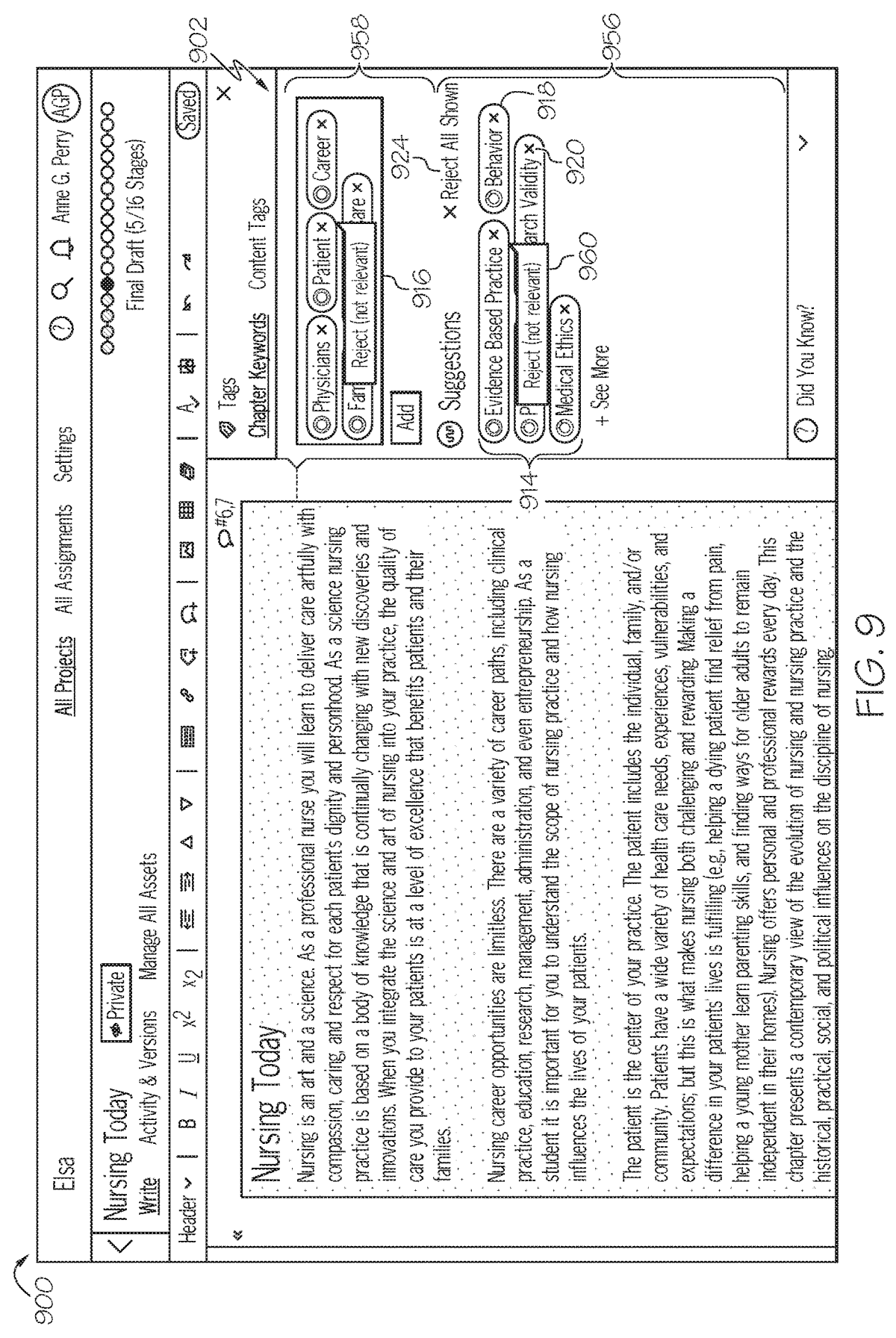

FIG. 9 depicts an illustrative UI tagging pane 902 for rejecting one or more chapter keywords according to various aspects of the present disclosure. Referring to FIG. 9, according to various aspects, each pill-shaped control element 918 may expand (e.g., horizontally in the UI tagging pane 902) to fit the textual representation of each suggested chapter keyword 914 as well as a reject chapter keyword control element 920. According to various aspects, a user may reject one or more particular suggested chapter keyword 914 by selecting (e.g., via a cursor, a touchscreen, and/or the like) their respective reject chapter keyword control element 920. According to various aspects, a reject chapter keyword control element 920 may be selected in a suggestion portion 956 of the UI tagging pane 902 or an entry portion 958 of the UI tagging pane 902 (e.g., within entry box 916). Referring to FIG. 9, according to various aspects, each reject chapter keyword control element 920 may be configured to display a reject message 960 (e.g., "Reject (not relevant)") upon user interaction (e.g., a mouse-over the reject chapter keyword control element 920, hover-over the reject chapter keyword control element 920, and/or the like). According to numerous aspects, the reject chapter keyword control element 920 may be represented in each pill-shaped control element 918 as an "X". Furthermore, the UI tagging pane 902 may further include a reject all chapter keywords control element 924. If the suggested chapter keywords 914 displayed in the UI tagging pane 902 are not acceptable, the user may select (e.g., via a cursor, a touchscreen, and/or the like) the reject all chapter keywords control element 924. In such an aspect, the UI tagging pane 902 may be refreshed (e.g., via the content enrichment system 104) with a new and/or different group of suggested chapter keywords 914. The data store system 102 may capture each chapter keyword formally rejected via each respective reject chapter keyword control element 920 and/or each group of suggested chapter keywords 914 formally rejected via an associated reject all chapter keywords control element 924 in a separate list for each version of a document. It should be appreciated that content tags and/or component tags, as described herein, may be similarly formally rejected. According to various embodiments, such formally rejected annotations (e.g., chapter keywords, content tags, component tags) may be utilized as negative feedback to retrain, calibrate, and/or enhance annotation algorithms of the content enrichment system 104 as described herein.

Annotation Rankings and Modifying Annotation Rankings

Figure 10:
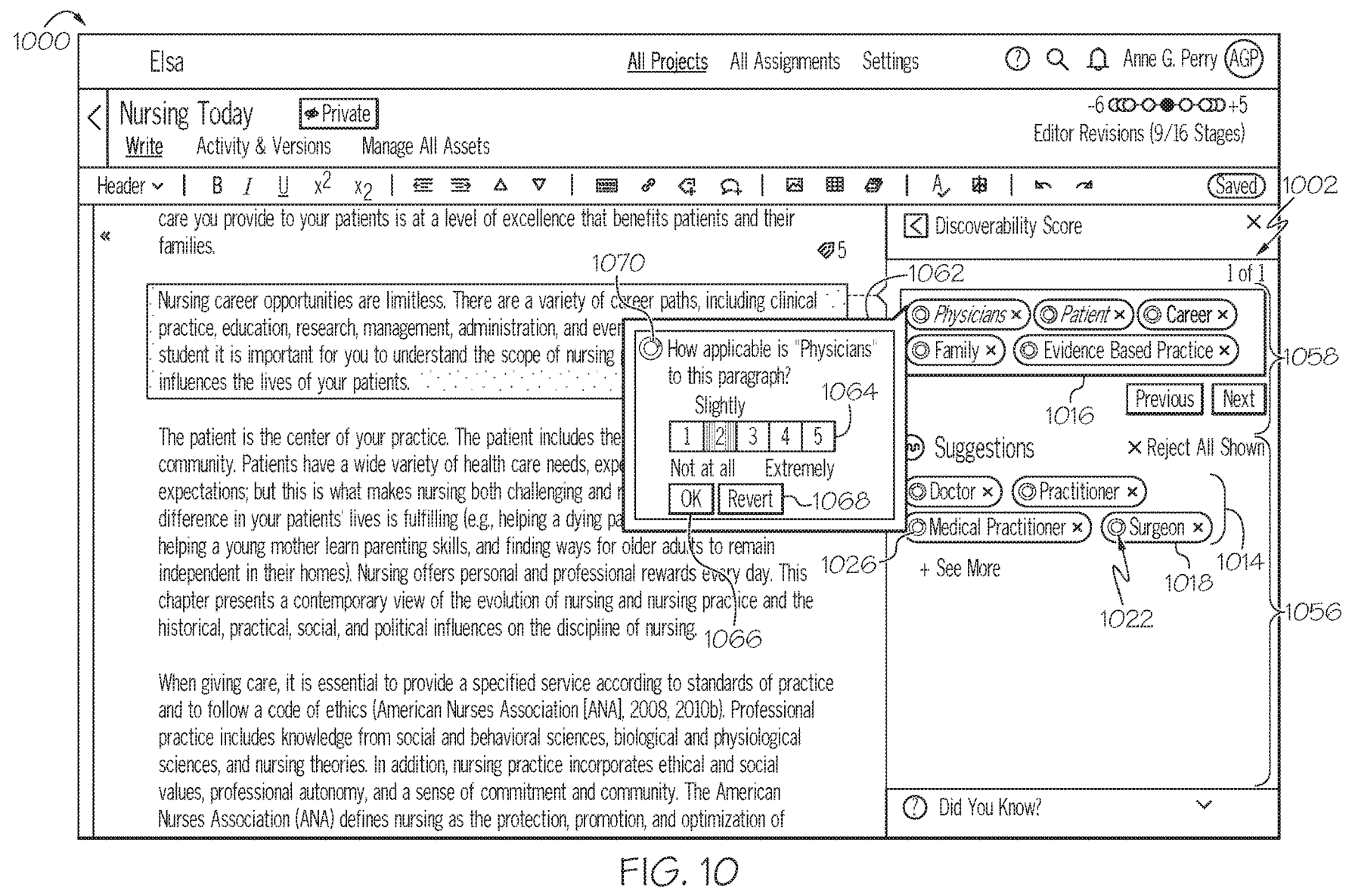

FIG. 10 depicts an illustrative UI tagging pane 1002 for modifying a ranking for one or more content tags according to various aspects of the present disclosure. As discussed herein, each pill-shaped control element 1018 may expand (e.g., horizontally in the UI tagging pane 1002) to fit the textual representation of each suggested content tag 1014 (e.g., content tags since a specific paragraph has been selected). Furthermore, each pill-shaped control element 1018 may expand (e.g., horizontally in the UI tagging pane 1002) to include a rescore content tag control element 1022.

As described herein, each rescore content tag control element 1022 may include a dual functionality. Referring to FIG. 10, as a first functionality, an interface of each rescore content tag control element 1022 may present a visual cue that represents a current relevancy score (e.g., a confidence, a weight from the data store system 102) associated with the content tag (e.g., "Surgeon") textually represented in that pill-shaped control element 1018. According to various aspects, each visual cue may include a donut chart 1026. Such a donut chart 1026 enables a user to immediately assess the relevancy (e.g., as determined by the content enrichment system 104) of each suggested content tag 1014 in context with the other suggested content tags 1014 and without having to independently consult with the content enrichment system 104 (e.g., without having to switch to a different user interface). More specifically, according to various embodiments described herein, the annulus (e.g., region between the concentric circles) of each donut chart 1026 may reflect a relevancy score (e.g., percentage) associated its corresponding content tag (e.g., as calculated or determined by the content enrichment system 104). For example, if the relevancy score is 100%, the entire annulus may be filled (e.g., colored, cross-hatched, and/or the like), if the relevancy score is 75%, three-quarters of the annulus may be filled (e.g., in a clockwise fashion), if the relevancy score is 50%, half of the annulus may be filled (e.g., right half), if the relevancy score is 25%, one-quarter of the annulus may be filled (e.g., in a clockwise fashion), and if the relevancy score is 0%, the annulus may be blank. It should be appreciated that other intervening relevancy scores (e.g., percentages) may be similarly depicted via the annulus of each donut chart 1026. Details regarding the algorithms and/or methodologies utilized by the content enrichment system 104 to calculate and/or determine the relevancy (e.g., relevancy score) are beyond the scope of the present disclosure. Various scoring and/or indexing algorithms (e.g., of an Elsevier Fingerprint Engine®, as a non-limiting example) may be used without departing from the spirit and scope of the present disclosure.

As discussed herein, the suggested content tag 1014 may be presented in the UI tagging pane 1002 and ordered based on each current relevancy score as depicted by each respective donut chart 1026 (e.g., see FIG. 10, "Doctor", then "Practitioner", then "Medical Practitioner", then "Surgeon", and so on). In view of FIG. 10, the annulus of the donut chart 1026 associated with "Doctor" reflects a large relevancy score whereas the annulus of the donut chart 1026 associated with "Practitioner", "Medical Practitioner" and "Surgeon" reflect much lower relevancy scores. According to various aspects, the suggested content tags 1014 may be presented in the UI tagging pane 1002 such that the suggested content tags 1014 are ordered in a manner similar to the lines of a book (e.g., from a left side of the UI tagging pane 1002 to a right side of the UI tagging pane 1002 and then down such that left-most and top-most suggested content tags 1014 are associated with a higher current relevancy score relative to right-most and bottom-most suggested content tags 1014). According to various aspects, only a specified quantity of suggested content tags 1014 (e.g., as suggested by the content enrichment system 104) may be presented and ordered (e.g., based on their respective relevancy scores) in the UI tagging pane 1002. According to one aspect, only the top ten suggested content tags 1014 may be presented and ordered (e.g., based on their respective relevancy scores) in the UI tagging pane 1002.

Still referring to FIG. 10, as a second functionality, the interface of each rescore content tag control element 1022 may be selectable to modify a current relevancy score (e.g., as determined by the content enrichment system 104), associated with a content tag textually represented in that pill-shaped control element 1018, to a user-defined relevancy score. According to various aspects, the interface of each rescore content tag control element 1022 may be selected in a suggestion portion 1056 of the UI tagging pane 1002 and/or an entry portion 1058 of the UI tagging pane 1002 (e.g., within entry box 1016). In view of FIG. 10, after selection of an interface of a rescore content tag control element 1022 (e.g., associated with "Physicians" in entry box 1016), a modify relevancy score interface 1062 (e.g., a pop-up interface, a separate window, and/or the like) may be presented to the user. The user may then choose a user-defined relevancy score to associate with the content tag (e.g., "Physicians") corresponding to the selected interface of the content tag control element 1022 (e.g., prior to modification, the donut chart 1026 depicts a relevancy score greater than 25% but less than 50%). According to various aspects, the user may select the user-defined relevancy score using a scoring interface 1064. In one aspect the scoring interface 1064 may include a Likert scale where the user is presented an inquiry or statement (e.g., "How applicable is 'Physicians' to this paragraph?") and the user may respond to the inquiry or statement by specifying their level of agreement or disagreement (e.g., via a number scale) with the inquiry or statement (e.g., "Not at all" associated with "1" to "Extremely" associated with "5"). In such an aspect, each level of the Likert scale may be associated with a percentage (e.g., between 0% and 100%). According to another aspect, the scoring interface 1064 may include an entry box (not shown) where the user may enter a percentage (e.g., between 0% and 100%) that reflects their perception or interpretation of the relevancy of that content tag (e.g., to the selected node element). According to various aspects, the modify relevancy score interface 1062 may further include a confirm rescore button 1066 (e.g., "OK"), to formally accept the user-defined relevancy score entered via the scoring interface 1064, and a reject rescore button 1068 (e.g., "Revert") to reject the user-defined relevancy score entered via the scoring interface 1064 (e.g., to revert back to the content enrichment system-determined relevancy score). According to such aspects, after selection of the confirm rescore button 1066, the donut chart 1026 associated with the content tag corresponding to modified relevancy score may change to visually identify the relevancy score as a user-defined relevancy score.

According to various embodiments of the present disclosure, each donut chart 1026 that reflects a relevancy score as determined by the content enrichment system 104 may be depicted in a first, default color (e.g., blue, depicted in FIG. 10 as a first cross-hatching associated with chapter keywords "Family" and "Evidence Based Practice" in entry box 1016). Similarly, each donut chart 1026 that reflects a user-defined relevancy score may be depicted in a second, different color. For example, referring to FIG. 10, after the interface of the rescore content tag control element 1022 associated with "Physicians" has been selected, its corresponding donut chart 1026 (e.g., in entry box 1016) may be depicted in a second, different color. According to various aspects, text of the content tag itself (e.g., "Physicians") may also be depicted (e.g., in entry box 1016) in the same second, different color. The second, different color may be determined based on the user's entry in the scoring interface 1064. For example, referring to FIG. 10, an entry of "1" may be associated with a dark red color (e.g., depicted as a second cross-hatching, not shown), an entry of "2" may be associated with a red color (e.g., depicted as a third cross-hatching associated with content tag "Physicians", the text of "Physicians" itself may also be depicted in red), an entry of "3" may be associated with a yellow color (e.g., depicted as a fourth cross-hatching associated with content tag "Patient", the text of "Patient" itself may also be depicted in yellow), an entry of "4" may be associated with a green color (e.g., depicted as a fifth cross-hatching associated with content tag "Career", the text of "Career" itself may also be depicted in green), and an entry of "5" may be associated with a dark green color (e.g., depicted as a sixth cross hatching, not shown). Accordingly, referring to FIG. 10, since "2" is currently selected in the scoring interface 1064 of the modify relevancy score interface 1062, the donut chart 1026 associated with "Physicians" is depicted in a red color (e.g., depicted as the third cross-hatching). In this example, the text of "Physicians" itself is also depicted in the red color. Here, it should be appreciated that other user-defined relevancy scores (e.g., percentages) entered via the scoring interface 1064 may be similarly depicted (e.g., via various second, different colors each associated with a different percentage and/or percentage range).

Referring still to FIG. 10, the modify relevancy score interface 1062 may further depict a modified donut chart 1070 that reflects a proposed user-defined relevancy score. The annulus associated with the modified donut chart 1070 reflects a relevancy score associated with the entry of "2" via the scoring interface 1064 of the modify relevancy score interface 1062 (e.g., a relevancy score of less than 25%) whereas the donut chart 1026 corresponding to "Physicians" in the entry box 1016 still reflects an annulus associated with the content enrichment system-determined relevancy score (e.g., a relevancy score greater than 25% and less than 50%). After selection of the confirm rescore button 1066, the donut chart 1026 corresponding to "Physicians" in the entry box 1016 may be updated to reflect the modified donut chart 1070 and the second, different color (e.g., red color, depicted as the third cross-hatching). Again, in view of FIG. 10, the donut chart 1026 corresponding to "Patient" in the entry box 1016 has been updated to reflect a modified donut chart and a second, different color (e.g., yellow, depicted as the fourth cross-hatching) and the donut chart 1026 corresponding to "Career" in the entry box 1016 has been updated to reflect a modified donut chart and a second, different color (e.g., green, depicted as the fifth cross-hatching). If the user decides to reject the proposed user-defined relevancy score, the user may select the reject rescore button 1068. After selection of the reject rescore button 1068, the donut chart 1026 corresponding to "Physicians" in the entry box 1016 may revert back to the original donut chart 1026 and the first, default color (e.g., blue, depicted as the first cross-hatching). The data store system 102 may capture each user-defined relevancy score formally accepted via the confirm rescore button 1066 in a separate list for each version of a document. It should be appreciated that relevancy scores associated with chapter keywords and/or component tags, as described herein, may be similarly modified. According to various embodiments, such modified user-defined relevancy scores (e.g., for chapter keywords, content tags, and/or component tags) may be utilized as feedback to retrain, calibrate, and/or enhance annotation algorithms of the content enrichment system 104 as described herein.

Propose New Annotations

Figure 11:
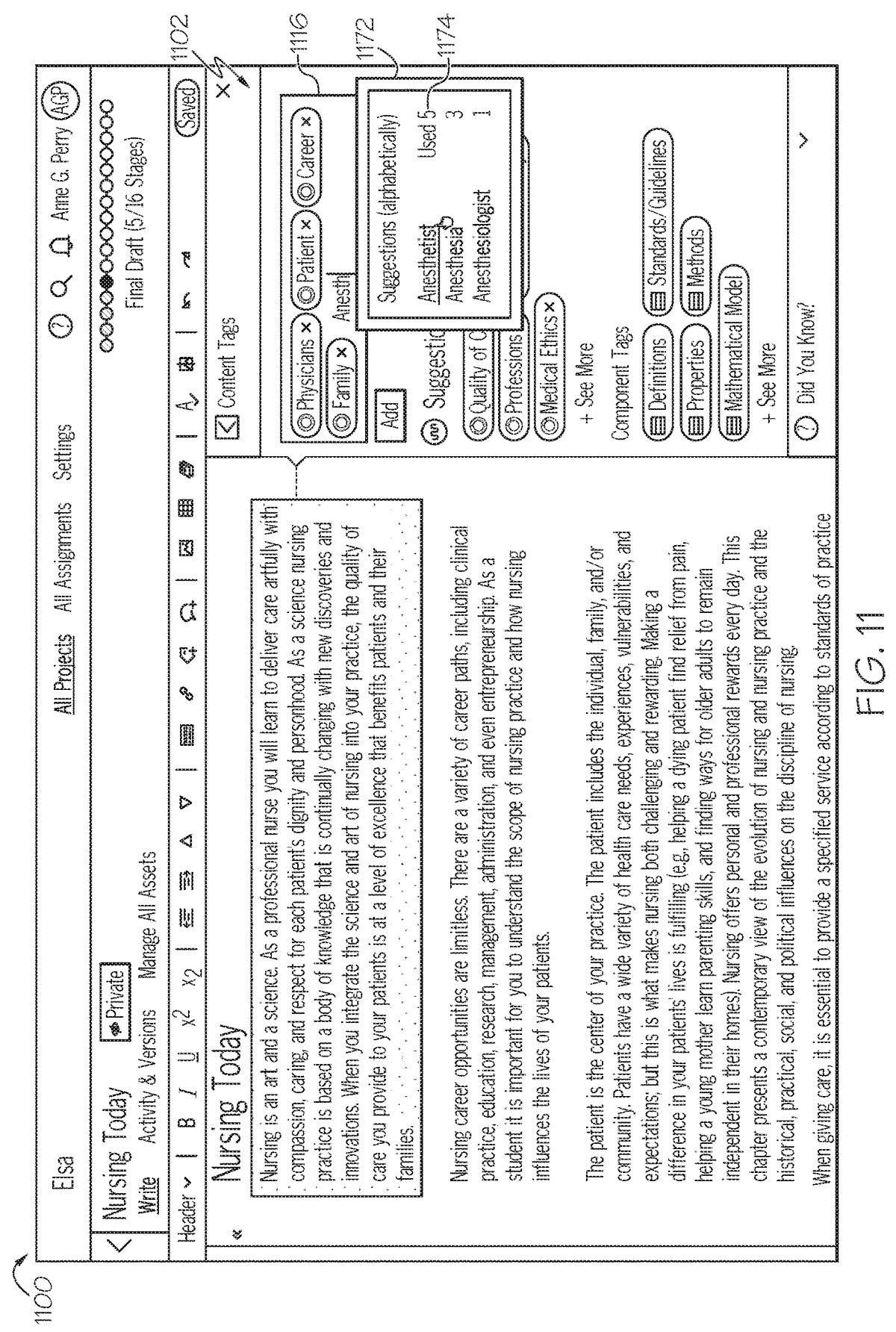

FIG. 11 depicts an illustrative UI tagging pane 1102 for proposing annotations according to various aspects of the present disclosure. According to various embodiments described herein, a user may enter a content tag in entry box 1116 by typing directly into the entry box 1116, at any time. As described herein, the system 100 of the present disclosure may, via the content enrichment system 104, auto-complete or attempt to auto-complete the content tag as it is being typed by the user. Referring to FIG. 11, an auto-complete interface 1172 (e.g., a pop-up interface, a separate window, and/or the like) may be presented to the user. According to various aspects, as the user types in the entry box 1116, the input letters may be sent to the content enrichment system 104 (e.g., in real time, near real time, at a predetermined refresh rate, and/or the like) and the content enrichment system 104 may respond with suggested terms via the auto-complete interface 1172 (e.g., in real time, near real time, at a predetermined refresh rate, and/or the like). For example, referring to FIG. 11, after the user types the letters "Anesth", the content enrichment system 104 may auto-complete the user's input by suggesting the terms "Anesthetist", "Anesthesia", "Anesthesiologist" and/or the like via the auto-complete interface 1172. As illustrated in FIG. 11, the suggested terms may be listed alphabetically and each suggested term may visually indicate the portion of the terms being auto-completed by the content enrichment system 104 (e.g., "etist" bolded of "Anesthetist", "esia" bolded of "Anesthesia", and "esiologist" bolded of "Anesthesiologist", and/or the like).

Furthermore, referring to FIG. 11, the auto-complete interface 1172 may provide a count 1174 associated with each suggested term that reflects a number of occurrences of that suggested term in the selected node element, the selected group of node elements, the selected document, and/or the like. As discussed, with respect to content tags, entered content tags (e.g., or a synonym thereof) should be textually present in the selected node element or the selected group of node elements. Such a feature of the auto-complete interface 1172 may enable the user to efficiently enter textually supported content tags. According to another aspect, with respect to chapter keywords, entered chapter keywords may or may not be textually present in the selected node element, selected group of node elements, and/or the selected document itself. Such a feature of the auto-complete interface 1172 may enable the user to efficiently adhere to a current dictionary/taxonomy (e.g., of the content enrichment system 104, of the document itself, of a domain associated with the document, and/or the like) when entering chapter keywords. According to yet another aspect, with respect to component tags, entered component tags may or may not be textually present in the selected node element, selected group of node elements, and/or the selected document itself. Such a feature of the auto-complete interface 1172 may enable the user to efficiently adhere to a current dictionary/taxonomy (e.g., of the content enrichment system 104, of the document itself, of a domain associated with the document, of a custom list of component tags provided by one or more content managers or the content enrichment system 104, and/or the like) when entering component tags. According to various aspects, the user may select (e.g., via a cursor, touchscreen, and/or the like) a term suggested via the auto-complete interface 1172 to complete the term being typed in the entry box 1116.

According to various aspects, such real-time or near real time feedback between a user's input and the content enrichment system 104 may ensure that user-generated annotations (e.g., chapter keywords, content tags, component tags) correspond to domain-specific dictionaries/taxonomies thereby enabling better quality annotations that match or adhere to other documents from the same or similar domain.

According to various embodiments, the user may not accept and/or may not acknowledge any term suggested via the auto-complete interface 1172. More specifically, the user may continue typing to enter a term outside of those suggested and/or recognized by the current dictionary/taxonomy (e.g., of the content enrichment system 104, of the document itself, of a domain associated with the document, of a custom list of component tags provided by one or more content managers or the content enrichment system 104, and/or the like). According to such aspects, such entered terms (e.g., for chapter keywords, content tags, and/or component tags) may be utilized as feedback to retrain, calibrate, and/or enhance annotation algorithms of the content enrichment system 104 as described herein (e.g., to proactively expand an existing domain dictionary/taxonomy, or to establish a domain dictionary/taxonomy for a domain unknown to the content enrichment system 104, and/or the like).

Disambiguating Annotations

Figure 12:
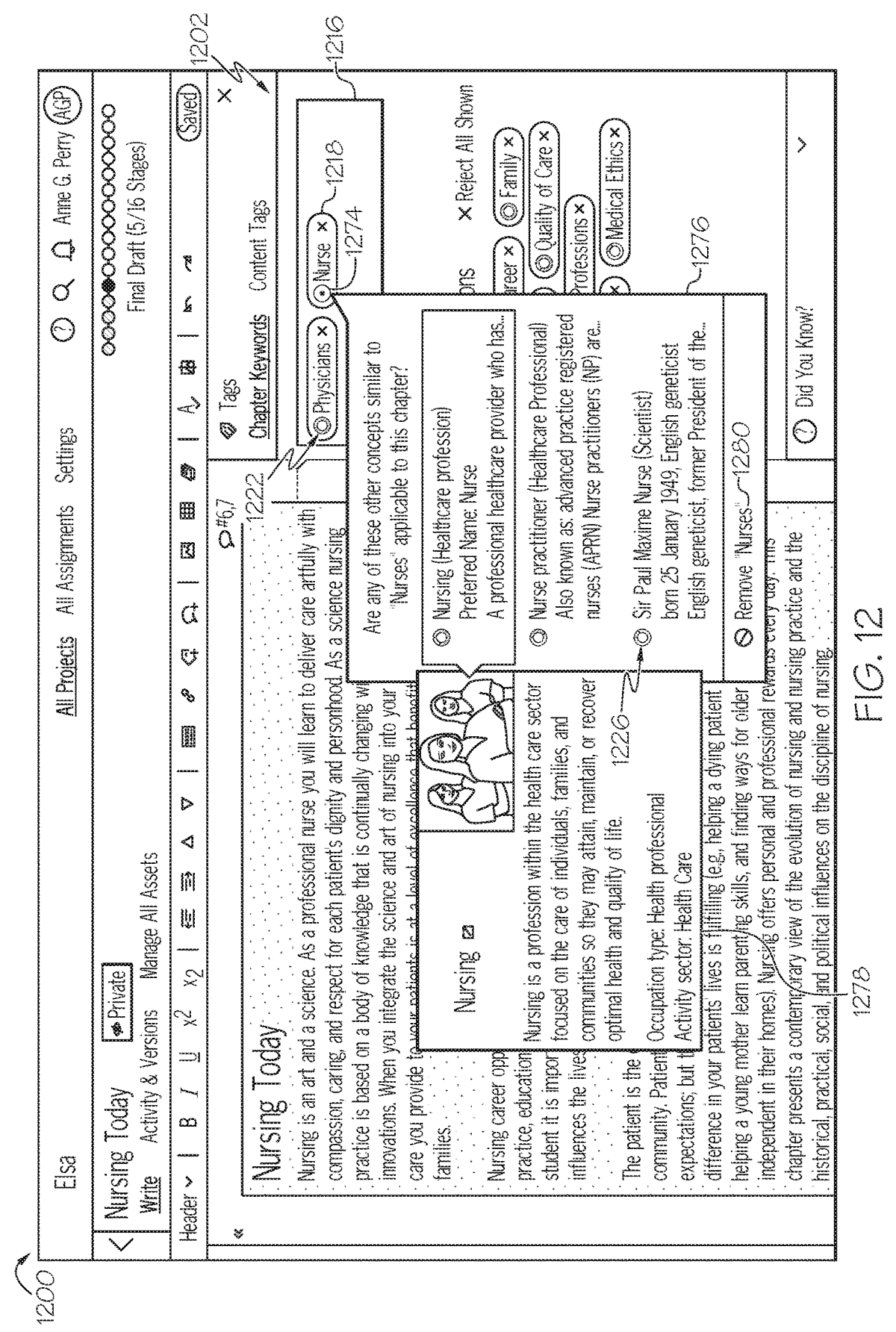

FIG. 12 depicts an illustrative UI tagging pane 1202 for disambiguating annotations according to various aspects of the present disclosure. According to various embodiments described herein, a user may enter a chapter keyword in entry box 1216 by typing directly into the entry box 1216, at any time. As described herein, each chapter keyword entered in entry box 1216 may be sent to the content enrichment system 104 (e.g., in real time, near real time, at a predetermined refresh rate, and/or the like). According to such aspects, the content enrichment system 104 may detect multiple terms that are either textually identical or semantically related to (e.g., synonyms, preferred wording) an entered chapter keyword.

As illustrated in FIG. 12, if the content enrichment system 104 determines that an entered chapter keyword may benefit from disambiguation, the system 100 of the present disclosure may replace the rescore chapter keyword control element 1222 of the pill-shaped control element 1218 that corresponds to the entered chapter keyword with a disambiguation control element 1274 (e.g., in response to a request from the content enrichment system 104 to disambiguate an entered chapter keyword).

According to other aspects, the system 100 of the present disclosure may simply display the disambiguation control element 1274 upon entry of the chapter keyword in entry box 1216. According to various aspects, after user selection of the disambiguation control element 1274, a disambiguation interface 1276 (e.g., a pop-up interface, a separate window, and/or the like) may be presented to the user.

Referring to FIG. 12, according to various aspects, the disambiguation interface 1276 may present a plurality of proposed terms that are either textually identical, similar to, and/or semantically related to the entered chapter keyword. For example, in view of FIG. 12, proposed terms including "Nursing (Healthcare Profession)", "Nurse Practitioner (Healthcare Professional)", and "Sir Paul Maxime Nurse (Scientist)" may be presented in the disambiguation interface 1276 in response to the chapter keyword "Nurse" entered in entry box 1216. According to various aspects, each proposed term may be presented in association with its corresponding donut chart 1226 which depicts is associated relevancy score as determined by the content enrichment system 104. According to various aspects, the user may select (e.g., via a cursor, touchscreen, and/or the like) a proposed term that disambiguates the entered chapter keyword. For example, in view of FIG. 12, a selection of "Nursing (Healthcare Profession)" clarifies to the content enrichment system 104 that the user intended the entered chapter keyword "Nurse" to reference the healthcare profession of nursing and not the healthcare profession of nurse practitioner or the scientist Sir Paul Maxime Nurse. Such a feature may enable the system 100 of the present disclosure to accurately capture the user's intent to realize high quality annotations. The data store system 102 may capture each proposed term (e.g., selected via the disambiguation interface 1276) that disambiguates the entered chapter keyword in a separate list for each version of a document. It should be appreciated that content tags and/or component tags, as described herein, may be similarly disambiguated. According to various embodiments, such disambiguated annotations (e.g., chapter keywords, content tags, and/or component tags) may be utilized as feedback to retrain, calibrate, and/or enhance annotation algorithms of the content enrichment system 104 as described herein to produce future annotations (e.g., chapter keywords, content tags, and/or component tags) that are less ambiguous.

Still referring to FIG. 12, the system 100 of the present disclosure may present a disambiguation informational interface 1278 to the user if the content enrichment system 104 is able to provide additional contextual information in association with a proposed term. According to various aspects, additional contextual information may include a definition(s), a related document(s), and/or an image(s) (e.g., stored in a knowledge graph and/or a taxonomy of the content enrichment system 104). Referring again to FIG. 12, the disambiguation informational interface 1278 may be presented upon user interaction (e.g., a mouse-over or roll-over of a proposed term, a hover-over of a proposed term, and/or the like). According to various aspects, if the user (e.g., after interaction with the disambiguation interface 1276 and/or the disambiguation informational interface 1278) decides that the entered annotation (e.g., chapter keyword, content tag, and/or component tag) is not appropriate, the user may reject the annotation (e.g., "Nurse") entered via the entry box 1216 via a reject annotation control element 1280. The data store system 102 may capture each annotation rejected via the reject annotation control element 1280 in a separate list for each version of a document. According to various embodiments, such rejected annotations may be utilized as feedback to retrain, calibrate, and/or enhance annotation algorithms of the content enrichment system 104 as described herein.

Discoverability Score and Calculation

FIG. 13 depicts an illustrative UI tagging pane 1302 for providing a discoverability score 1382 according to various aspects of the present disclosure. More specifically, according to various embodiments, the UI tagging pane 1302 may include a suggestion portion 1356, an entry portion 1358, and a discoverability score portion 1386. The discoverability score portion 1386 may be configured for a user to evaluate the discoverability score 1382, as described herein. Although, in FIG. 13, the discoverability score portion 1386 is shown as part of or integrated within a chapter keywords UI tagging pane 1302, the discoverability score portion 1386 may similarly be shown as part of or integrated within a content tags UI tagging pane (e.g., FIG. 15).

According to various embodiments of the present disclosure, the system 100 described herein may compute and provide a discoverability score 1382 that reflects not just a general quantity of annotations but a quantity of quality, author-accepted annotations. According to aspects described herein, the discoverability score 1382 may generally track tagging coverage for each document as it is being created (e.g., in real time, in near real time, at a predetermined refresh rate, and/or the like).

According to various aspects the discoverability score 1382 may evaluate and compound various annotation types (e.g., chapter keywords, content tags, component tags, and/or the like) into a single value that not only is parsable into its constituent parts (e.g., to reflect its various annotation strengths and/or annotation weaknesses) but also is reportable to provide a general metric for a user responsible for managing documents being created (e.g., an editor, a content manager, and/or the like) to assess created documents relative to one another and/or a corpus of documents (e.g., a domain).

Accordingly, the discoverability score 1382 described herein may provide a baseline to a user (e.g., a content creator, an author, and/or the like) to evaluate an appropriate level of annotations expected for their created work (e.g., a document, a node element or a group of node elements of a document, a chapter of a compilation, and/or the like). Such a discoverability score 1382 (e.g., accessible via the discoverability score portion 1386 of the UI tagging pane 1302 of FIG. 13) may assist the user with respect to new and/or future developed annotation types (e.g., content tags, component tags, and/or the like) by providing a baseline to the user to evaluate an appropriate level of those new annotation types expected for their created work. Accordingly, the discoverability score as described herein may not only provide users (e.g., authors, content creators, and/or the like) such insights with respect to what is expected of them but also provide a motivational cue and/or reminder to ensure that each annotation type is completed and validated at the time in which the content is being created (e.g., as text is being drafted, as assets are being integrated, and/or the like).

Figure 17:
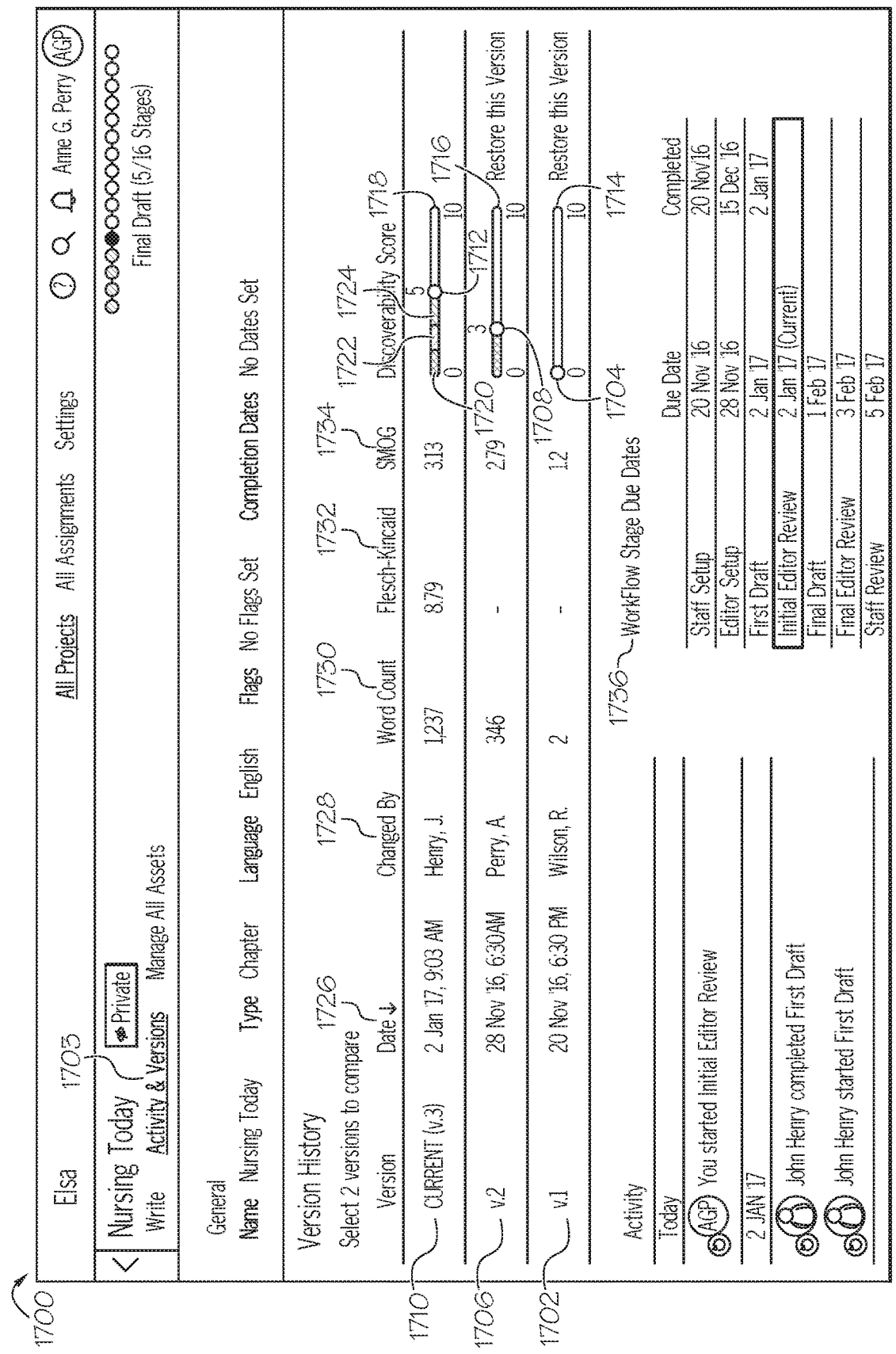
FIG. 17 depicts an illustrative activities and versions interface according to one or more embodiments of the present disclosure.

Referring to FIG. 13, the discoverability score portion 1386 may illustrate a discoverability score graphical depiction 1384 of the discoverability score 1382. More specifically, the discoverability score graphical depiction 1384 may include a first annotation type portion 1384a (e.g., a chapter keywords portion), a second annotation type portion 1384b (e.g., a content tags portion), and a third annotation type portion 1384c (e.g., a component tags portion). It should be appreciated that any number of annotation types may be combinable to compute the discoverability score 1382 as described and depicted herein. According to various aspects, the first annotation type portion 1384a may be illustrated as a first color (e.g., purple, depicted as a first cross-hatching), the second annotation type portion 1384b may be illustrated as a second color (e.g., orange, depicted as a second cross-hatching), and the third annotation type portion 1384c may be illustrated as a third color (e.g., green, depicted as a third cross-hatching). Such colors may assist the user to efficiently visualize which annotation type(s) (e.g., chapter keywords, content tags, and/or component tags) are lacking (e.g., annotation weaknesses) and which annotation type(s) are abundant (e.g., annotation strengths). Furthermore, referring again to the discoverability score graphical depiction 1384, the combined colors (e.g., depicted as a first, second and third cross-hatching) may assist the user to efficiently visualize combined annotations relative to possible annotations (e.g., a blank or colorless portion, depicted without cross-hatching). Referring briefly to FIG. 17, the discoverability score 1382 may be shown on the discoverability score graphical depiction 1384 with in the UI tagging pane 1302.

Referring back to FIG. 13, after a selection of (e.g., via a cursor, a touchscreen, and/or the like) or interaction with (e.g., a mouse-over, a hover-over, and/or the like) the discoverability score portion 1386 and/or the discoverability score graphical depiction 1384, a discoverability score interface 1388 (e.g., a pop-up interface, a separate window, and/or the like) may be presented to the user. According to various aspects, the discoverability score interface 1388 may visually separate the discoverability score 1382 into its constituent parts. According to various aspects, the discoverability score interface 1388 may separately illustrate the first annotation type portion 1384a, the second annotation type portion 1384b, and the third annotation type portion 1384c along with their corresponding annotation type textual descriptions (e.g., "Chapter Keywords", "Content Tags", and "Component Tags", respectively). More specifically, the discoverability score interface 1388 may illustrate a threshold 1390 relative to the illustrations of the first annotation type portion 1384a, the second annotation type portion 1384b, and the third annotation type portion 1384c. According to alternative aspects, the discoverability score interface 1388 may illustrate a separate threshold 1390 for each of the first annotation type portion 1384a, the second annotation type portion 1384b, and the third annotation type portion 1384c. Such a threshold(s) may further assist the user to more efficiently visualize which annotation type(s) (e.g., chapter keywords, content tags, and/or component tags) are lacking (e.g., annotation weaknesses) and which annotation type(s) are abundant (e.g., annotation strengths). In response, the user may interact with the UI tagging panes as described herein, to add additional annotations (e.g., chapter keywords, content tags, and/or component tags) to the document. According to various aspects, the system 100 of the present disclosure may automatically update the discoverability score 1382 (e.g., in real time, in near real time, at a predetermined refresh rate, and/or the like) as each new annotation is added.

Referring still to FIG. 13, the discoverability score 1382 may be computed based on the various annotation types (e.g., chapter keywords, content tags, and/or component tags) being applied to the created content (e.g., a document, a node element, a group of node elements, and/or the like). According to various embodiments of the present disclosure, the discoverability score 1382 may be computed based on three sub-metrics (e.g., a chapter keyword sub-metric 1392, a content tag sub-metric 1394, and a component tag sub-metric 1396). In one example, each sub-metric may be represented on a 10-point scale, making it easier for user comprehension. Further, in such an example, each sub-metric may contribute equally to the overall discoverability score 1382 (e.g., a ⅓ contribution).

With respect to chapter keywords, continuing the example, the chapter keyword sub-metric 1392 may count the number of chapter keywords formally accepted (e.g., via the UI tagging panes described herein) by the user when creating the content. Furthermore, the chapter keyword sub-metric 1392 may be adjusted if any chapter keyword has been formally rejected (e.g., via the UI tagging panes described herein). In such an example, it may have been determined that "5" (five) is an appropriate chapter keyword threshold. Accordingly, to realize a 10-point scale in the example, each accepted chapter keyword may be counted as "2" (two). Furthermore, in such an aspect, if any chapter keyword has been rejected, "1" (one) may be added to the chapter keyword sub-metric 1392. In this vein, in the example of FIG. 13, the system 100 of the present disclosure may determine that "3" (three) chapter keywords have been formally accepted and at least "1" (one) chapter keyword has been formally rejected. Accordingly, in the illustrated example, the chapter keyword sub-metric 1392 may be computed as "7" (seven) (e.g., 3 chapter keywords×2 each=6, plus 1=7). As such, the discoverability score interface 1388 may reflect "7" in association with the first annotation type portion 1384a (e.g., the chapter keyword portion).

With respect to content tags, continuing the example, the content tag sub-metric 1394 may count the number of content tags formally accepted (e.g., via the UI tagging panes described herein) by the user across all asset nodes (e.g., figures, tables, images, formulas, and/or the like) when creating the content versus a total number of asset nodes present. In such an example, it may have been determined that the content includes "8" (eight) figures and "2" (two) tables (e.g., "10" (ten) total asset nodes). Accordingly, in the example, no adjustment is necessary to realize a 10-point scale. In this vein, in the example of FIG. 13, the system 100 of the present disclosure may determine that content tags have been formally accepted for "2" (two) figures and "1" (one) table. Accordingly, in the illustrated example, the content tag sub-metric 1394 may be computed as "3" (three) (e.g., 3 asset nodes out of 10 total asset nodes have accepted content tags). As such, the discoverability score interface 1388 may reflect "3" in association with the second annotation type portion 1384b (e.g., the content tag portion).

With respect to component tags, continuing the example, the component tag sub-metric 1396 may count the number of component tags formally accepted (e.g., via the UI tagging panes described herein) by the user for level one node elements (e.g., H1 sections) and their respective child node elements when creating the content versus a total number of level one node elements (e.g., H1 sections) and their respective child node elements. In such an example, it may have been determined that the content includes 10 (ten) level one node elements and their respective child node elements. Accordingly, in the example, no adjustment is necessary to realize a 10-point scale. In this vein, in the example of FIG. 13, the system 100 of the present disclosure may determine that component tags have been formally accepted for child node elements in only 2 (two) level one node elements. Accordingly, in the illustrated example, the component tag sub-metric 1396 may be computed as "2" (two) [e.g., 2 level one node elements out of 10 total level one node elements have accepted component tags]. As such, the discoverability score interface 1388 may reflect "2" in association with the third annotation type portion 1384c (e.g., the component tag portion).

Still referring to FIG. 13, continuing the example, each sub-metric may contribute equally to the overall discoverability score 1382, as described herein. Accordingly, the overall discoverability score 1382 may be computed as 4 (e.g., (1/3)(7)+(1/3)(3)+(1/3)(2)=4).

It should be appreciated that the above described way of computing the discoverability score 1382 is one example. Other ways of calculating the discoverability score 1382 may be used without departing from the spirit and scope of the present disclosure.

According to various aspects of the present disclosure, the data store system 102 may capture the discoverability score 1382 as well as its constituent parts into a separate file for each version of a document and/or its related node elements. The data store system 102, as described herein, may also capture all suggested, accepted, and rejected annotations (e.g., with their respective relevancy scores). As discussed herein, the constituent parts of the discoverability score 1382 may reflect annotation strengths and/or annotation weaknesses within a document. Accordingly, the system 100 of the present disclosure may evaluate discoverability scores 1382 associated with previous versions of a document over time to determine whether annotations have become stale (e.g., possibly updatable) and/or additional annotations can be added (e.g., newly available annotations are relevant to the document). According to various aspects, by comparing document versions (e.g., where a user engaged with an annotation versus a current state of a document), the system 100 of the present disclosure may notify the user which of the annotation types (e.g., chapter keywords, content tags, and/or component tags) may require additional attention and/or requalification based on the current content of the document and current content enrichment system 104 results.

Integration of Aspects Within Document Workflow Management

One notable aspect of an authoring environment is the tracking of a document across a defined workflow (e.g., see FIG. 17, defined workflow 1736) and its various workflow stages (e.g., a first draft, an editor review, a final draft, copyediting, and/or the like) in which a different team member (e.g., an author, an editor, a content manager, and/or the like) may edit the document.

Figure 14:
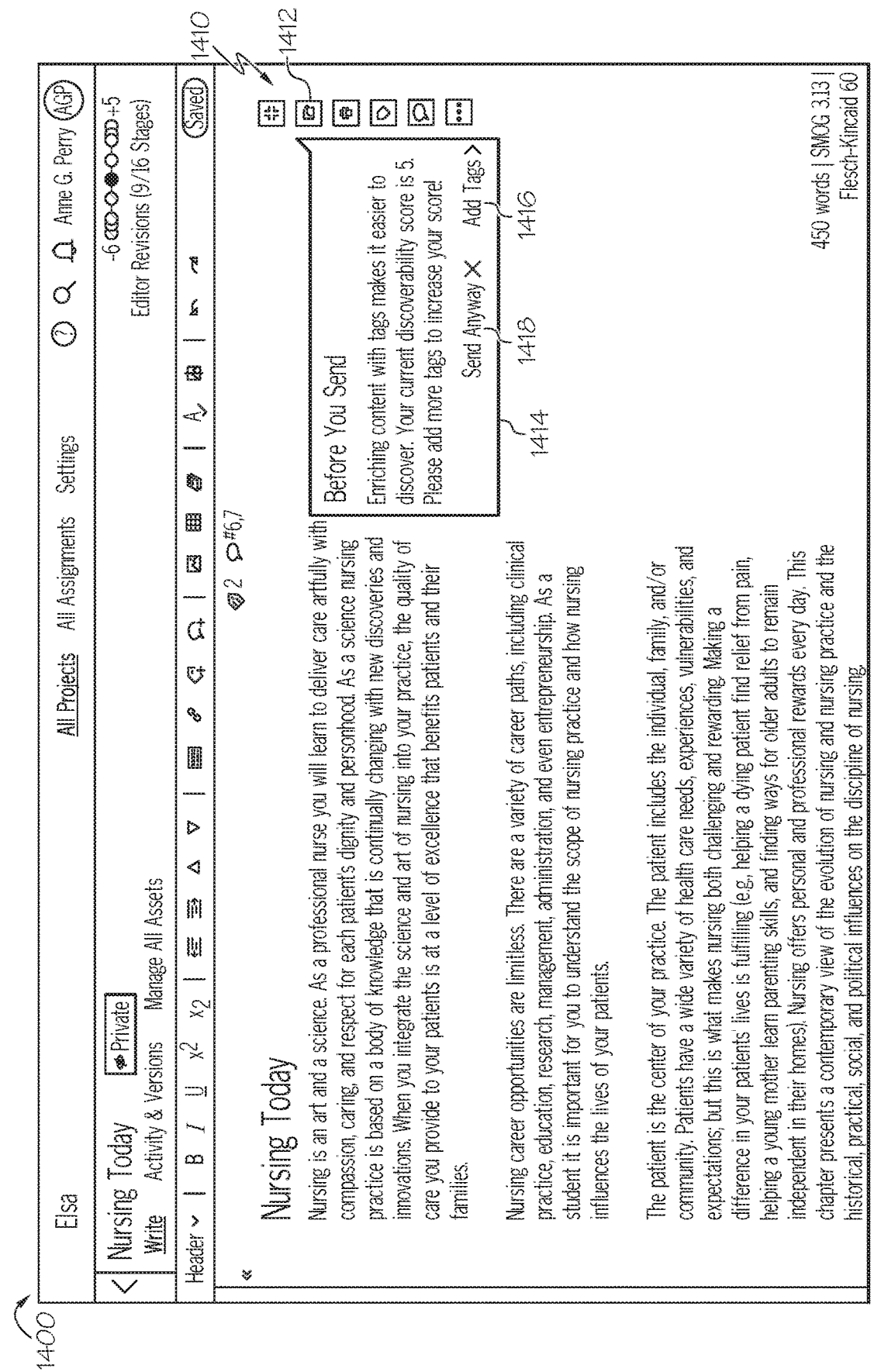
FIG. 14 depicts an illustrative toolbar including a next workflow stage control element according to one or more embodiments of the present disclosure.

FIG. 14 depicts an illustrative first toolbar 1410 (e.g., on a right side of the content creation UI 1400) that includes a next workflow stage control element 1412 according to various aspects of the present disclosure. According to various embodiments, the next workflow stage control element 1412 may be configured to, after selection by the user, send a current document to a next workflow stage in a defined workflow. According to various embodiments described herein, a user (e.g., author, content creator, and/or the like) may select the next workflow stage control element 1412 after that user has completed the current workflow stage.

According to some embodiments however, a sending of the current document to the next workflow stage may be postponed or intercepted. Such an option to postpone or intercept the sending may be enabled for all workflow stage transitions or only select workflow stage transitions. According to such aspects, where the sending is postponed or intercepted, the system 100 of the present disclosure may evaluate a discoverability score (e.g., FIG. 13, discoverability score 1382) associated with the current document and postpone or intercept the sending of the current document based on its associated discoverability score. More specifically, upon user selection (e.g., via a cursor, touchscreen, and/or the like) of the next workflow stage control element 1412, a next workflow stage inquiry interface 1414 (e.g., a pop-up interface, a separate window, and/or the like) may be presented to the user. According to various aspects, the next workflow stage inquiry interface 1414 may present not only motivational insight to the user (e.g., "Before You Send" "Enriching content with tags makes it easier to discover. Your current discoverability score is 5. Please add more tags to increase your score!") but also functional options to the user.

In the example of FIG. 14, the current document has a discoverability score of "5" (five), which is below a good discoverability score of "7" (seven) (e.g., FIG. 13, threshold 1390). Accordingly, after postponing or intercepting the sending of the current document, the system may present, via the next workflow stage inquiry interface 1414, functional options including an add tags control element 1416 (e.g., "Add Tags") and a send anyway control element 1418 (e.g., "Send Anyway"). The send anyway control element 1418 may be configured to, after selection (e.g., via a cursor, touchscreen, and/or the like) by the user, override the postponing or intercepting to send the current document to a next workflow stage in the defined workflow (e.g., FIG. 17, defined workflow 1736). The add tags control element 1416 may be configured to, after selection by the user, cause the UI tagging pane 1502 to generate within the content creation UI 1500 of FIG. 15 as described below.

Add Annotations Guide Interface

Figure 15:
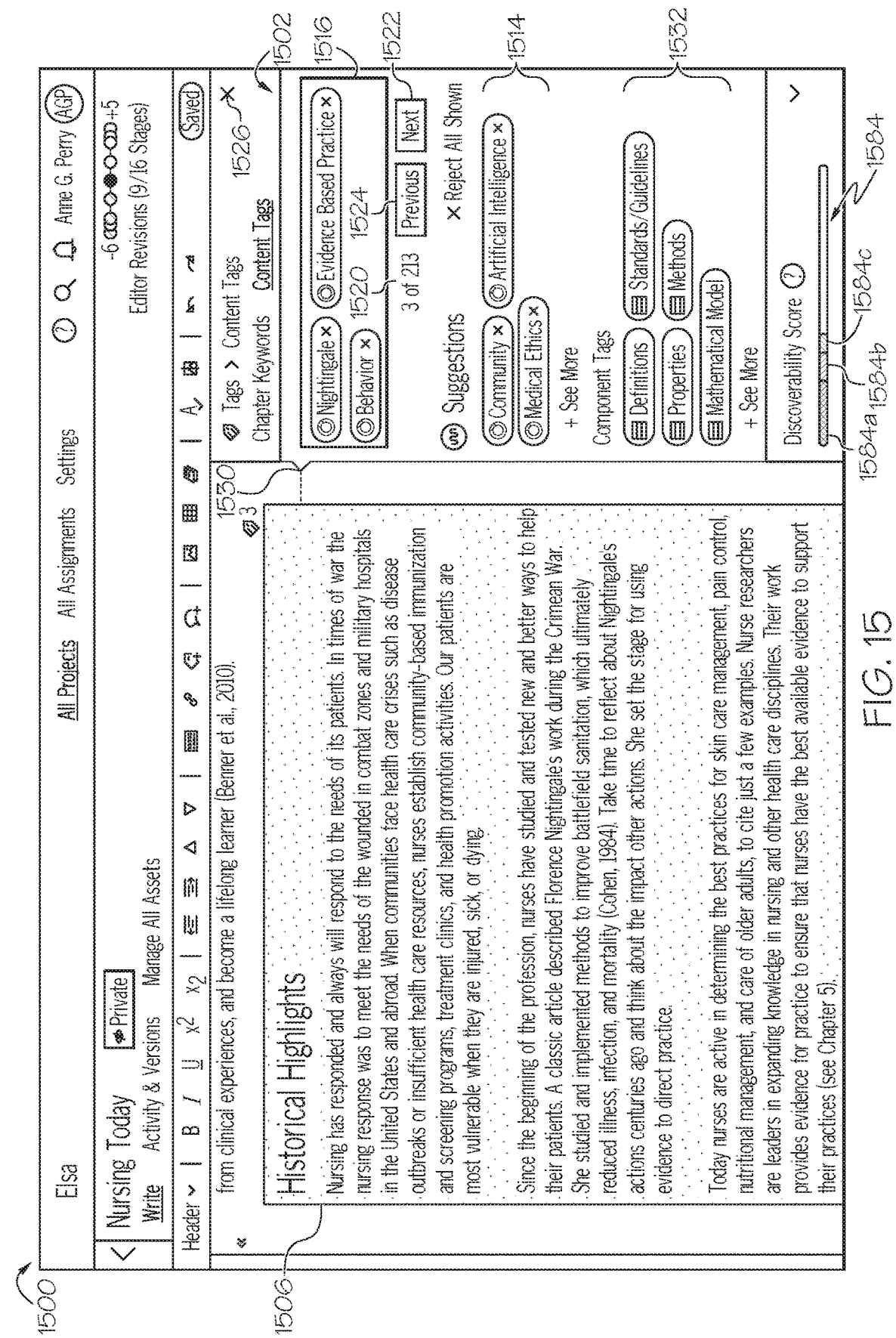
FIG. 15 depicts an illustrative UI tagging pane to guide a user through node elements to add annotations according to one or more embodiments of the present disclosure.

FIG. 15 depicts an illustrative UI tagging pane 1502 to guide a user through one or more node elements of a document to add annotations according to various aspects of the present disclosure. According to various embodiments, if annotations (e.g., chapter keywords, content tags, and/or component tags) are available and/or can be suggested (e.g., via the content enrichment system 104), the UI tagging pane 1502 of FIG. 15 may be configured to guide a user sequentially through such annotations. Although, in FIG. 15, the features described herein are shown as part of or integrated within a content tags UI tagging pane 1502, the features described herein may similarly be shown as part of or integrated within a chapter keywords UI tagging pane (e.g., FIG. 13). Accordingly, referring to the example of FIG. 14, depending on which sub-metric (e.g., see FIG. 13, chapter keyword sub-metric 1392, content tag sub-metric 1394, and/or component tag sub-metric 1396) is below the good discoverability score of "7" (seven), the system 100 of the present disclosure may guide the user to the appropriate UI tagging pane (e.g., to add chapter keywords, content tags, and/or component tags).

Referring to FIG. 15, according to various embodiments, the system 100 of the present disclosure may calculate and present a total number of node elements within the current document for which annotations (e.g., content tags and/or component tags in FIG. 15) are available and/or can be suggested via a progress indicator 1520 (e.g., annotations are available/suggestible for 213 node elements within the document). In view of FIG. 15, the user may then accept annotations (e.g., suggested and/or new content tags 1514 and/or component tags 1532) into the entry box 1516 as described herein and/or reject annotations (e.g., suggested content tags 1514 and/or component tags 1532) as described herein. According to various aspects, the UI tagging pane 1502 may supplant the "add" control element (e.g., FIG. 6, "add" control element 634) with a "next" control element 1522 and/or a "previous" control element 1524 to advance the user to a next or a previous node element respectively to add more annotations. A user may select the "next" control element 1522 and/or the "previous" control element 1524 without entering any annotations for that particular node element. Similar to as described herein, a connector feature 1530 of the UI tagging pane 1502 may connect the UI tagging pane 1502 to a current node element (e.g., node element, group of node elements, whole document) to visually indicate to the user that each suggested annotations (e.g., content tags 1514 and/or component tags 1532) have been suggested based on the current node element 1506. According to various aspects, the UI tagging pane 1502 may further include an exit annotations guide control element 1526. According to various aspects, after selection of the exit annotations guide control element 1526 (e.g., depicted as an "X") the UI tagging pane 1502 may close. According to further aspects, after selection of the exit annotations guide control element 1526, the system 100 of the present disclosure may launch a send to next workflow interface (not shown) to send the document (e.g., completed chapter and/or the like) to a next or selected workflow stage and/or to a particular individual (e.g., editor, content manager, and/or the like). According to yet further aspects, after selection of the exit annotations guide control element 1526, the system 100 of the present disclosure may re-evaluate the discoverability score associated with the current document and again postpone or intercept the sending based on the discoverability score as discussed herein (e.g., see FIG. 14, may present a next workflow stage inquiry interface 1414 and/or the like).

Figure 16:
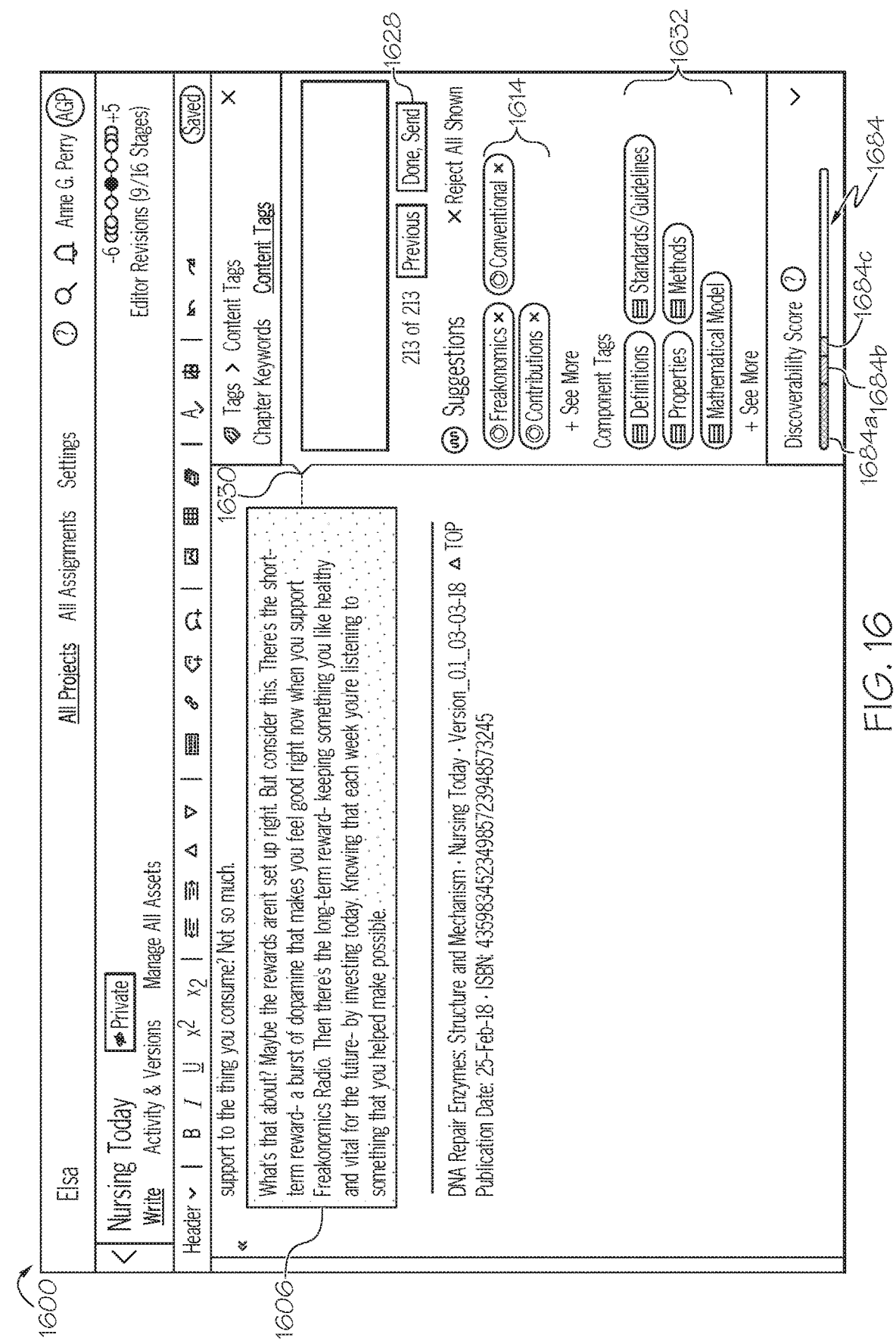
FIG. 16 depicts an illustrative UI tagging pane after a user has been guided through one or more node elements of a document to add annotations according to one or more embodiments of the present disclosure.

FIG. 16 depicts an illustrative UI tagging pane 1602 after a user has been guided through one or more node elements of a document to add annotations according to various aspects of the present disclosure. Similar to as described herein, a connector feature 1630 of the UI tagging pane 1602 may connect the UI tagging pane 1602 to a current node element to visually indicate to the user that each suggested annotations (e.g., content tags 1614 and/or component tags 1632) have been suggested based on the current node element 1606.

Referring to FIG. 16, after considering available and/or suggested annotations for each of the total number of node elements within the current document, the "next" control element (FIG. 15, "next" control element 1522) may be supplanted with or dynamically change to a "Done, Send" control element 1628. According to various aspects, selecting the "Done, Send" control element 1628 may confirm acceptance of entered annotations to the data store system 102. According to further aspects, after selection of the "Done, Send" control element 1628, the system 100 of the present disclosure may launch a send to next workflow interface (not shown) to send the document (e.g., completed chapter and/or the like) to a next or selected workflow stage and/or to a particular individual (e.g., editor, content manager, and/or the like).

Referring to FIG. 15 and FIG. 16, as the UI tagging pane 1502, 1602 guides the user sequentially through each of the total number of node elements, the system 100 of the present disclosure may update the discoverability score graphical depiction 1584, 1684 (e.g., in real time, near real time, at a predetermined refresh rate, and/or the like). As described herein, the discoverability score graphical depiction 1584, 1684 may include a first annotation type portion 1584a, 1684a (e.g., a chapter keywords portion), a second annotation type portion 1584b, 1684b (e.g., a content tags portion), and a third annotation type portion 1584c, 1684c (e.g., a component tags portion). Further, as described herein, the first annotation type portion 1584a, 1684a may be illustrated as a first color (e.g., purple, depicted as a first cross-hatching), the second annotation type portion 1584b, 1684b may be illustrated as a second color (e.g., orange, depicted as a second cross-hatching), and the third annotation type portion 1584c, 1684c may be illustrated as a third color (e.g., green, depicted as a third cross-hatching). Such colors may assist the user to efficiently visualize which annotation type(s) (e.g., chapter keywords, content tags, and/or component tags) are lacking (e.g., annotation weaknesses) and which annotation type(s) are abundant (e.g., annotation strengths) while adding additional annotations. This may help the user visualize how each additional accepted annotation influences the discoverability score associated with the document. Furthermore, referring again to the discoverability score graphical depiction 1584, 1684, the combined colors (e.g., depicted as a first, second and third cross-hatching) may assist the user to efficiently visualize combined annotations relative to possible annotations (e.g., a blank or colorless portion, depicted without cross-hatching).

Discoverability Score Reporting at a Document Level

FIG. 17 depicts an illustrative activities and versions interface 1700 according to various aspects of the present disclosure. Referring to FIG. 17, the system 100 of the present disclosure may present the activities and versions interface 1700 after user selection of an "Activity and Versions" tab 1703 (e.g., "Activity and Versions" tab 203 may be selected from content creation user interface 200 of FIG. 2 and/or the like).

Still referring to FIG. 17, the system 100 of the present disclosure may present a discoverability score in association with each version of a current document as stored in the data store system 102. For example, a first version of the document 1702 (e.g., "v.1") may be associated with a discoverability score 1704 of "0" (zero), a second version of the document 1706 (e.g., "v.2") may be associated with a discoverability score 1708 of "3" (three), and a third version of the document 1710 (e.g., "CURRENT (v.3)") may be associated with a discoverability score 1712 of "5" (five).

In view of FIG. 17, similar to as described herein, each discoverability score 1704, 1708, 1712 may be presented on a discoverability score graphical depiction 1714, 1716, 1718. Each discoverability score graphical depiction 1714, 1716, 1718 may include a first annotation type portion 1720 (e.g., a chapter keywords portion), a second annotation type portion 1722 (e.g., a content tags portion), and a third annotation type portion 1724 (e.g., a component tags portion). Further, similar to as described herein, the first annotation type portion 1720 may be illustrated as a first color (e.g., purple, depicted as a first cross-hatching), the second annotation type portion 1722 may be illustrated as a second color (e.g., yellow, depicted as a second cross-hatching), and the third annotation type portion 1724 may be illustrated as a third color (e.g., blue, depicted as a third cross-hatching). In view of discoverability score graphical depiction 1718 of the third version of the document 1710, such colors may assist the user to efficiently visualize which annotation type(s) (e.g., chapter keywords, content tags, and/or component tags) are lacking (e.g., annotation weaknesses) and which annotation type(s) are abundant (e.g., annotation strengths) while adding additional annotations. For example, referring to the discoverability score graphical depiction 1716, it is evident that the second version of the document 1706 is lacking a second annotation type portion (e.g., content tags) and a third annotation type portion (e.g., component tags). Furthermore, referring again to the discoverability score graphical depiction 1718, the combined colors (e.g., depicted as a first, second and third cross-hatching) may assist the user to efficiently visualize combined annotations relative to possible annotations (e.g., a blank or colorless portion, depicted without cross-hatching). In the example of FIG. 17, possible annotations, if accepted, may realize a discoverability score of "10" (ten).

Furthermore, in view of FIG. 17, reporting the discoverability score graphical depictions 1714, 1716, 1718 in a column may assist the user. In particular, a user (e.g., editor, content manager, and/or the like) may efficiently compare document versions to determine when annotations were added throughout the document's evolution. According to various aspects, the user (e.g., editor, content manager), in response to determining that another user (e.g., author, content creator) has not added any or significant annotations may prompt that other user to engage with the UI tagging panes, as discussed herein, to add annotations. According to another aspect, if a significant period of time has passed since another user (e.g., author, content creator) interacted with the document (e.g., worked on an early version), the user (e.g., editor, content manager) may prompt that other user to verify accepted annotations and/or engage with the UI tagging panes, as discussed herein, to add new and/or evaluate newly suggested annotations provided by the content enrichment system 104. For example, referring to FIG. 17, since user "Perry, A." has not interacted with the document since Nov. 28, 2016, the user evaluating the activity and versions interface 1700 (e.g., editor "AGP") may prompt user "Perry, A.", on or after Jan. 2, 2017, to verify accepted annotations and/or engage with the UI tagging panes, as discussed herein, to add new annotations (e.g., "Perry, A" has not yet added content tags and/or component tags based on the discoverability score graphical depiction 1716) and/or evaluate newly suggested annotations (e.g., new chapter keywords) provided by the content enrichment system 104.

Referring still to FIG. 17, further details including date modified 1726 (e.g., "Date"), user 1728 (e.g., "Changed By"), word count 1730, a first readability score 1732 (e.g., "Flesch-Kincaid") and a second readability score 1734 (e.g., "SMOG") may also be associated with each version of the current document. Furthermore a defined workflow 1736 may also be presented along with corresponding due dates to assist the user (e.g., editor, content manager) in meeting document deadlines.

Discoverability Score Reporting at a Project Level

Figure 18:
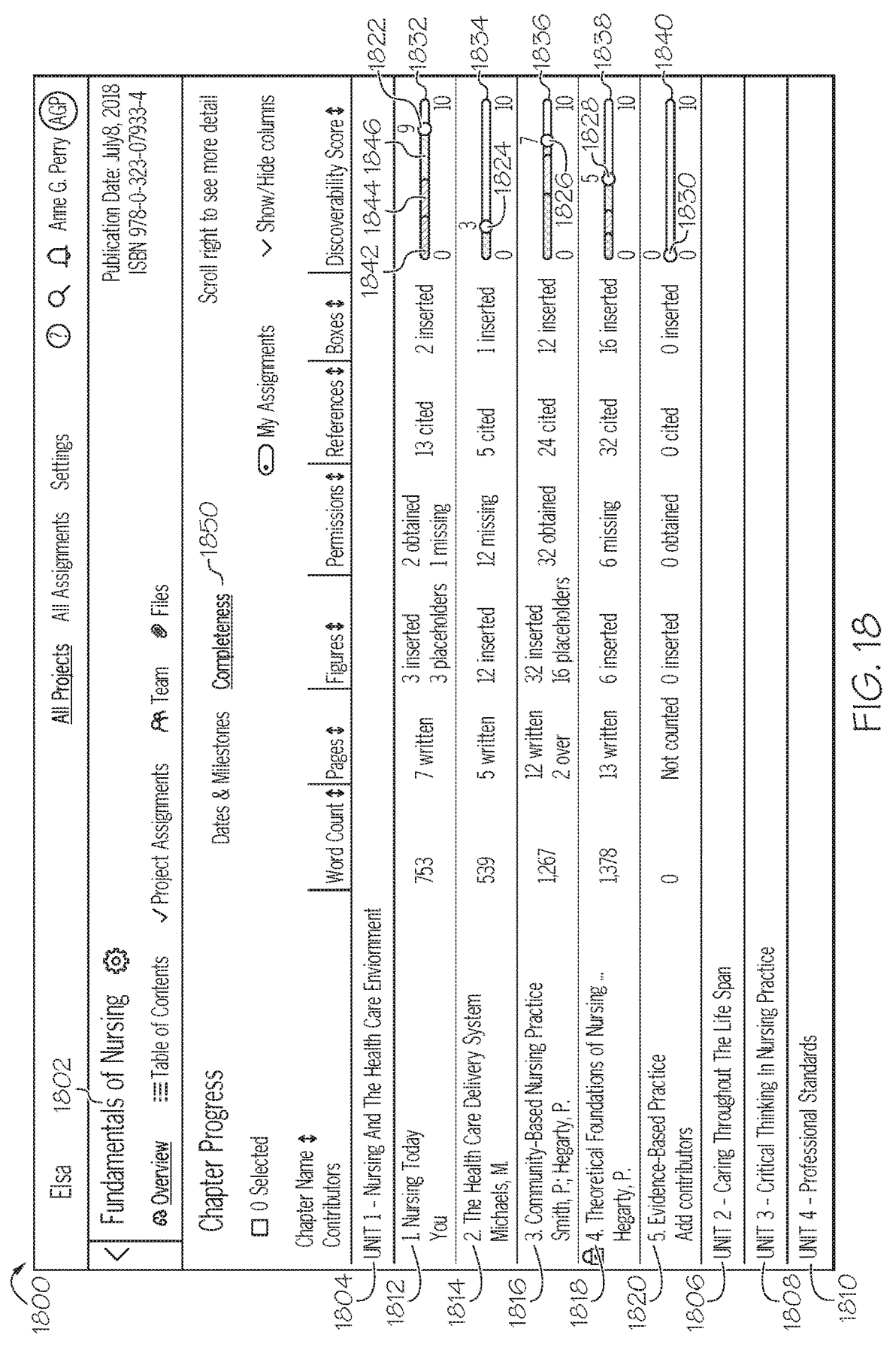

FIG. 18 depicts an illustrative project dashboard interface 1800 which may be available as part of a content creation platform (e.g., Elsa®—an Elsevier® Digital Publishing Platform, as a non-limiting example) according to various aspects of the present disclosure. According to various aspects, the project dashboard interface 1800 may include a "Completeness" tab 1850 that, after selection, reports information associated with a project. In view of FIG. 18, the project may include a book 1802 (e.g., "Fundamentals of Nursing") including one or more units 1804, 1806, 1808, 1810 and each unit including one or more chapters 1812, 1814, 1816, 1818, 1820.

Referring to FIG. 18, the system 100 of the present disclosure may present a discoverability score in association with each chapter of each unit as stored in the data store system 102. According to various aspects, the discoverability score may be associated with a most recent or latest version of each chapter as stored in the data store system 102. For example, a first chapter 1812 (e.g., "Nursing Today") of a first unit 1804 ("Unit 1—Nursing And The Health Care Environment") may be associated with a discoverability score 1822 of "9" (nine), a second chapter 1814 (e.g., "The Health Care Delivery System") of the first unit 1804 may be associated with a discoverability score 1824 of "3" (three), a third chapter 1816 (e.g., "Community-Based Nursing Practice") of the first unit 1804 may be associated with a discoverability score 1826 of "7" (seven), a fourth chapter 1818 (e.g., "Theoretical Foundations of Nursing . . . ") of the first unit 1804 may be associated with a discoverability score 1828 of "5" (five), and a fifth chapter 1820 (e.g., "Evidence-Based Practice) of the first unit 1804 may be associated with a discoverability score 1830 of "0" (zero).

Referring to FIG. 18, similar to as described in FIG. 17, each discoverability score 1822, 1824, 1826, 1828, 1830 may be presented on a discoverability score graphical depiction 1832, 1834, 1836, 1838, 1840. Each discoverability score graphical depiction 1832, 1834, 1836, 1838, 1840 may include a first annotation type portion 1842 (e.g., a chapter keywords portion), a second annotation type portion 1844 (e.g., a content tags portion), and a third annotation type portion 1846 (e.g., a component tags portion). Further, similar to as described herein, the first annotation type portion 1842 may be illustrated as a first color (e.g., purple, depicted as a first cross-hatching), the second annotation type portion 1844 may be illustrated as a second color (e.g., yellow, depicted as a second cross-hatching), and the third annotation type portion 1846 may be illustrated as a third color (e.g., blue, depicted as a third cross-hatching). In view of discoverability score graphical depiction 1832 of the first chapter 1804 of the first unit 1804, such colors may assist the user to efficiently visualize which annotation type(s) (e.g., chapter keywords, content tags, and/or component tags) are lacking (e.g., annotation weaknesses) and which annotation type(s) are abundant (e.g., annotation strengths) while adding additional annotations. For example, referring to the discoverability score graphical depiction 1834, it is evident that the second chapter 1814 of the first unit 1804 is lacking a second annotation type portion (e.g., content tags) and a third annotation type portion (e.g., component tags). As another example, referring to the discoverability score graphical depiction 1840, it is evident that the fifth chapter 1820 of the first unit 1804 needs immediate attention since it lacks any annotations. In such a way, a discoverability score (e.g., 1830) and/or a discoverability score graphical depiction (e.g., 1840) may assist a user (e.g., editor, content manager, and/or the like) to track project advancement and completeness as well as pinpoint progress on specific documents (e.g., fifth chapter 1820 has not been started). Furthermore, referring again to the discoverability score graphical depiction 1832, the combined colors (e.g., depicted as a first, second and third cross-hatching) may assist the user to efficiently visualize combined annotations relative to possible annotations (e.g., a blank or colorless portion, depicted without cross-hatching). In the example of FIG. 18, possible annotations, if accepted, may realize a discoverability score of "10" (ten).

Furthermore, in view of FIG. 18, reporting the discoverability score graphical depictions 1832, 1834, 1836, 1838, 1840 in a column may assist the user. In particular, a user (e.g., editor, content manager, and/or the like) may efficiently compare document (e.g., chapters and/or the like) to determine which documents are in need of further annotations. For example, in view of the discoverability score graphical depiction 1834, a user (e.g., editor "AGP") may prompt another user (e.g., "Michaels, M.", a contributor to the second chapter 1814 of the first unit 1804) to verify accepted annotations (e.g., chapter keywords) and/or engage with the UI tagging panes, as discussed herein, to add new and/or evaluate newly suggested annotations (e.g., new chapter keywords, content tags, and/or component tags) provided by the content enrichment system 104. Accordingly, the project dashboard interface 1800 of the present disclosure may enable a user (e.g., editor, content manager, and/or the like) to quickly scan which portions (e.g., chapters) of a project (e.g., book) need further attention and engagement by another user (e.g., author, content creator, contributor, and/or the like). The project dashboard interface 1800 of the present disclosure may enable the user (e.g., editor, content manager, and/or the like) to ensure that all the documents (e.g., chapters) in a project (e.g., book) have an adequate level of annotations (e.g., chapter keywords, content tags, and/or component tags) that will make it more reusable (e.g., for machine consumption) and discoverable (e.g., via the other digital products to which the documents and/or project may be exposed to).

Authoring Environment Augmentations and Tools

According to various embodiments, the system 100 of the present disclosure may further leverage the direct integration of the content enrichment system 104 and the process of accepting suggested annotations (e.g., via the UI tagging panes as described herein) in the authoring environment. For example, the system 100 of the present disclosure may provide additional information to a user (e.g., author, content creator, and/or the like) directly at the moment of content creation. Such additional information may augment the user's understanding of how their currently created content is connected to its domain and/or field. Such contextual augmentations may further motivate a user to engage with the UI tagging panes, as described herein, by revealing a direct value to their accepted annotations and how their created content "fits" within a larger corpus of content (e.g., a research corpus).

Figure 19:
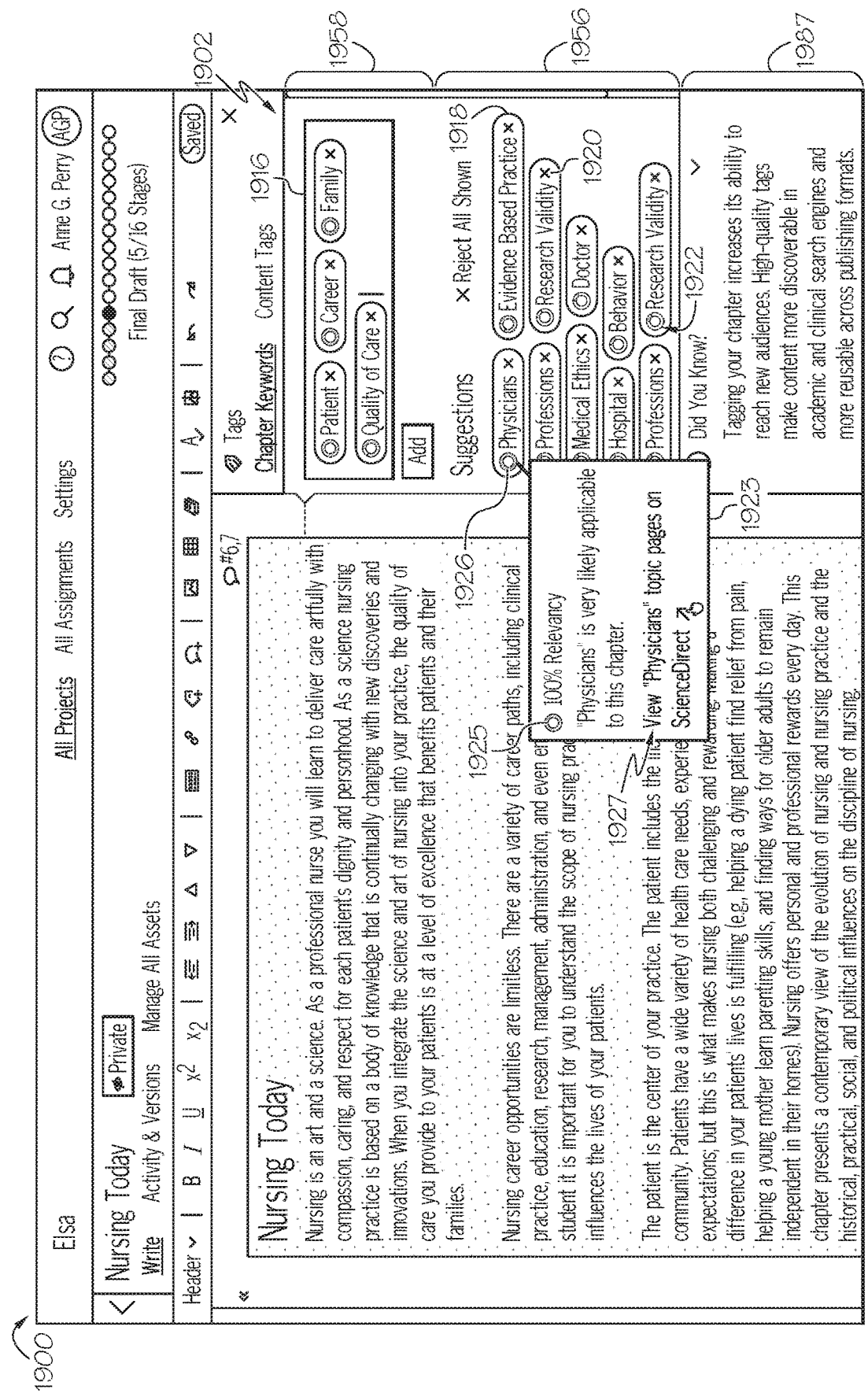
FIG. 19 depicts an illustrative UI tagging pane to provide additional information associated with annotations according to one or more embodiments of the present disclosure.
Figure 20:
FIG. 20 depicts an illustrative digital product interface presented after selection of a curated ancillary digital link according to one or more embodiments of the present disclosure.

FIG. 19 depicts an illustrative UI tagging pane 1902 to provide additional information associated with annotations according to various aspects of the present disclosure. In view of FIG. 19, as described herein, each annotation (e.g., chapter keyword) in the entry portion 1958 and/or the suggestion portion 1956 of the UI tagging pane 1902 may be depicted within a pill-shaped control element 1918. In addition to features previously described herein (e.g., selection to enter in the entry box 1916, reject chapter keyword control element 1920 feature, rescore chapter keyword control element 1922 features, and/or the like) the system 100 of the present disclosure may curate additional information (e.g., as determined and/or provided by the content enrichment system 104) through each pill-shaped control element 1918. For example, according to various aspects, the system 100 of the present disclosure may utilize each pill-shaped control element 1918 to provide a link to digital products and/or platforms. More specifically, upon user interaction (e.g., a mouse-over, a hover-over, and/or the like) with a pill-shaped control element 1918, or a portion thereof (e.g., a portion other than the reject chapter keyword control element 1920 portion and/or the rescore chapter keyword control element 1922 portion), a curating tooltip interface 1923 (e.g., a pop-up interface, hover box, a separate window, and/or the like) may be presented to the user. According to various aspects, the curating tooltip interface 1923 may display a curated donut chart 1925 that depicts a relevancy score (e.g., textually noted with its respective relevancy score, "100% Relevancy") as determined by the content enrichment system 104 for the corresponding annotation of the pill-shaped control element 1918. The relevancy score as depicted via the curated donut chart 1925 may mimic the relevancy score as depicted by the donut chart 1926 of the associated annotation in the UI tagging pane 1902. In addition, the curating tooltip interface 1923 may further provide a curated ancillary digital link 1927. In view of FIG. 19, for example, the system 100 of the present disclosure may provide "View 'Physicians' topic pages on ScienceDirect$^{SM}$" as the curated ancillary digital link 1927 in associated with the suggested chapter keyword "Physicians". According to various embodiments described herein, after selection of the curated ancillary digital link 1927, the system 100 of the present disclosure may open a separate window, a new browser webpage, a new browser tab, and/or the like to display a digital product corresponding to the curated ancillary digital link 1927. FIG. 20 illustrates a digital product interface 2000 that depicts the digital product (e.g., a "physicians" ScienceDirect$^{SM}$ Topic page) after selection of the curated ancillary digital link 1927 according to various aspects of the present disclosure.

According to various embodiments described herein, the system 100 of the present disclosure may provide a digital product that is both curated and contextual. For example, the system 100 of the present disclosure may take into account not only the type of annotation (e.g., chapter keyword, content tag, component tag, and/or the like) but also the nature and/or category of the annotation term in a knowledge graph.

Table 1 below illustrates example information evaluated by the system 100 of the present disclosure to determine a digital product to associate with a curated ancillary digital link (e.g., curated ancillary digital link 1927) according to various aspects described herein. For example, the system 100 may evaluate relational paths between a plurality of information sources as defined in a knowledge graph (e.g., an Elsevier® Knowledge Graph, as a non-limiting example). In view of Table 1 below, each knowledge graph may include a triplestore or resource description framework (RDF) store that links "Subject" (e.g., term), "Graph Relationship", and "Object" (e.g., target page). Notably, each subject (e.g., "$H_2O$", "aspirin", or the like) may include multiple relationships that point to different objects (e.g., different target pages).

TABLE 1

| Annotation Type | Subject | Knowledge Graph | Graph Relationship | Object |
|---|---|---|---|---|
| Chapter Keyword | "physician" | Science | "asDocument" | Topic Page |
| Chapter Keyword | "$H_2O$" | Science | "asDocument" | Topic Page |
| Content Tag | "$H_2O$" | Science | "asFormula" | Chemistry Page |
| Chapter Keyword | "aspirin" | Health | "asDocument" | Topic Page |
| Content Tag | "aspirin" | Health | "asDosage" | Drug page |

As a first example, in view of Table 1 above and referring to FIG. 19, (e.g., based on a "Science" knowledge graph and the subject/term "physicians" as a "Chapter Keyword"), the curated ancillary digital link 1927 of FIG. 19 may point to a "physicians" topic page (e.g., the ScienceDirect$^{SM}$ Topic page of FIG. 20, as a non-limiting example).

Figure 21:
FIG. 21 depicts an illustrative digital product interface presented after selection of a curated ancillary digital link associated with a chapter keyword according to one or more embodiments of the present disclosure.

As a second example, FIG. 21 illustrates a digital product interface 2100 that depicts a second digital product after selection of a second curated ancillary digital link (not shown) according to various aspects. Similar to FIG. 19, the second curated ancillary digital link may be presented within a second curating tooltip interface (not shown) after user interaction (e.g., a mouse-over, a hover-over, and/or the like) with a second pill-shaped control element or a portion thereof (not shown) that is associated with a chapter keyword "$H_2O$". In such an example, in view of Table 1 above, (e.g., based on a "Science" knowledge graph and the subject/term "$H_2O$" as a "Chapter Keyword"), the second curated ancillary digital link may point to a "water" topic page (e.g., the ScienceDirect$^{SM}$ Topic page of FIG. 21, as a non-limiting example). In view of FIG. 21, terms (e.g., "water") corresponding to the chapter keyword (e.g., "$H_2O$") may be visually distinguished (e.g., highlighted, underlined, and/or the like) within the digital product corresponding to the second curated digital link.

Figure 22:
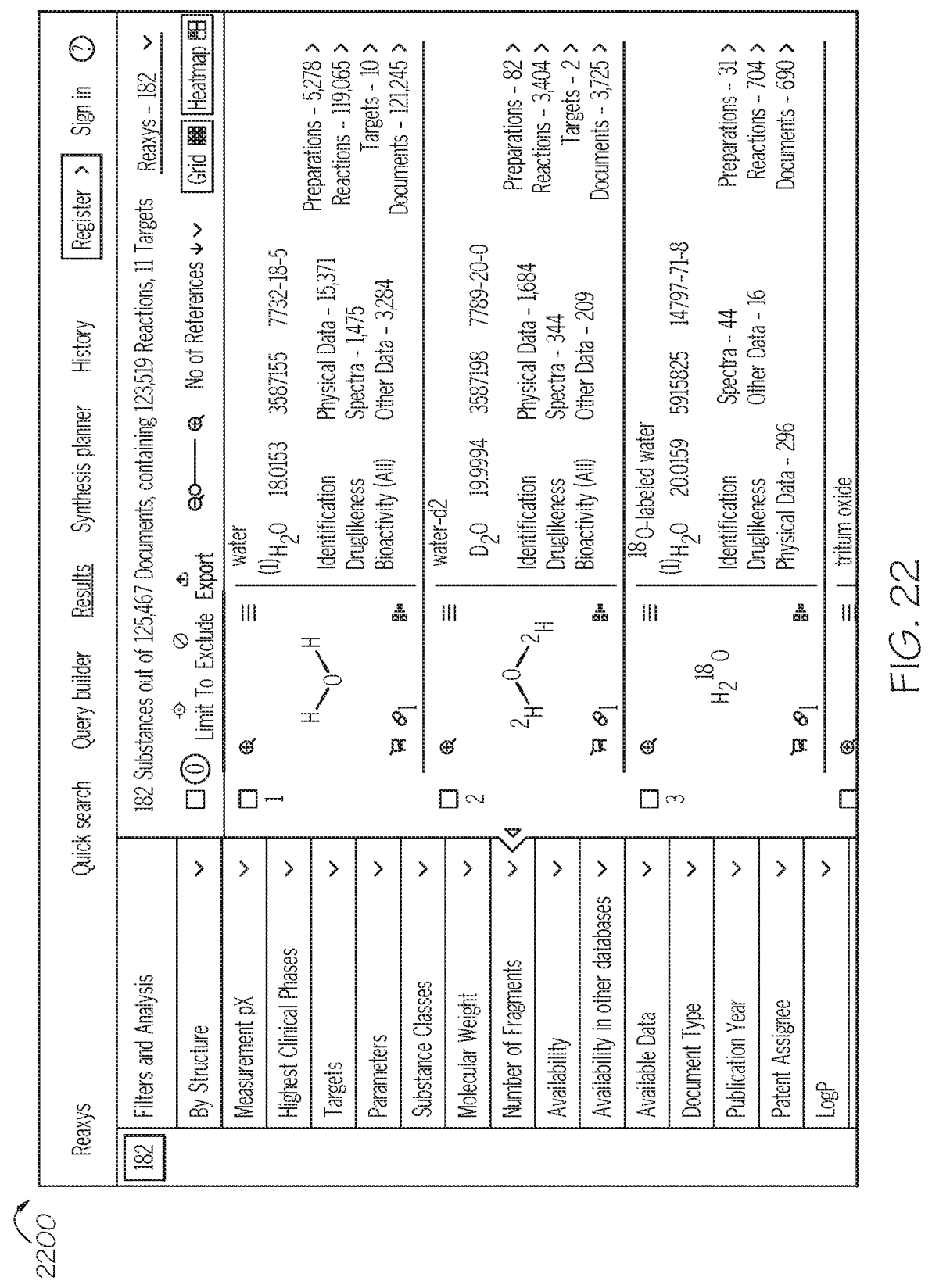

As a third example, FIG. 22 illustrates a digital product interface 2200 that depicts a third digital product after selection of a third curated ancillary digital link (not shown) according to various aspects. Again, similar to FIG. 19, the third curated ancillary digital link may be presented within a third curating tooltip interface (not shown) after user interaction (e.g., a mouse-over, a hover-over, and/or the like) with a third pill-shaped control element or a portion thereof (not shown) that is associated with a content tag "$H_2O$". In such an example, in view of Table 1 above, (e.g., based on a "Science" knowledge graph and the subject/term "$H_2O$" as a "Content Tag") the third curated ancillary digital link may point to an "$H_2O$" chemistry page (e.g., the Reaxys® $H_2O$ molecule page of FIG. 22, as a non-limiting example).

Accordingly, viewing FIG. 22 in light of FIG. 21, even if the subject/term itself is the same (e.g., "$H_2O$"), the digital product ultimately associated with a curated ancillary digital link (e.g., curated ancillary digital link 1927 of FIG. 19) may be different as a function of not only a knowledge graph (e.g., an Elsevier® Knowledge Graph, as a non-limiting example) but also whether the term is a chapter keyword, a content tag, or a component tag. In a similar manner, in view of Table 1 above, (e.g., based on a "Health" knowledge graph and the subject/term "aspirin" as a "Chapter Keyword"), a fourth curated ancillary digital link (not shown) may point to an "aspirin" topic page (e.g., a ScienceDirect$^{SM}$ Topic page or Clinical Key® page, as a non-limiting examples). Further in a similar manner, in view of Table 1 above, (e.g., based on a "Health" knowledge graph and the subject/term "aspirin" as a "Content Tag"), a fifth curated ancillary digital link (not shown) may point to an "aspirin" drug page (e.g., Gold Standard Drug Database page that depicts optimal dosages, as a non-limiting example).

Figure 23:
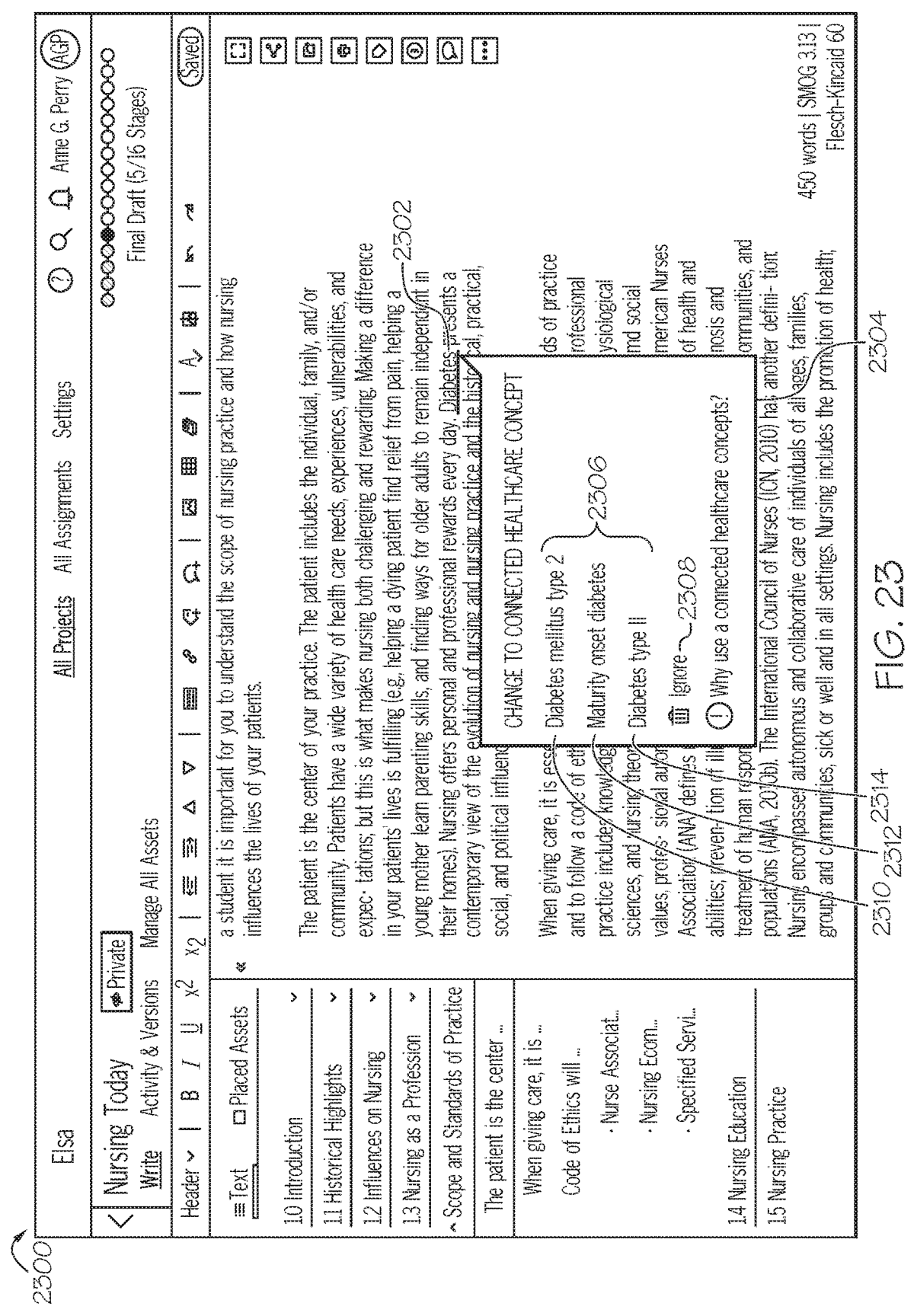

FIG. 23 depicts an illustrative content creation user interface 2300 to provide additional information according to various aspects of the present disclosure. According to various embodiments, the system 100 of the present disclosure may detect terms in the current document and/or synonyms of terms in the current document that are part of a knowledge graph (e.g., an Elsevier® Knowledge Graph, as a non-limiting example). According to various aspects, the system 100 of the present disclosure may initially detect such terms within the body of the document (e.g., text body) and then detect such terms within annotations accepted for the document. According to alternative aspects, the system 100 of the present disclosure may initially detect such terms within annotations accepted for the document and then detect such terms within the body of the document. Once such terms are detected, the system 100 of the present disclosure may present various knowledge graph elements to the user (e.g., author, content creator, and/or the like). According to various aspects, when a term detected in the current document uniquely matches a term within a knowledge graph (e.g., an Elsevier® Knowledge Graph, as a non-limiting example), the system 100 of the present disclosure may append a supplemental content link (FIG. 24, supplemental content link 2402) to that term within the body of the document. According to further aspects, the system 100 of the present disclosure may append the supplemental content link to each instance of that term within the body of the document. According to yet further aspects, the system 100 of the present disclosure may append the supplemental content link to one or more instances of that term within the body of the document.

According to other aspects of the present disclosure, when a term is detected in the current document but it does not uniquely match a term within a knowledge graph (e.g., an Elsevier® Knowledge Graph, as a non-limiting example), the system 100 of the present disclosure may seek further specificity from the user. Referring to FIG. 23, for example, the system 100 of the present disclosure has detected the term "Diabetes", within the body of the document, as a term represented in a knowledge graph. However, in such an example, the term "diabetes" is not unique and is too general or generic in nature for a pure match. According to various embodiments, in such a situation, the term may visually emphasized 2302 (e.g., color underlining, highlighting, bolding, and/or the like) within the text body. In such an aspect, upon user interaction (e.g., a mouse-over, a hover-over, and/or the like) with the emphasized term 2302, a specification tooltip interface 2304 (e.g., a pop-up interface, a hover box, a separate window, and/or the like) may be presented to the user. According to various aspects, the specification tooltip interface 2304 may display a plurality of terms (e.g., that are within the knowledge graph) in a list 2306 related to the emphasized term 2302 needing specified (e.g., "diabetes"). Continuing with the example of FIG. 23, the terms "Diabetes mellitus type 2" 2310, "Maturity onset diabetes" 2312 and "Diabetes type II" 2314 may be displayed in the list 2306. According to various aspects, the user may select (e.g., via a cursor, touchscreen, and/or the like) a term (e.g., "Diabetes mellitus type 2" 2310) from the list 2306 to indicate to the system 100 that that more precise term (e.g., as uniquely represented in the knowledge graph) was intended. According to various aspects, after user selection of the term (e.g., "Diabetes mellitus type 2" 2310) from the list 2306, the system 100 of the present disclosure may replace the emphasized term 2302 (e.g., the broader, more generic "Diabetes") with the selected term 2310 (e.g., the narrower, more precise "Diabetes mellitus type 2") and append a supplemental content link (FIG. 24, supplemental content link 2402) to the selected term within the body of the document. According to further aspects, the system 100 of the present disclosure may replace the emphasized term 2302 with the selected term 2310 and append the supplemental content link to each instance of that term within the body of the document. According to yet further aspects, the system 100 of the present disclosure may replace the emphasized term 2302 with the selected term 2310 and append the supplemental content link to one or more instances of that term within the body of the document.

Referring again to FIG. 23, according to various embodiments described herein, the specification tooltip interface 2304 may further depict an ignore control element 2308. According to various aspects, after user selection of the ignore control element 2308, the system 100 of the present disclosure may remove the visual emphasis 2302 associated with that instance of the term (e.g., diabetes) within the body of the document. According to further aspects, after user selection of the ignore control element 2308, the system 100 of the present disclosure may remove the visual emphasis 2302 associated with all instances of that term (e.g., diabetes) within the body of the document. According to yet further aspects, after user selection of the ignore control element 2308, the system 100 of the present disclosure may remove the visual emphasis 2302 associated with one or more instances of that term (e.g., diabetes) within the body of the document.

Figure 24:
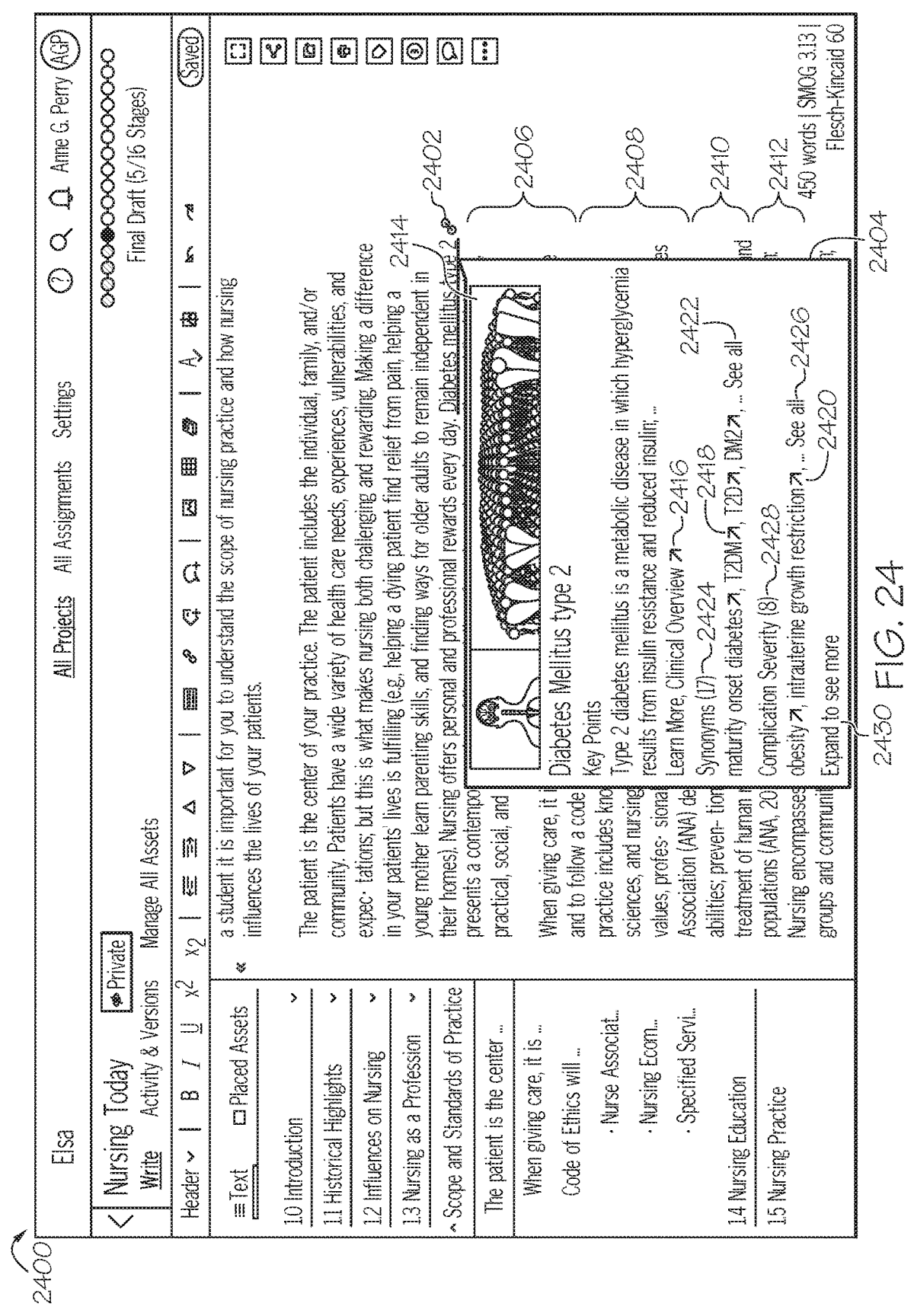

FIG. 24 depicts an illustrative content creation user interface 2400 to provide additional information via a supplemental content link according to various aspects of the present disclosure. As referenced in the discussion of FIG. 23 above, when a term detected in the current document uniquely matches a term within a knowledge graph (e.g., an Elsevier® Knowledge Graph, as a non-limiting example), the system 100 of the present disclosure may append the supplemental content link 2402 to that term(s) within the body of the document as depicted in FIG. 24. Alternatively, when a term detected in the current document does not uniquely match a term within a knowledge graph (e.g., an Elsevier® Knowledge Graph, as a non-limiting example) but the user has provided specificity to that detected term by selecting (e.g., via a specification tooltip interface 2304 of FIG. 23) a term from a list of more precise terms within the knowledge graph, the system 100 of the present disclosure may replace the detected term with the selected term (e.g., "Diabetes" in FIG. 23 replaced by "Diabetes mellitus type 2" in FIG. 24) and append the supplemental content link 2402 to that selected term(s) within the body of the document as depicted in FIG. 24.

Accordingly, referring to FIG. 24, upon user interaction (e.g., a mouse-over, a hover-over, and/or the like) with such detected or selected terms and/or the supplemental content link 2402, a supplemental content interface 2404 (e.g., a pop-up interface, a hover box, a separate window, and/or the like) may be presented to the user. According to various aspects, the supplemental content interface 2404 may display a plurality of types of information in a predefined layout. The supplemental content interface 2404 may further be contextual for each of the main term categories present in a knowledge graph (e.g., an Elsevier® Knowledge Graph, as a non-limiting example). Referring to FIG. 24, for example, the supplemental content interface 2404 associated with a "disease" may include a graphic portion 2406, a key points portion 2408, a synonyms portion 2410 and a complication severity portion 2412. In such an example, the graphic portion 2406 may include one or more visual graphic 2414 (e.g., a best raked graphic), from an image search tool (e.g., an Elsevier® Image Search, as a non-limiting example), for the disease, the key points portion 2408 may include key medical points available for the disease and a hyperlink 2416 to one or more clinical overview page, the synonyms portion 2410 may include domain-recognized synonyms for the disease as well as a hyperlink 2418 to one or more clinical overview page or pop-up associated with each synonym (e.g., domain-recognized synonyms and/or the like), and the complication severity portion 2412 may include domain-recognized complications associated the disease as well as a hyperlink 2420 to one or more clinical overview page or pop-up associated with each complication (e.g., domain-recognized complications and/or the like). According to various aspects, each of the plurality of hyperlinks (e.g., 2416, 2418, 2420) may link to supplemental content stored in a knowledge graph (e.g., an Elsevier® Knowledge Graph, as a non-limiting example).

In view of FIG. 24, each portion of the supplemental content interface 2404 may further include a "See all" control element 2422, 2426 to reveal all available hyperlinks for that section. Namely, continuing the example of FIG. 24, the synonyms portion 2410 includes a count feature 2424 that indicates the availability of "17" (seventeen) hyperlinks. After selection of the "See all" control element 2422, the system 100 of the present disclosure may display all 17 (seventeen) hyperlinks in the supplemental content interface 2404. Similarly, the complication severity portion 2412 includes a count feature 2428 that indicates the availability of "8" (eight) hyperlinks. After selection of the "See all" control element 2426, the system 100 of the present disclosure may display all 8 (eight) hyperlinks in the supplemental content interface 2404. According to various embodiments of the present disclosure, the supplemental content interface 2404 may further include an "Expand to see more" control element 2430. After selection of the "Expand to see more" control element 2430, the system 100 of the present disclosure may dismiss the supplemental content interface 2404 and display a new UI supplemental content pane 2502 as depicted in FIG. 25 (e.g., to a right side of the text body of the document).

FIG. 25 depicts an illustrative content creation UI 2500 including a UI supplemental content pane 2502 according to various aspects of the present disclosure. The UI supplemental content pane 2502 may display more supplemental content than the supplemental content interface 2404 of FIG. 24 but may retain the same general layout as the supplemental content interface 2404 as described above. For example, the UI supplemental content pane 2502 may include a "More Images" control element 2506 to show one or more images (e.g., below the top ones) of the disease as well as a hyperlink 2508 to one or more images of the disease. Further, for example, the UI supplemental content pane 2502 may include further portions including a medications portion 2510 (e.g., with a count feature 2514 that indicates the availability of "15" (fifteen) hyperlinks) and a related diseases portion 2512 (e.g., with a count feature 2516 that indicates the availability of "14" (fourteen) hyperlinks. Yet further, for example, the UI supplemental content pane 2502 may include expand features 2518 and collapse features 2520 to render the hyperlinks associated with each section viewable or not viewable. The UI supplemental content pane 2502 may further include an "Expand All" control element 2522 and an "Collapse All" control element 2524 to render the hyperlinks of all sections viewable or not viewable.

According to various aspects, the UI supplemental content pane 2502 may further include a scroll bar 2504 to scroll up and down within the UI supplemental content pane 2502 and/or in the body of the text. Such a feature may enable the user to efficiently explore the knowledge graph context and content links side by side with the actual text and/or content being created at the time of creation.

Figure 26:
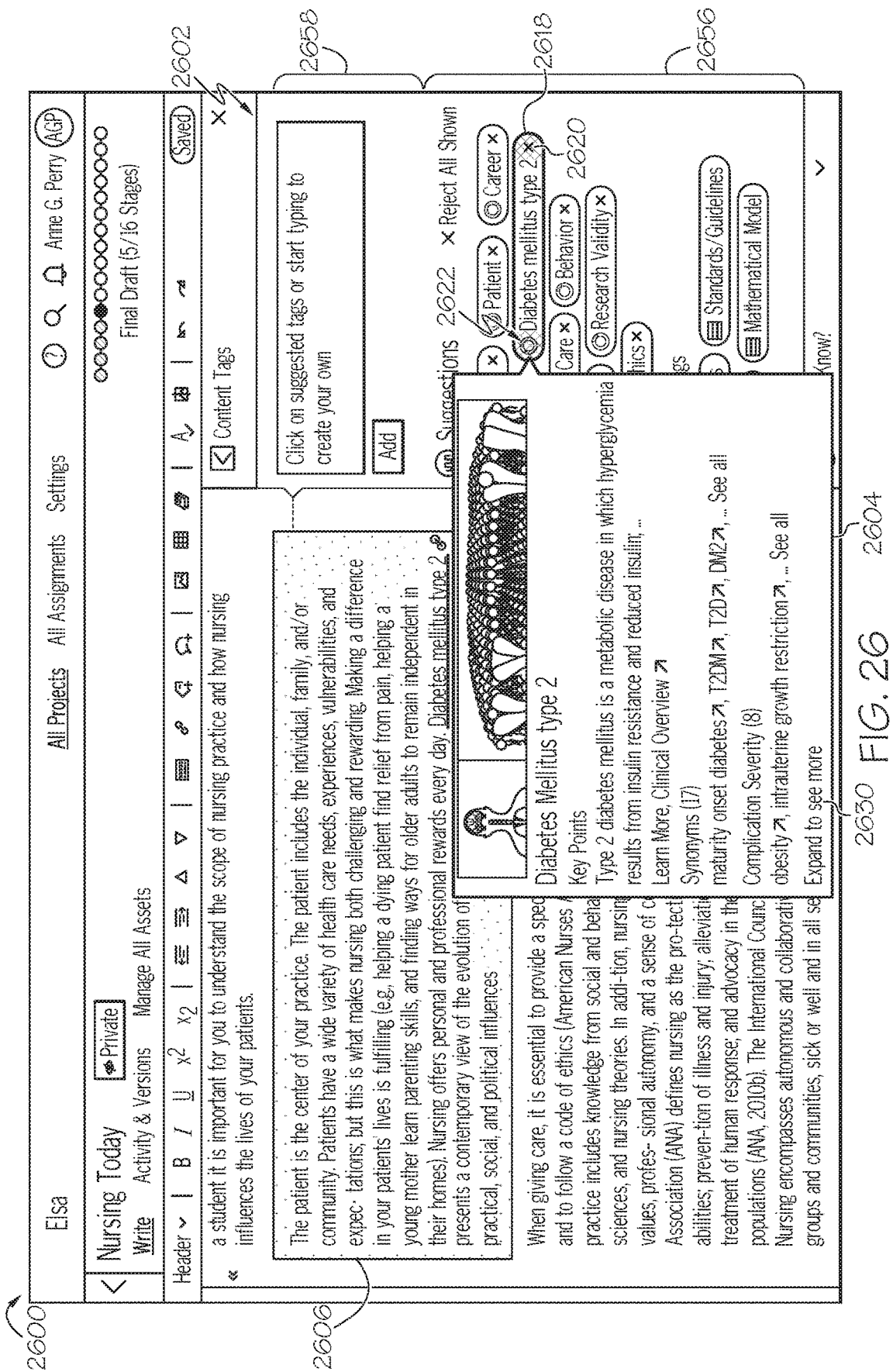
FIG. 26 depicts an illustrative content creation user interface including a UI tagging pane and a supplemental content interface according to one or more embodiments of the present disclosure.

FIG. 26 depicts an illustrative content creation user interface 2600 including a UI tagging pane 2602 and a supplemental content interface 2604 according to various aspects of the present disclosure. Referring to FIG. 26, when a node element 2606 is selected in the body of the document and that node element 2606 includes a detected or selected unique term (e.g., "Diabetes mellitus type 2") as discussed in FIG. 23 above, a pill-shaped control element 2618 associated with that term may be emphasized (e.g., depicted as cross-hatching in FIG. 26) from other annotations (e.g., chapter keywords, content tags, and/or component tags) in the entry portion 2658 and/or the suggestion portion 2656 of the UI tagging pane 2602. In such an aspect, upon user interaction (e.g., a mouse-over, a hover-over, and/or the like) with the emphasized pill-shaped control element 2618, or a portion thereof (e.g., a portion other than a reject content tag control element 2620 portion and/or a rescore content tag control element 2622 portion), a supplemental content interface 2604, as described in FIG. 24 herein, may be presented to the user. Accordingly, via such interfaces, the user (e.g., author, content creator, and/or the like) may be timely provided with a wealth of information (e.g., as described herein in FIG. 24) regarding that term as the user is creating content. Furthermore, such interfaces may confirm to the user that such entered and/or suggested annotations correspond to the created content as intended by the user. Similar to as described herein, according to various embodiments of the present disclosure, the supplemental content interface 2604 may further include an "Expand to see more" control element 2630. After selection of the "Expand to see more" control element 2630, the system 100 of the present disclosure may dismiss the supplemental content interface 2604 and display a new UI supplemental content pane as depicted in FIG. 25 (e.g., UI supplemental content pane 2502 to the right side of the text body of the document) over (e.g., a pop-up interface, a separate window, and/or the like) or in place of the UI tagging pane 2602.

Overall, numerous embodiments of the present disclosure provide comprehensive in-situ structured document annotations with simultaneous reinforcement and disambiguation as a bi-directional system (e.g., communications to users from a content enrichment system 104, communications from users to the content enrichment system 104), in a structured authoring environment (e.g., via the various interfaces as described herein), where user (e.g., authors, content creators) are encouraged in real-time to validate and/or disambiguate different types of annotations (e.g., chapter keywords, content tags, component tags, and/or the like), providing a direct feedback loop between content enrichment system 104 algorithms and domain experts (e.g., authors). The numerous interfaces, as described herein, that support such comprehensive in-situ structured document annotations with simultaneous reinforcement and disambiguation generate not only quality annotations but also complete annotations by directly engaging users (e.g., technical authors) that are highly qualified in their respective domains. The systems and/or methods described herein offer considerable advantages over existing models where annotations are added post content creation and/or annotations are validated by external vendors who may not fully understand the intricacies and/or new developments in a highly technical field as well as the original author of the created content.

Various embodiments of the present disclosure directly integrate content enrichment system 104 technology into a content creation (e.g., authoring) workflow. Some aspects not only provide rich indications of the value of these annotations but also provide links to ancillary works (e.g., content, documents, products and/or the like) that are relevant to the annotation being proposed to the author. Other aspects, provide cues scattered directly in the content body to remind the authors that certain enrichments are available and attached to the content being authored. The user (e.g., author) experience described herein involves producing content enrichment system-based annotation results, with the content, in real time, at the actual moment of content creation (in situ). Utilizing the various transient user interface elements, as described herein, the users (e.g., authors) can guide content enrichment system 104 user results by providing valuable disambiguation cues on certain problematic annotations (e.g., such as the semantic difference between the concept "cell" (room/chamber) versus "cell" (small organism)). Namely, content enrichment system 104 results and associated user interactions (e.g., validations via acceptances, relevancy scorings/rescorings, disambiguation interactions, and/or the like) are stored at a per-document, per-node, and/or per-version level. Accordingly, such results and/or interactions are usable to create rich training sets to improve future content enrichment system 104 results. According to other aspects, such results and/or interactions may also be used by interval validation tools (e.g., an Elsevier® Collabonator, as a non-limiting example).

Various aspects, components and systems, as described herein, may be utilized as part of an online content creation platform (e.g., Elsa®—an Elsevier® Digital Publishing Platform, as a non-limiting example) to support book publishing efforts. Various embodiments may further introduce motivational tools for the content creation platform to assist in capturing high quality annotations of different types (e.g., chapter keywords, content tags, component tags, and/or the like) and to offer users (e.g., authors) reinforcement by providing examples of how such different annotation types drive content discoverability/re-usage across digital products (e.g., Elsevier® digital products and/or platforms, as a non-limiting example). Namely, a discoverability score, as described herein, may reflect a quality and a quantity of various annotation types per document, per version. Such a discoverability score, according to various aspects, may be reviewable at a project dashboard level and serve as a quick way to assess the overall health and completeness of the enrichment at a global level for any project (e.g., chapters of a book). In such a way, editors and/or content managers may compare the different documents (e.g., chapters) that collectively comprise the project (e.g., book) and engage with the users (e.g., authors, content creators) to ensure that valuable annotations have been added to their content (e.g., chapters).

Although the methods and/or systems described herein are related to publishing activities in technical subject matter areas (e.g., such as science, technology, health, and/or the like), it should be understood that such methods and/or systems can be similarly utilized in more general subject matter areas. Namely, the methods and/or systems of the present disclosure provide a common digital-physical publishing platform/framework suitable to support any type of content when the addition of new annotations and/or the maintenance of existing annotations buttresses machine consumption and use.

It should now be understood that the systems and methods described herein are suitable for not only proactively engaging users (e.g., authors, content creators and/or the like) directly with annotation services (e.g., provided via a content enrichment system 104) at the time of content creation to add annotations but also proactively motivating users (e.g., FIG. 13, via a discoverability scores 1382, FIG. 14, via a next workflow stage inquiry interface 1414, FIG. 17, via and activities and versions interface 1700, and/or the like) to add such annotations. More specifically, the various UI tagging panes discussed herein provide numerous control elements and/or interfaces to fluidly interact with the user. Such interactions include not only providing information (e.g., context, details) to the user but also learning from the user (e.g., feedback to retrain, calibrate, and/or enhance content enrichment system 104 annotation algorithms).

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. A system, comprising:
   an authoring assistance system to create an interactive authoring environment for a plurality of users, the authoring assistance system including a processor and a memory device, the memory device storing instructions that when executed by the processor cause the processor to:
   receive one or more node element selected within a content creation user interface (UI) associated with a user access device communicatively coupled to the authoring assistance system;
   receive one or more suggested annotation from a content enrichment system (CES) communicatively coupled to the authoring assistance system, wherein the one or more suggested annotation is based on the one or more selected node element;
   integrate a user interface (UI) tagging pane within the content creation UI of the user access device, wherein the UI tagging pane comprises:
   one or more annotation control element to textually depict each of the one or more suggested annotation, wherein each annotation control element defines:
   a first portion configured to, after selection, enter an annotation associated with that annotation control element into an annotation entry box; and
   a second portion configured to, after selection, reject the suggested annotation associated with that annotation control element;
   an add control element configured to, after selection, accept all annotations entered in the annotation entry box; and
   a discoverability score graphical depiction to illustrate a discoverability score associated with content, including the one or more selected node element, in the content creation UI, wherein the discoverability score graphical depiction defines:
one or more annotation type portion including at least one of a first annotation type portion, a second annotation type portion, or a third annotation type portion, wherein each annotation type portion is visually distinguished to evaluate annotation entry for the one or more annotation type; and
transmit at least one of each annotation accepted via the UI tagging pane or each annotation rejected via the UI tagging pane to a data store system communicatively coupled to the authoring assistance system.

2. The system of claim 1, wherein the memory device further stores instructions, that when executed by the processor further cause the processor to:
integrate a tagging control element within the content creation UI, wherein the tagging control element is configured to, after selection, integrate the UI tagging pane within the content creation UI.

3. The system of claim 2, wherein the tagging control element is rendered selectable after the one or more node element is selected within the content creation UI.

4. The system of claim 1, wherein the memory device further stores instructions, that when executed by the processor further cause the processor to:
generate the content creation UI on the user access device.

5. The system of claim 1, wherein the UI tagging pane further comprises:
a plurality of selectable annotation tabs, including:
a first annotation tab associated with a first category of annotation, wherein the first annotation tab is configured to, after selection, present at least one annotation control element that textually depicts an annotation associated with the first category of annotation; and
a second annotation tab associated with a second category of annotation, wherein the second annotation tab is configured to, after selection, present at least one annotation control element that textually depicts an annotation associated with the second category of annotation.

6. The system of claim 5, wherein each annotation associated with the first category of annotation comprises a term not present in the one or more selected node element, and wherein each annotation associated with the second category of annotation comprises a term present in the one or more selected node element.

7. The system of claim 1, wherein the UI tagging pane further comprises:
a connector feature that connects the UI tagging pane to the one or more selected node element within the content creation UI to indicate that the one or more suggested annotation has been suggested based on the one or more selected node element.

8. The system of claim 1, wherein each annotation control element further defines:
a third portion, wherein the third portion comprises a rescore control element including an interface that depicts a CES-determined relevancy score for the annotation associated with that annotation control element, and wherein the rescore control element is configured to, after selection, generate a relevancy interface to modify the CES-determined relevancy score to a user-defined relevancy score.

9. The system of claim 1, wherein the memory device further stores instructions, that when executed by the processor further cause the processor to:
transmit, to the CES, text as it is typed into the annotation entry box; and
generate an auto-complete interface to present one or more suggested term from the CES, wherein each suggested term dynamically auto-completes the text as it is typed, and wherein each suggested term is based on at least one of terms within a dictionary or taxonomy of the CES, terms within the one or more selected node element, terms within a predetermined domain, or terms within a pre-established list of terms.

10. The system of claim 1, wherein the memory device further stores instructions, that when executed by the processor further cause the processor to:
receive, from the CES, a request to disambiguate one or more annotation entered in the annotation entry box; and
generate a third portion for each annotation control element associated with each annotation in the request, wherein each third portion comprises a disambiguation control element configured to, after selection, generate a disambiguation interface to present one or more proposed terms from the CES to disambiguate its associated annotation to a user-intended term.

11. The system of claim 1, wherein the discoverability score graphical depiction is configured to, after selection or interaction, generate a discoverability score interface to separately illustrate the at least one of the first annotation type portion in association with a first annotation type threshold score, the second annotation type portion in association with a second annotation type threshold score, or the third annotation type portion in association with a third annotation type threshold score to prompt annotation entry for the one or more annotation type based on each respective threshold score.

12. A system to create an interactive authoring environment for a plurality of users, the system comprising:
a content enrichment server;
a database server; and
an authoring assistance server, wherein the content enrichment server, the database server, and the authoring assistance server are communicatively coupled via a network, and wherein the authoring assistance server comprise a processor and a memory device, the memory device storing instructions that when executed by the processor cause the processor to:
receive one or more node element selected within a content creation user interface (UI) associated with a user access device communicatively coupled to the system;
receive one or more suggested annotation from the content enrichment server, wherein the one or more suggested annotation is based on the one or more selected node element;
integrate a user interface (UI) tagging pane within the content creation UI of the user access device, wherein the UI tagging pane comprises:
one or more annotation control element to textually depict each of the one or more suggested annotation, wherein each annotation control element defines:
a first portion configured to, after selection, enter an annotation associated with that annotation control element into an annotation entry box; and a second portion configured to, after selection, reject the suggested annotation associated with that annotation control element;

an add control element configured to, after selection, accept all annotations entered in the annotation entry box; and a discoverability score graphical depiction to illustrate a discoverability score associated with content, including the one or more selected node element, in the content creation UI, wherein the discoverability score graphical depiction defines:

one or more annotation type portion including at least one of a first annotation type portion, a second annotation type portion, or a third annotation type portion, wherein each annotation type portion is visually distinguished to evaluate annotation entry for the one or more annotation type; and transmit at least one of each annotation accepted via the UI tagging pane or each annotation rejected via the UI tagging pane to the database server.

13. The system of claim 12, wherein each annotation control element further defines:

a third portion, wherein the third portion comprises a rescore control element including an interface that depicts a content enrichment server-determined relevancy score for the annotation associated with that annotation control element, and wherein the rescore control element is configured to, after selection, generate a relevancy interface to modify the content enrichment server-determined relevancy score to a user-defined relevancy score.

14. The system of claim 12, wherein the memory device further stores instructions, that when executed by the processor further cause the processor to:

transmit, to the content enrichment server, text as it is typed into the annotation entry box; and generate an auto-complete interface to present one or more suggested term received from the content enrichment server, wherein each suggested term dynamically auto-completes the text as it is typed, and wherein each suggested term is based on at least one of terms within a dictionary or taxonomy of the content enrichment server, terms within the one or more selected node element, terms within a predetermined domain, or terms within a pre-established list of terms.

15. The system of claim 12, wherein the memory device further stores instructions, that when executed by the processor further cause the processor to:

receive, from the content enrichment server, a request to disambiguate one or more annotation entered in the annotation entry box; and generate a third portion for each annotation control element associated with each annotation in the request, wherein each third portion comprises a disambiguation control element configured to, after selection, generate a disambiguation interface to present one or more proposed terms, received from the content enrichment server, to disambiguate its associated annotation to a user-intended term.

16. A non-transitory computer readable medium storing instructions, the instructions when executed by a processor cause the processor to:

receive one or more node element selected within a content creation user interface (UI) associated with a user access device;

receive one or more suggested annotation from a content enrichment system (CES), wherein the one or more suggested annotation is based on the one or more selected node element;

integrate a user interface (UI) tagging pane within the content creation UI of the user access device, wherein the UI tagging pane comprises:

one or more annotation control element to textually depict each of the one or more suggested annotation, wherein each annotation control element defines:

a first portion configured to, after selection, enter an annotation associated with that annotation control element into an annotation entry box; and a second portion configured to, after selection, reject the suggested annotation associated with that annotation control element; and an add control element configured to, after selection, accept all annotations entered in the annotation entry box;

a discoverability score graphical depiction to illustrate a discoverability score associated with content, including the one or more selected node element, in the content creation UI, wherein the discoverability score graphical depiction defines:

one or more annotation type portion including at least one of a first annotation type portion, a second annotation type portion, or a third annotation type portion, wherein each annotation type portion is visually distinguished to evaluate annotation entry for the one or more annotation type; and transmit at least one of each annotation accepted via the UI tagging pane or each annotation rejected via the UI tagging pane to a data store system.

17. The non-transitory computer readable medium of claim 16, wherein the instructions when executed by the processor further cause the processor to:

transmit, to the CES, text as it is typed into the annotation entry box; and generate an auto-complete interface to present one or more suggested term from the CES, wherein each suggested term dynamically auto-completes the text as it is typed, and wherein each suggested term is based on at least one of terms within a dictionary or taxonomy of the CES, terms within the one or more selected node element, terms within a predetermined domain, or terms within a pre-established list of terms.

18. The non-transitory computer readable medium of claim 16, wherein the instructions when executed by the processor further cause the processor to:

receive, from the CES, a request to disambiguate one or more annotation entered in the annotation entry box; and generate a third portion for each annotation control element associated with each annotation in the request, wherein each third portion comprises a disambiguation control element configured to, after selection, generate a disambiguation interface to present one or more proposed terms from the CES to disambiguate its associated annotation to a user-intended term.

* * * * *